US012230092B2

(12) United States Patent
Winston et al.

(10) Patent No.: US 12,230,092 B2
(45) **Date of Patent: *Feb. 18, 2025**

(54) ELECTRONIC GAMING MACHINE WITH DYNAMIC DISPLAY

(71) Applicant: Aristocrat Technologies, Inc., Las Vegas, NV (US)

(72) Inventors: Eric Winston, Reno, NV (US); Craig Paulsen, Reno, NV (US); Rajendrasinh Jadeja, Las Vegas, NV (US); Eric Taylor, Carson City, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,294

(22) Filed: Jun. 6, 2023

(65) Prior Publication Data

US 2023/0316855 A1 Oct. 5, 2023

Related U.S. Application Data

(63) Continuation of application No. 17/449,635, filed on Sep. 30, 2021, now Pat. No. 11,710,368.

(60) Provisional application No. 63/200,290, filed on Feb. 26, 2021.

(51) Int. Cl.
*G07F 17/32* (2006.01)
*G07F 17/34* (2006.01)

(52) U.S. Cl.
CPC ...... *G07F 17/3213* (2013.01); *G07F 17/3216* (2013.01); *G07F 17/34* (2013.01)

(58) Field of Classification Search
CPC ... G07F 17/3213; G07F 17/3216; G07F 17/34
See application file for complete search history.

(56) References Cited

U.S. PATENT DOCUMENTS

| | | | |
|---|---|---|---|
| 3,752,196 | A | 8/1973 | Mayeur |
| 5,717,423 | A | 2/1998 | Parker |
| 5,793,918 | A | 8/1998 | Hogan |
| 5,848,932 | A | 12/1998 | Adams |
| 6,189,246 | B1 | 2/2001 | Gorthala |
| 6,880,826 | B2 | 4/2005 | Inoue |
| 6,940,209 | B2 | 9/2005 | Henderson |
| 7,019,898 | B2 | 3/2006 | Page |
| 7,331,858 | B2 | 2/2008 | McComb |
| 7,510,476 | B2 | 3/2009 | Kobayashi |
| 7,514,132 | B2 | 4/2009 | Aida |
| 8,216,051 | B2 | 7/2012 | Rasmussen |
| 8,485,881 | B2 | 7/2013 | Griswold |
| 8,552,883 | B1 | 10/2013 | Su |

(Continued)

OTHER PUBLICATIONS

Notice of Allowance dated Feb. 24, 2020 for U.S. Appl. No. 16/177,248 (pp. 1-7).

(Continued)

*Primary Examiner* — Robert J Utama
*Assistant Examiner* — Jeffrey K Wong
(74) *Attorney, Agent, or Firm* — Weaver Austin Villeneuve & Sampson LLP

(57) ABSTRACT

Gaming systems, methods, and machines provided herein may include dynamic displays in which sets of movable display units are arranged such that movable display units of each set are translatable along corresponding non-parallel first axes.

20 Claims, 57 Drawing Sheets

(56) References Cited

U.S. PATENT DOCUMENTS

| | | | |
|---|---|---|---|
| 8,956,216 | B1 | 2/2015 | Lesourd |
| 8,979,636 | B2 | 3/2015 | Brooks |
| 9,269,283 | B2 | 2/2016 | Jurewicz |
| 10,208,934 | B2 | 2/2019 | Jurewicz |
| 2003/0060271 | A1 | 3/2003 | Gilmore |
| 2004/0018866 | A1 | 1/2004 | Inoue |
| 2004/0209692 | A1 | 10/2004 | Schober |
| 2007/0099693 | A1 | 5/2007 | Nakashima |
| 2007/0293293 | A1 | 12/2007 | Baerlocher |
| 2011/0235332 | A1 | 9/2011 | Cheung |
| 2014/0259824 | A1 | 9/2014 | Jurewicz |

OTHER PUBLICATIONS

Notice of Allowance dated Oct. 5, 2020 for U.S. Appl. No. 16/213,830 (pp. 1-5).

Office Action (Notice of Allowance and Fees Due (PTOL-85)) dated Nov. 4, 2021 for U.S. Appl. No. 16/855,975 (pp. 1-5).

Office Action dated Apr. 24, 2020 for U.S. Appl. No. 16/213,830 (pp. 1-12).

Office Action dated Jun. 10, 2021 for U.S. Appl. No. 16/855,975 (pp. 1-5).

Office Action dated Nov. 8, 2019 for U.S. Appl. No. 16/177,248 (pp. 1-10).

U.S. Appl. No. 16/213,830, filed Dec. 7, 2018, Winston.

Office Action (Non-Final Rejection) dated Jan. 11, 2022 for U.S. Appl. No. 17/247,420 (pp. 1-6).

Office Action (Non-Final Rejection) dated Nov. 25, 2022 for U.S. Appl. No. 17/651,571 (pp. 1-6).

Office Action (Notice of Allowance and Fees Due (PTOL-85)) dated Jun. 5, 2023 for U.S. Appl. No. 17/651,571 (pp. 1-5).

Office Action (Notice of Allowance and Fees Due (PTOL-85)) dated Jun. 6, 2022 for U.S. Appl. No. 17/247,420 (pp. 1-5).

Office Action dated Aug. 11, 2022 for U.S. Appl. No. 17/449,635 (pp. 1-17).

Office Action (Final Rejection) dated Dec. 7, 2022 for U.S. Appl. No. 17/449,635 (pp. 1-15).

Office Action (Notice of Allowance and Fees Due (PTOL-85)) dated Mar. 8, 2023 for U.S. Appl. No. 17/449,635 (pp. 1-8).

Office Action (Non-Final Rejection) dated May 25, 2023 for U.S. Appl. No. 17/935,048 (pp. 1-10).

Office Action (Notice of Allowance and Fees Due (PTOL-85)) dated Nov. 21, 2023 for U.S. Appl. No. 17/935,048 (pp. 1-5).

Australian Examination Report No. 1 issued in App. No. AU2019232848, dated Jun. 19, 2024, 5 pages.

Office Action (Non-Final Rejection) dated Dec. 27, 2024 for U.S. Appl. No. 18/430,347 (pp. 1-11).

ELECTRONIC GAMING MACHINE WITH DYNAMIC DISPLAY

CROSS-REFERENCE TO RELATED APPLICATIONS

This application is a continuation under 35 U.S.C. § 120 of U.S. patent application Ser. No. 17/449,635, filed Sep. 30, 2021, and titled "ELECTRONIC GAMING MACHINE WITH DYNAMIC DISPLAY," which itself claims benefit of priority to U.S. Patent Application No. 63/200,290, filed Feb. 26, 2021, and titled "ELECTRONIC GAMING MACHINE WITH DYNAMIC DISPLAY" and is related to U.S. Application Nos. 62/733,058, filed Sep. 18, 2018, titled "ELECTRONIC GAMING MACHINE WITH DYNAMIC DISPLAY"; Ser. No. 16/177,248, filed Oct. 31, 2018, titled "ELECTRONIC GAMING MACHINE WITH DYNAMIC DISPLAY"; and Ser. No. 16/855,975, filed Apr. 22, 2020, titled "ELECTRONIC GAMING MACHINE WITH DYNAMIC DISPLAY," all of which are hereby incorporated herein by reference in their entireties and for all purposes.

BACKGROUND

The field of disclosure relates generally to electronic gaming, and more particularly to systems and methods relating to play of an electronic game on a gaming machine having a dynamic display.

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

In some implementations, an electronic gaming system may be provided that includes a housing, a display frame including one or more first display panels encircling an opening, a plurality of movable display units arranged in an array within the opening, each movable display unit including a second display panel, and a plurality of linear drive mechanisms, each linear drive mechanism connected with one of the movable display units and configured to translate the movable display unit connected therewith relative to the housing and along a first axis responsive to receipt of a control signal. The electronic gaming system may also include a game controller that includes one or more processors and one or more memory devices. In such an electronic gaming system, the one or more first display panels may define a nominal display plane, the one or more first display panels may be fixed in space relative to the housing, the first axes may be perpendicular to the nominal display plane, the second display panels may be parallel to the nominal display plane, the one or more processors, the one or more memory devices, the one or more first display panels, the second display panels, and the linear drive mechanisms may be operably connected, and the one or more memory devices may store computer-executable instructions for controlling the one or more processors to: present a wagering game using the one or more first display panels and the second display panels, and cause the linear drive mechanisms to be selectively actuated to cause the movable display units connected therewith to translate during presentation of the wagering game in association with an occurrence of one or more events during presentation of the wagering game.

In some implementations of the electronic gaming system, the wagering game may be a reel-based wagering game, and the one or more memory devices may further store additional computer-executable instructions for further controlling the one or more processors to: cause one or more of the movable display units to each display a reel stop for the reel-based wagering game during play of the wagering game, and cause the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict a winning outcome. Alternatively, the one or more memory devices may further store additional computer-executable instructions for further controlling the one or more processors to cause the linear drive mechanisms for the movable display units in the first subset of the movable display units to translate the movable the movable display units in the first subset of the movable display units to a displaced position relative to the nominal display plane when the reel stops displayed by the movable display units in a second subset of the movable display units depict a winning outcome.

In some implementations of the electronic gaming system, the wagering game may be a reel-based wagering game, and the one or more memory devices may further store additional computer-executable instructions for further controlling the one or more processors to cause one or more of the movable display units to each display a reel stop for the reel-based wagering game during play of the wagering game, and cause the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict reel stops that are to remain unchanged for a successive play of the wagering game. Alternatively, the one or more memory devices may further store additional computer-executable instructions for further controlling the one or more processors to cause the linear drive mechanisms for the movable display units in a first subset of the movable display units to translate the movable display units in the first subset of the movable display units to a displaced position relative to the nominal display plane when the reel stops displayed by the movable display units in a second subset of the movable display units depict reel stops that are to remain unchanged for a successive play of the wagering game.

In some implementations of the electronic gaming system, the wagering game may be a reel-based wagering game, and the one or more memory devices may further store additional computer-executable instructions for further controlling the one or more processors to cause one or more of the movable display units to each display a reel stop for the reel-based wagering game during play of the wagering game, and cause the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict reel stops that form a winning pattern for the wagering game. Alternatively, the one or more memory devices may further store additional computer-executable instructions for further controlling the one or more processors to cause the linear drive mechanisms for the movable display units in a first subset of the movable display units to translate the movable display units in the first subset of the movable display units to a displaced position relative to the nominal display plane when the reel stops displayed by the movable display units in a second subset of the movable display units depict reel stops that form a winning pattern for the wagering game.

In some implementations of the electronic gaming system, the movable display units may be arranged in a rectangular array within the opening, and the second display panel of each movable display unit may have four edges defining a rectangular shape when viewed along the corresponding first axis.

In some implementations of the electronic gaming system, each movable display unit may further include a cover glass and a touch-screen interface configured to receive touch input from a user. The cover glass and the touch-screen interface may, when viewed along the first axis, overlay one or more the movable display units and/or the display frame.

In some implementations of the electronic gaming system, each movable display unit may further include four side panels that are each perpendicular to the second display panel of the movable display unit and that each extend from a location proximate to a different one of the edges of the second display panel and towards the linear drive mechanism connected with that movable display unit, and one or more illumination devices configured to illuminate at least part of each side panel in response to receipt of an illumination control signal from the game controller.

In some implementations of the electronic gaming system, each movable display unit may further include four side panels that are each perpendicular to the second display panel of the movable display unit and that each extend from a location proximate to a different one of the edges of the second display panel and towards the linear drive mechanism connected with that movable display unit, and the side panels of each movable display unit may each include a third display panel that is operatively connected with the game controller and configured to present graphical content in response to receipt of instructions from the game controller.

In some implementations of the electronic gaming system, each movable display unit may further include four side panels and an actuation mechanism, each of the side panels may be movably mounted in the corresponding movable display unit and operatively connected with the actuation mechanism, each actuation mechanism may be configured to cause the side panels of the corresponding movable display unit to transition between a first configuration and a second configuration responsive to receipt of one or more control signals from the game controller, the side panels of each movable display unit, in the first configuration, may be positioned behind the second display panel of the corresponding movable display unit when viewed along the first axis with the linear drive mechanism of the corresponding movable display unit located behind the second display panel, and the side panels of each movable display unit, in the second configuration, may each be positioned such that a major surface of each side panel is positioned with an edge proximate to one of the edges of the second display of the corresponding movable display unit and such that the major surface is substantially parallel with the second display panel of the corresponding movable display unit.

In some implementations of the electronic gaming system, the side panels of each movable display unit may each include a third display panel that is operatively connected with the game controller and configured to present graphical content in response to receipt of instructions from the game controller.

In some implementations of the electronic gaming system, each movable display unit may further include: a rotational actuator that supports, directly or indirectly, the second display panel of the movable display unit with respect to the linear drive mechanism of the movable display unit, and the rotational actuator may be configured to rotate the second display panel directly or indirectly supported thereby about at least a second axis that is perpendicular to the first axis of the linear drive mechanism responsive to receipt of one or more signals from the game controller.

In some implementations of the electronic gaming system, each movable display unit may have a second display panel with a single pixel, and the linear drive mechanisms for edge-to-edge-adjacent movable display units may be positioned at different elevational offsets so that the linear drive mechanisms for such edge-to-edge-adjacent movable display units overlap one another when viewed along the first axis.

In some implementations, a method may be provided that includes: a) providing an electronic gaming system including: a housing, a display frame including one or more first display panels encircling an opening, a plurality of movable display units arranged in an array within the opening, each movable display unit including a second display panel, and a plurality of linear drive mechanisms, each linear drive mechanism connected with one of the movable display units and configured to translate the movable display unit connected therewith relative to the housing and along a first axis responsive to receipt of a control signal. In such an electronic gaming system, the one or more first display panels may define a nominal display plane, the one or more first display panels may be fixed in space relative to the housing, the first axes may be perpendicular to the nominal display plane, and the second display panels may be parallel to the nominal display plane. The method may further include b) presenting a wagering game using the one or more first display panels and the second display panels and c) causing the linear drive mechanisms to be selectively actuated to cause the movable display units connected therewith to translate relative to the display frame during presentation of the wagering game in association with an occurrence of one or more events during presentation of the wagering game.

In some implementations of the method, the wagering game may be a reel-based wagering game and the method may further include causing one or more of the movable display units to each display a reel stop for the reel-based wagering game during play of the wagering game, and causing the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict a winning outcome. Alternatively, the linear drive mechanisms for the movable display units in the first subset of the movable display units may be caused to translate the movable the movable display units in the first subset of the movable display units to a displaced position relative to the nominal display plane when the reel stops displayed by the movable display units in a second subset of the movable display units depict a winning outcome.

In some implementations of the method, the wagering game may be a reel-based wagering game and the method may further include causing one or more of the movable display units to each display a reel stop for the reel-based wagering game during play of the wagering game, and causing the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict reel stops that are to remain unchanged for a successive play of the wagering game. Alternatively, the linear drive mechanisms for the movable display units in a first subset of the movable display units may be caused to translate the movable display units in the first subset of the movable display units to a displaced position relative to the nominal display plane when the reel stops displayed by the movable display units in a second subset of the movable display units depict reel stops that are to remain unchanged for a successive play of the wagering game In some implementations of the method, the wagering game may be a reel-based wagering game and the method may further include causing one or more of the movable display units to each display a reel stop for the reel-based wagering game during play of the wagering game, and causing the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict reel stops that form a winning pattern for the wagering game. Alternatively, the linear drive mechanisms for the movable display units in a first subset of the movable display units to translate the movable display units in the first subset of the movable display units to a displaced position relative to the nominal display plane when the reel stops displayed by the movable display units in a second subset of the movable display units depict reel stops that form a winning pattern for the wagering game.

In some implementations of the method, the movable display units may be arranged in a rectangular array within the opening, and the second display panel of each movable display unit may have four edges defining a rectangular shape when viewed along the corresponding first axis. In some such implementations, each movable display unit further may include four side panels that are each perpendicular to the second display panel of the movable display unit and that each extend from a location proximate to a different one of the edges of the second display panel and towards the linear drive mechanism connected with that movable display unit, and one or more illumination devices configured to illuminate at least part of each side panel in response to receipt of an illumination control signal. In such implementations, the method may further include selectively activating one or more of the illumination devices by providing the corresponding illumination control signal in coordination with actuation of one or more of the linear drive mechanisms. In some other such implementations, each movable display unit may further include four side panels that are each perpendicular to the second display panel of the movable display unit and that each extend from a location proximate to a different one of the edges of the second display panel and towards the linear drive mechanism connected with that movable display unit, and the side panels of each movable display unit may each include a third display panel that is configured to present graphical content in response to receipt of instructions. In such implementations, the method may further include causing graphical content to be displayed on one or more of the third display panels in coordination with actuation of one or more of the linear drive mechanisms.

In some implementations of the method, each movable display unit may further include four side panels and an actuation mechanism, each of the side panels may be movably mounted in the corresponding movable display unit and operatively connected with the actuation mechanism, each actuation mechanism may be configured to cause the side panels of the corresponding movable display unit to transition between a first configuration and a second configuration responsive to receipt of one or more control signals, the side panels of each movable display unit, in the first configuration, may be positioned behind the second display panel of the corresponding movable display unit when viewed along the first axis with the linear drive mechanism of the corresponding movable display unit located behind the second display panel, and the side panels of each movable display unit, in the second configuration, may each be positioned such that a major surface of each side panel is positioned with an edge proximate to one of the edges of the second display of the corresponding movable display unit and such that the major surface is substantially parallel with the second display panel of the corresponding movable display unit. In such implementations, the method may further include causing, by providing at least some of the one or more control signals, one or more of the actuation mechanisms to cause the side panels of one or more of first movable display units of the movable display units to transition to the second configuration from the first configuration when the first movable display units are in an extended position. In some such implementations of the method, the side panels of each movable display unit may each include a third display panel, and the method may further include causing one or more of the third display panels to display graphical content in coordination with actuation of one or more of the linear drive mechanisms.

In some implementations of the method, each movable display unit may further include a rotational actuator that supports, directly or indirectly, the second display panel of the movable display unit with respect to the linear drive mechanism of the movable display unit. In such implementations, the rotational actuator may be configured to rotate the second display panel directly or indirectly supported thereby about at least a second axis that is perpendicular to the first axis of the linear drive mechanism, and the method may further include actuating one or more of the rotational actuators in coordination with actuation of one or more of the linear drive mechanisms.

In some implementations, a non-transitory, computer-readable storage device storing computer-executable instructions for controlling one or more processors of a gaming machine may be provided. Such a storage device may store computer-executable instructions for controlling the one or more processors of the gaming machine to: a) present a wagering game using one or more first display panels of the gaming machine that are part of a stationary display frame of the gaming machine and using a plurality of second display panels of the gaming machine, where the gaming machine includes a plurality of movable display units arranged in an array within an opening of the display panel and each movable display unit includes at least one of the second display panels, and b) cause linear drive mechanisms of the gaming machine that are each connected with one of the movable display units to be selectively actuated to cause the movable display units connected therewith to translate in a direction perpendicular to a nominal display plane defined by the one or more first display panels during presentation of the wagering game in association with an occurrence of one or more events during presentation of the wagering game.

In some implementations, the one or more first display panels may define a nominal display plane, the wagering game may be a reel-based wagering game, and the storage device may store computer-executable instructions for controlling the one or more processors of the gaming machine to: cause one or more of the movable display units to each display a reel stop for the reel-based wagering game during play of the wagering game, and cause the linear drive mechanisms connected with the movable display units in a first subset of the movable display units to translate the movable display units in the first subset of the movable display units to a displaced position relative to the nominal display plane when the reel stops displayed by the movable display units in the first subset of the movable display units depict a winning outcome. Alternatively, the storage device may store computer-executable instructions for controlling the one or more processors of the gaming machine to cause the linear drive mechanisms connected with the movable display units in a first subset of the movable display units to translate the movable display units in the first subset of the movable display units to a displaced position relative to the nominal display plane when the reel stops displayed by the movable display units in a second subset of the movable display units depict a winning outcome.

In some implementations, the one or more first display panels may define a nominal display plane, the wagering game may be a reel-based wagering game, and the storage device may store computer-executable instructions for controlling the one or more processors of the gaming machine to: cause one or more of the movable display units to each display a reel stop for the reel-based wagering game during play of the wagering game, and cause the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict reel stops that are to remain unchanged for a successive play of the wagering game. Alternatively, the storage device may store computer-executable instructions for controlling the one or more processors of the gaming machine to cause the linear drive mechanisms for the movable display units in a first subset of the movable display units to translate the movable display units in the first subset of the movable display units to a displaced position relative to the nominal display plane when the reel stops displayed by the movable display units in a second subset of the movable display units depict reel stops that are to remain unchanged for a successive play of the wagering game.

In some implementations, the one or more first display panels may define a nominal display plane, the wagering game may be a reel-based wagering game, and the storage device may store computer-executable instructions for controlling the one or more processors of the gaming machine to: cause one or more of the movable display units to each display a reel stop for the reel-based wagering game during play of the wagering game, and cause the linear drive mechanisms for the movable display units in a first subset of the movable display units to translate the movable display units in the first subset of the movable display units to a displaced position relative to the nominal display plane when the reel stops displayed by the movable display units in the first subset of the movable display units depict reel stops that form a winning pattern for the wagering game. Alternatively, the storage device may store computer-executable instructions for controlling the one or more processors of the gaming machine to cause the linear drive mechanisms for the movable display units in a first subset of the movable display units to translate the movable display units in the first subset of the movable display units to a displaced position relative to the nominal display plane when the reel stops displayed by the movable display units in a second subset of the movable display units depict reel stops that form a winning pattern for the wagering game.

In some implementations of the non-transitory, computer-readable storage device, the computer-executable instructions stored thereon may be configured to work with an array of movable display units that are arranged in a rectangular array within the opening and with movable display units where the second display panel of each movable display unit has four edges defining a rectangular shape when viewed along the corresponding first axis.

In some implementations, each movable display unit may further include four side panels that are each perpendicular to the second display panel of the movable display unit and that each extend from a location proximate to a different one of the edges of the second display panel and towards the linear drive mechanism connected with that movable display unit, and one or more illumination devices configured to illuminate at least part of each side panel in response to receipt of an illumination control signal. In such implementations, the non-transitory computer-readable storage device may store further computer-executable instructions for further controlling one or more processors to selectively activate one or more of the illumination devices by providing a corresponding illumination control signal in coordination with actuation of one or more of the linear drive mechanisms.

In some implementations, each movable display unit may further include four side panels that are each perpendicular to the second display panel of the movable display unit and that each extend from a location proximate to a different one of the edges of the second display panel and towards the linear drive mechanism connected with that movable display unit, and the side panels of each movable display unit may each include a third display panel that is operatively connected with the one or more processors and configured to present graphical content in response to receipt of instructions from the one or more processors. In such implementations, the non-transitory computer-readable storage device may store further computer-executable instructions for further controlling one or more processors to cause graphical content to be displayed on one or more of the third display panels in coordination with actuation of one or more of the linear drive mechanisms.

In some implementations, each movable display unit may further include four side panels and an actuation mechanism, each of the side panels may be movably mounted in the corresponding movable display unit and operatively connected with the actuation mechanism, each actuation mechanism may be configured to cause the side panels of the corresponding movable display unit to transition between a first configuration and a second configuration responsive to receipt of one or more control signals from the one or more processors, the side panels of each movable display unit, in the first configuration, may be positioned behind the second display panel of the corresponding movable display unit when viewed along the first axis with the linear drive mechanism of the corresponding movable display unit located behind the second display panel, and the side panels of each movable display unit, in the second configuration, may each be positioned such that a major surface of each side panel is positioned with an edge proximate to one of the edges of the second display of the corresponding movable display unit and such that the major surface is substantially parallel with the second display panel of the corresponding movable display unit. In such implementations, the non-transitory computer-readable storage device may store further computer-executable instructions for further controlling one or more processors to cause one or more of the actuation mechanisms to cause the side panels of one or more of first movable display units of the movable display units to transition to the second configuration from the first configuration when the first movable display units are in an extended position.

In some such implementations, the side panels of each movable display unit may each include a third display panel and the non-transitory computer-readable storage device may store further computer-executable instructions for further controlling one or more processors to cause one or more of the third display panels to display graphical content in coordination with actuation of one or more of the linear drive mechanisms.

In some implementations, each movable display unit may further include a rotational actuator that supports, directly or indirectly, the second display panel of the movable display unit with respect to the linear drive mechanism of the movable display unit, and the rotational actuator may be configured to rotate the second display panel directly or indirectly supported thereby about at least a second axis that is perpendicular to the first axis of the linear drive mechanism. In such implementations, the non-transitory computer-readable storage device may store further computer-executable instructions for further controlling one or more processors to actuate one or more of the rotational actuators in coordination with actuation of one or more of the linear drive mechanisms.

In some implementations, an electronic gaming system may be provided that includes a housing, one or more sets of movable display units, each set of movable display units having a plurality of movable display units, and each movable display unit including a corresponding display panel, a plurality of linear drive mechanisms, each linear drive mechanism connected with one of the movable display units and configured to translate the movable display unit connected therewith relative to the housing and along a first axis responsive to receipt of a control signal, and a game controller that includes one or more processors and one or more memory devices. In such implementations, the first axes of the movable display units within each set of movable display units may be non-parallel to one another, the one or more processors, the one or more memory devices, the one or more display panels, and the linear drive mechanisms may be operably connected, and the one or more memory devices may store computer-executable instructions for controlling the one or more processors to present a game of chance using the display panels and cause the linear drive mechanisms to be selectively actuated so as to cause the movable display units connected the actuated linear drive mechanisms to translate during presentation of the game of chance in association with an occurrence of one or more events during presentation of the game of chance.

In some implementations, at least one of the display panels is a light-emitting diode (LED) display panel, a micro-LED display panel, an organic LED (OLED) display panel, a plastic OLED (POLED) display panel, or a liquid-crystal display (LCD) panel.

In some implementations, there may be multiple sets of movable display units, with the sets of movable display units being arranged side-by-side along a second axis.

In some implementations, the first axes for each set of movable display units may intersect at a common point.

In some implementations, the display panels of the movable display units in each set may be arcuate and may have radii that are selected so as to allow the display panels to all be co-radial when the movable display units of that set are placed into a first position.

In some implementations, the linear drive mechanisms may be fixed in space with respect to the housing.

In some implementations, the system may further include a transmissive display element that is positioned in front of the movable display units such that translation of the movable display units away from the linear drive mechanisms causes the movable display units to move closer to the transmissive display element.

In some implementations, the system may further include an arcuate cover glass that has a surface facing the one or more sets of movable display units that is positioned such that a gap exists between the surface and the display panels of the movable display units when the display panels of the movable display units are in a fully extended state.

In some implementations, the display panel of each movable display may be in the form of a planar or slightly arcuate shape such as a square, a rectangle, a triangle, a circle, a pentagon, a hexagon, or a regular polygon.

In some implementations, the system may further include, for each set of movable display units, a reel basket, a motor configured to rotate the reel basket, and a reel strip. In such implementations, the reel strip may be mounted to the reel basket so as to provide a cylindrical surface, the movable display units for that set of movable display units may be encircled by the reel strip, and the reel strip for at least a first set of movable display units of the sets of movable display units may have at least one region through which each of the display panels of the movable display units of the first set of movable display units is visible when the reel strip is rotated such that the at least one region is proximate thereto.

In some implementations, each region may be an opening sized to allow one of the display panels of the movable display units associated with the reel strip for the first set of movable display units to be translated therethrough.

In some implementations, the one or more memory devices may store computer-executable instructions for controlling the one or more processors to cause at least a first movable display unit of the first set of movable display units to translate the display panel thereof along the first axis thereof and through the opening of a first region of the at least one region responsive to the reel basket associated therewith being caused to rotate and then ceasing rotation with the first region aligned with the first movable display unit.

In some implementations, each reel strip may be associated with movable display units having display panels of the same size and shape, and each opening for each reel strip may have a shape that matches the shape of the display panels of the movable display units associated therewith.

In some implementations, the region of each reel strip may be a transparent region of the reel strip.

In some implementations, the system may further include, for each set of movable display units, a corresponding rotatable support structure and a corresponding motor. In such implementations, the rotatable support structures may be configured to rotate about a common rotational axis, each rotatable support structure may be configured to rotate responsive to rotational input received from the corresponding motor, the movable display units in each set of movable display units may be mounted to the corresponding rotatable support structure such that the first axes of those movable display units radiate outward from the common rotational axis, and the movable display units in each set of movable display units may rotate with the rotatable support structure associated therewith.

In some implementations, there may be a plurality of sets of movable display units, the electronic gaming system may include a plurality of electronic gaming machines that are communicatively connected and that each have at least one of the sets of movable display units, and the one or more memory devices may store computer-executable instructions for controlling the one or more processors to cause the movable display units for the plurality of electronic gaming machines to actuate in a coordinated manner.

In some implementations, the coordinated manner may involve the movable display units of the electronic gaming machines each being caused to undergo similar movements in synchronicity with one another.

In some implementations, the coordinated manner may involve the movable display units of the electronic gaming machines being actuated such that it appears that a visual effect moves from one of the electronic gaming machines to another of the electronic gaming machines.

In some implementations, the game of chance may be a slot machine game.

In some implementations, each movable display unit may be caused to show a symbol that is part of an outcome of the game of chance responsive to a play of the game of chance.

These and other implementations will be evident from the discussion below, and the disclosure is not limited to the above-listed specific implementations.

BRIEF DESCRIPTION OF THE DRAWINGS

FIGS. 1 through 58 are intended to be illustrative only and should not be viewed as limiting this disclosure to only the depicted implementations. It is to be understood that the concepts discussed herein may be implemented in a vast number of different ways while still embodying the ideas discussed herein, and it is to be understood that this disclosure covers such alternative implementations.

DETAILED DESCRIPTION

Figure 1:
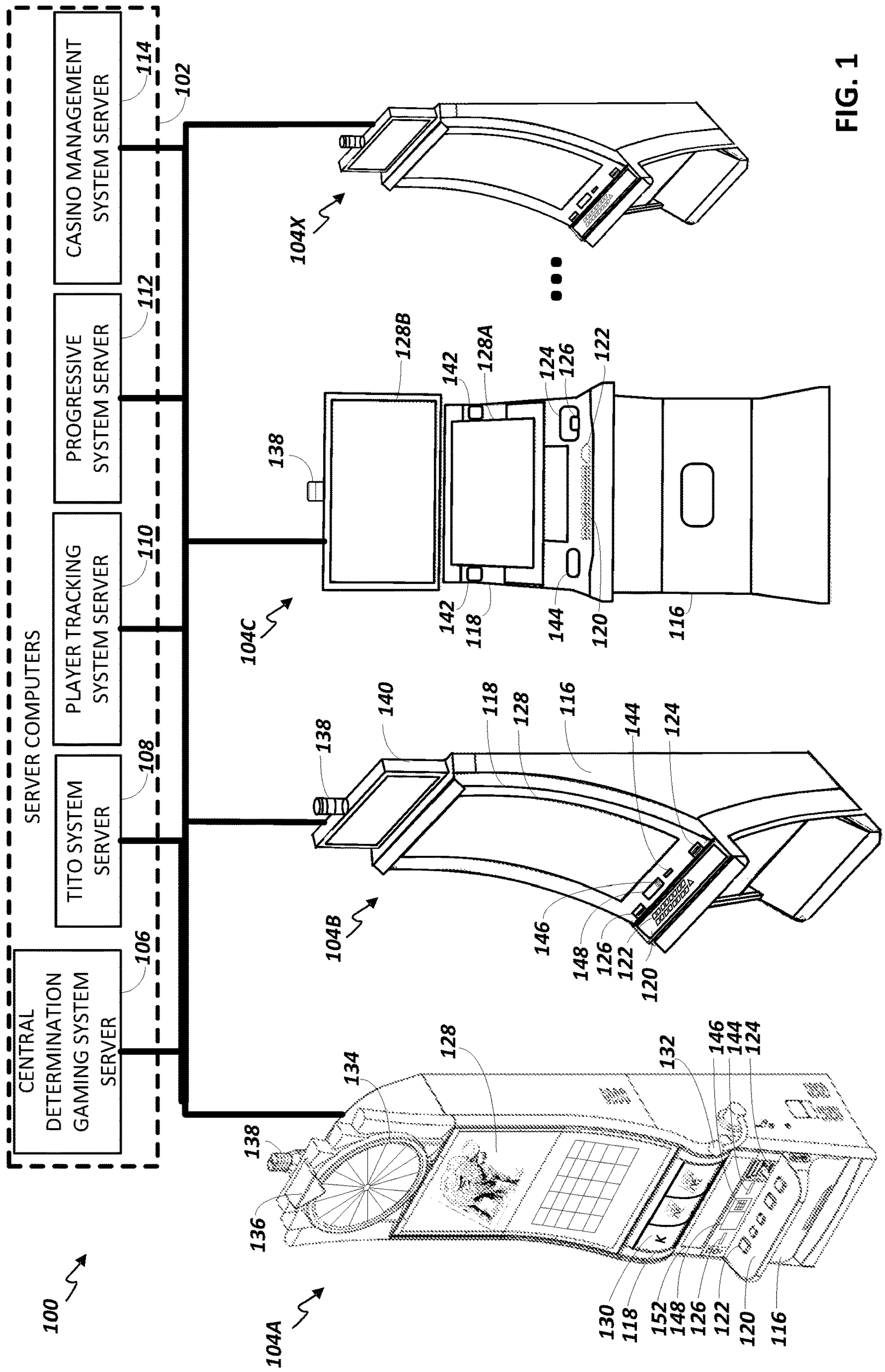
FIG. 1 is an exemplary diagram showing several EGMs networked with various gaming related servers.

The subject matter of the present disclosure relates to systems for and methods of providing electronic gaming, and more particularly, to systems including, and methods of using, dynamic displays in electronic gaming machines. In most modern gaming machines, wagering games are presented on flat or curvilinear-profile graphical displays that display graphical content depicting a game of chance in response to instructions received from a gaming controller. Discussed herein are new types of electronic gaming machines that include one or more dynamic displays. A dynamic display, as the term is used herein, refers to a display with an active display area that is composed of a plurality of movable areas surrounded by a static "display frame" that remains fixed in place. The display frame may be, for example, a rectangular shape with a rectangular opening in the middle, and may have one or more first display panels arranged to form the rectangular shape. The display frame may thus be used to display graphical content in a rectangular border area using the one or more first display panels (a single first display panel with the opening in the middle may be used, or, for example, four first display panels may be used, with each first display panel extending along a different edge of the rectangular opening.

A dynamic display may, as noted above, also include movable areas located within the opening. The movable areas may each correspond to a separate movable display unit that may independently be actuated so as to translate along a direction generally perpendicular to the nominal plane of the display frame. Each movable display unit may have its own corresponding second display panel. The movable display units discussed herein may, alternatively, be referred as mechanized display panels as well, if desired. The display panels discussed herein may, for example, be LCD, LED, micro-LED, OLED, or other types of suitable display panels. In implementations with curved or arcuate display panels, such display panels may, for example, may use such display technologies provided on a flexible substrate so as to allow the display panel to be flexed into a curved state. For example, POLED (plastic OLED) display panels may be used if desired.

Dynamic displays such as described herein may introduce a new and exciting user experience for players of electronic gaming machines, as the dynamic displays may not only provide graphical content, but may also feature physical movement of portions of the dynamic display to provide additional graphical effects and game play experiences. For example, graphical content may be displayed on the display panels of the movable display units and may be choreographed or coordinated with the movement (or non-movement) of such movable display units. Such movement and graphical content display may be part of game play, part of a celebration display, or part of an attract mode (e.g., when a gaming machine is not actively being played by a person, it may revert to displaying graphics and causing motion of the movable display units in a particular manner designed to attract a potential player).

Provided below is a general discussion of electronic gaming machines, followed by a more in-depth discussion of various implementations of dynamic displays and electronic gaming machines with dynamic displays.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XLTM model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
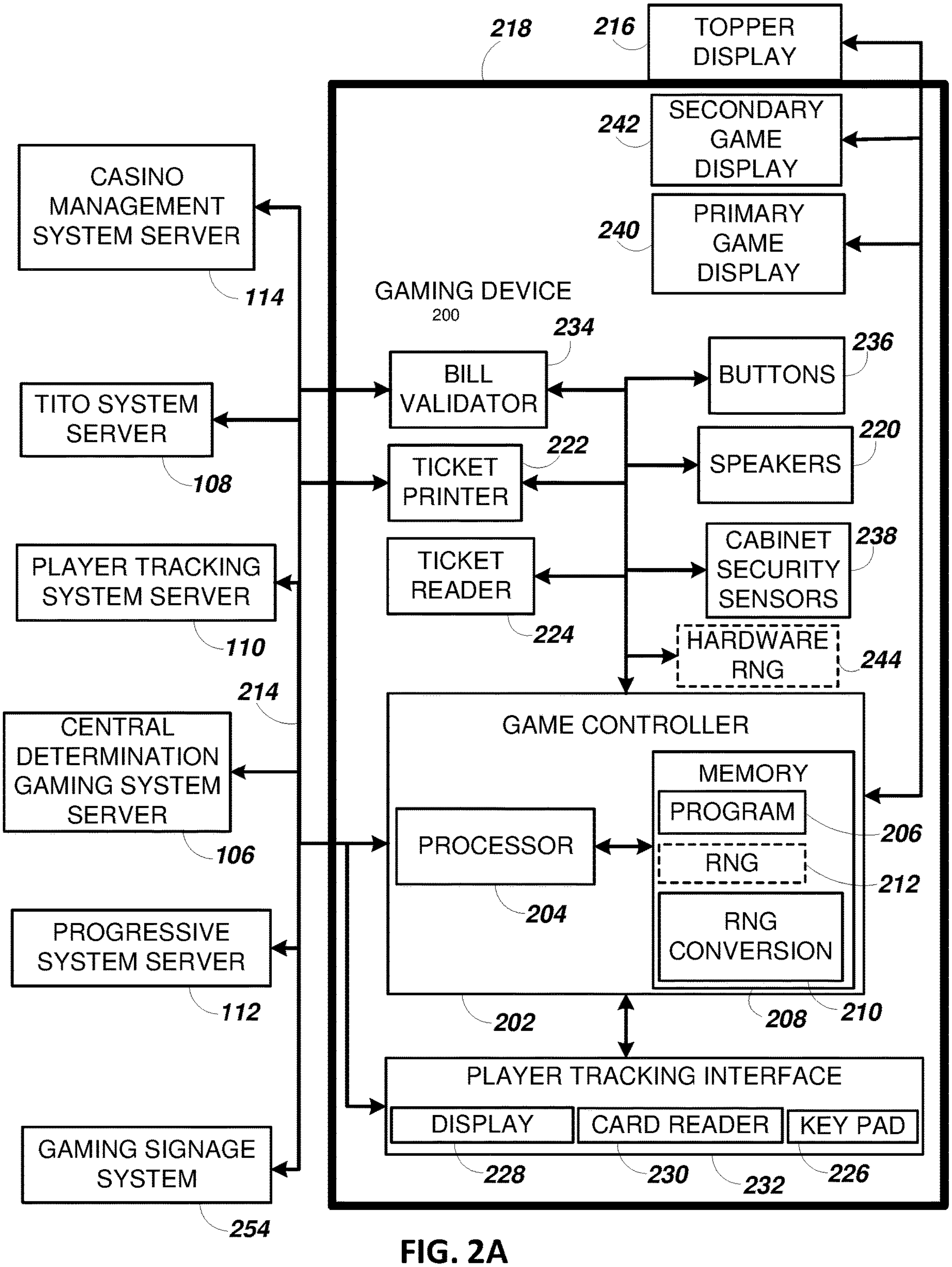
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
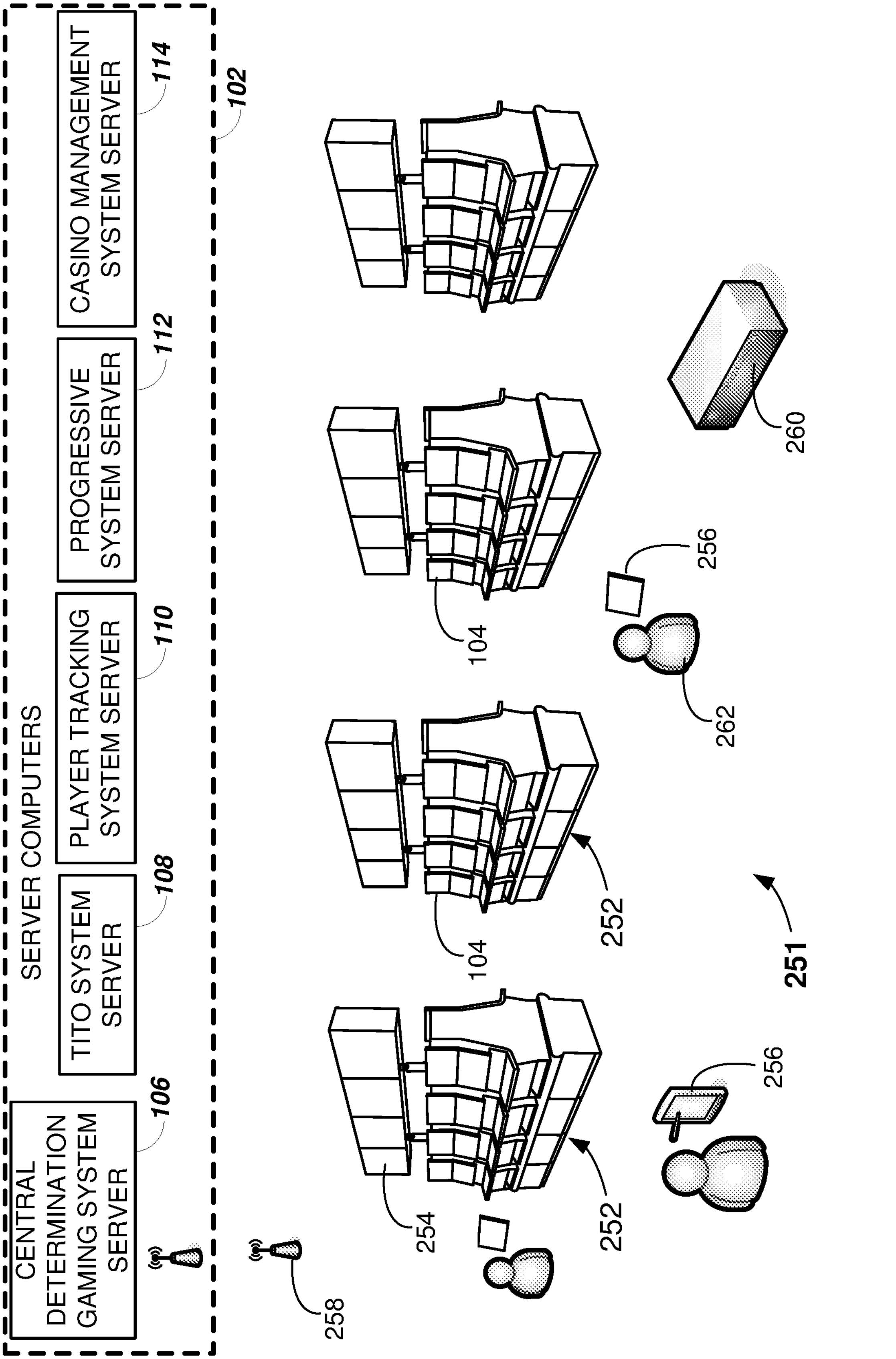
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
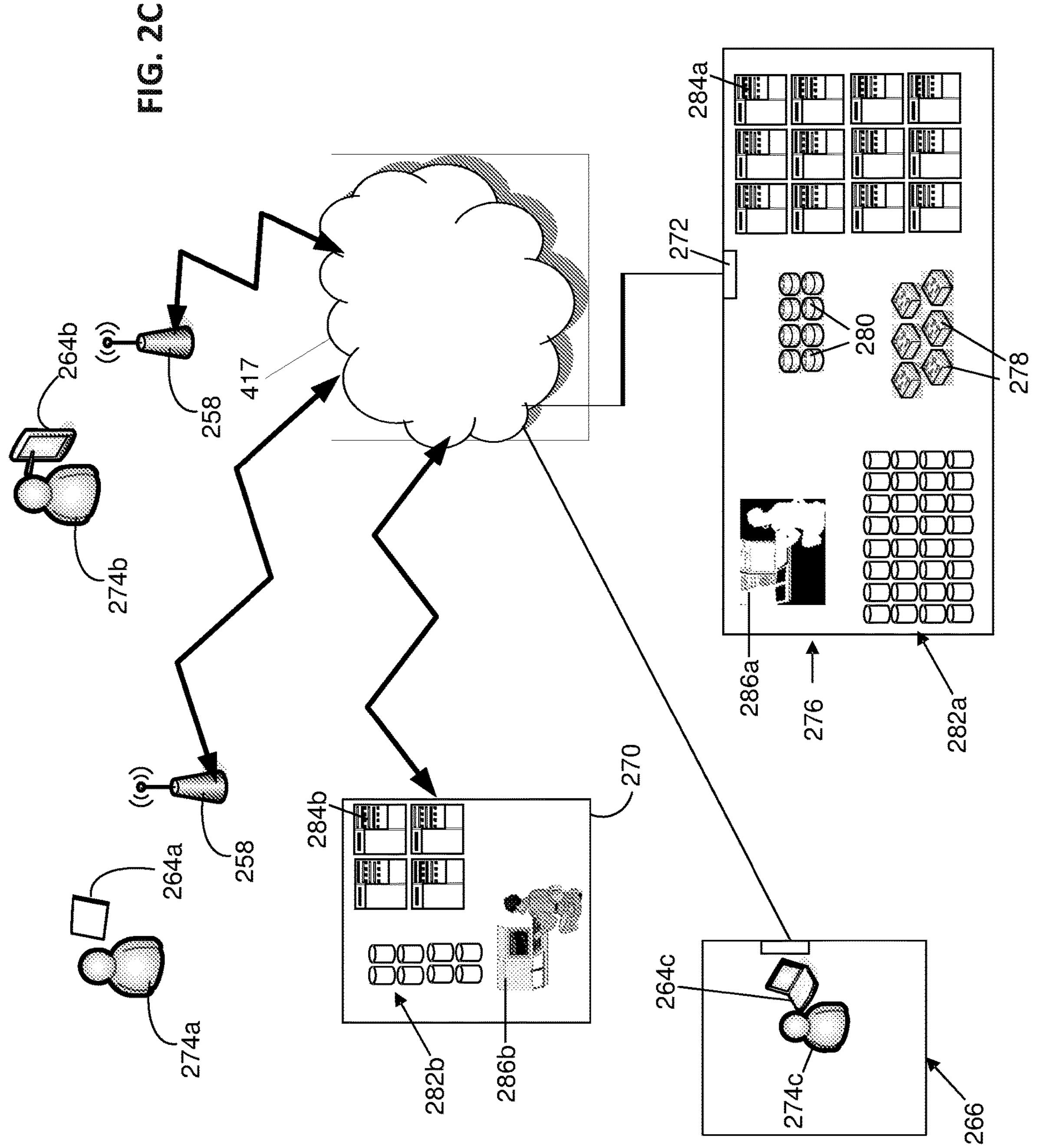
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
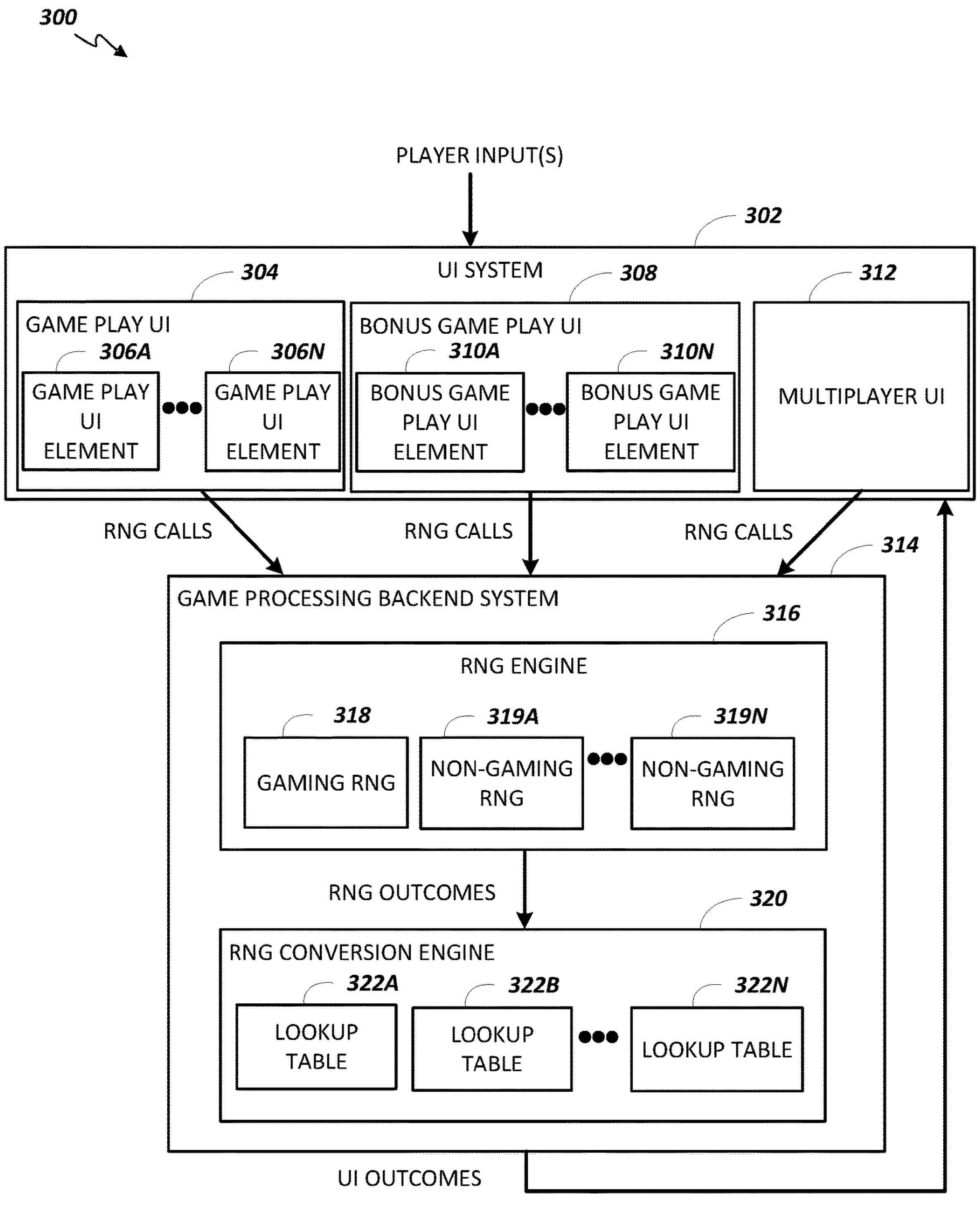
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

The various dynamic display implementations discussed below may be implemented, for example, in systems such as those described above, particularly for systems used to provide symbol-based games, e.g., reel or slot games.

Figure 4:
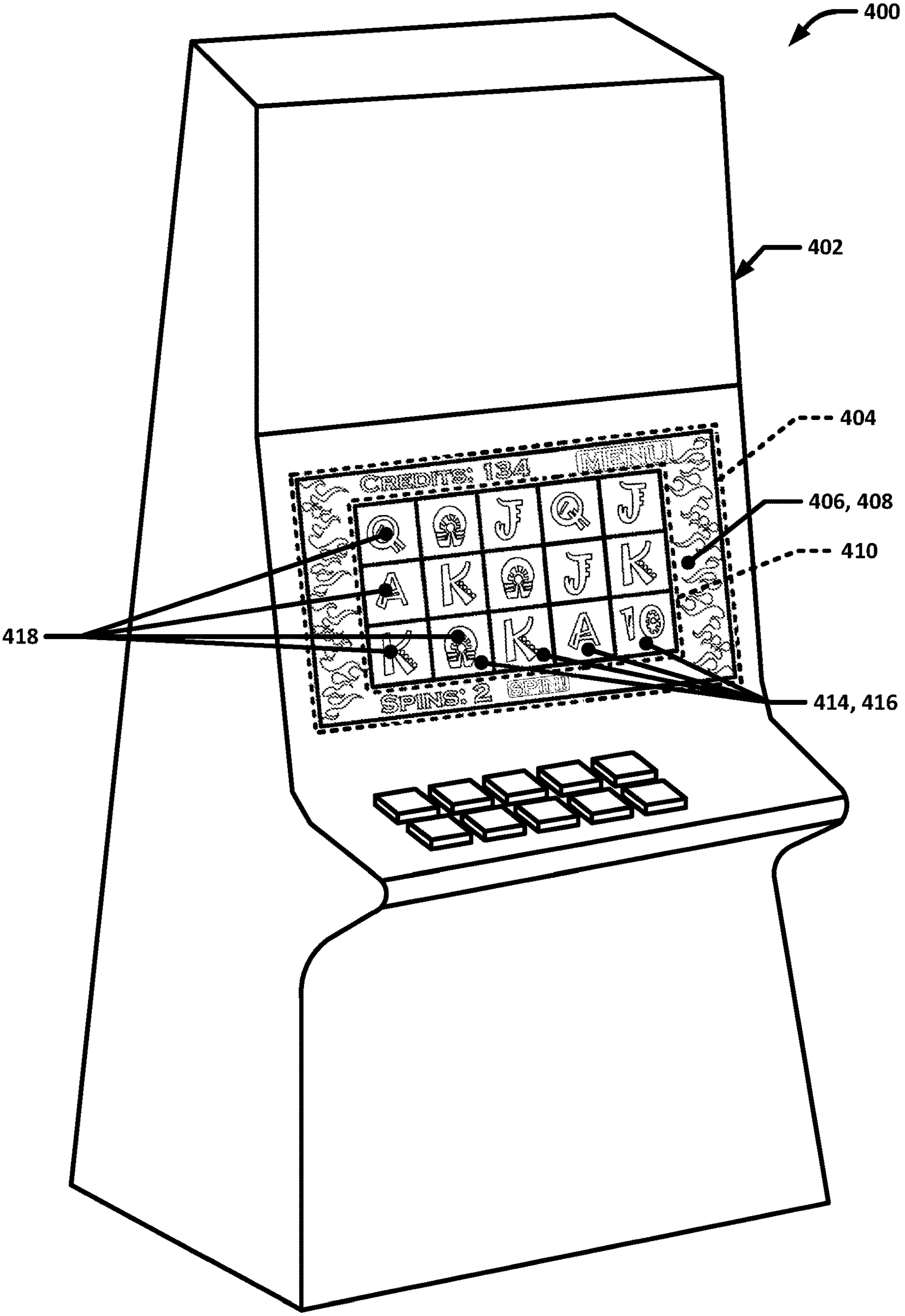
FIG. 4 depicts an electronic gaming machine that includes a cabinet or housing as well as a dynamic display.

FIG. 4 depicts an electronic gaming machine 400 that includes a cabinet or housing 402 similar to that discussed above with respect to various example electronic gaming machines as well as a dynamic display. The housing 402, in this example, includes various systems such as player user interfaces (buttons, for example), credit acceptor devices, audio devices, etc., similar to those discussed in the earlier example electronic gaming machines. However, as mentioned above, in contrast to conventional electronic gaming machines, the electronic gaming machine 400 includes a dynamic display 404. The dynamic display 404 has a display frame 406 that encircles an opening 410; the display frame 406 includes one or more first display panels 408. In this example, the display frame 406 includes a single, rectangular-shaped first display panel 408 with a rectangular opening 410 in the middle. Located within the opening 410 of the display frame 406 are a plurality of movable display units 414—in this example, there are 15 movable display units 414, each of which corresponds with a different “reel stop” 418 of a reel-based wagering game. Each movable display unit 414 includes a second display panel 416 that extends to the edges of each movable display unit 414; the one or more first display panels 408 and the second display panels 416 may form a generally continuous display surface when viewed along an axis perpendicular to the one or more first display panels 408 and when the movable display units 414 are positioned such that the second display panels 416 are nominally co-planar with the one or more first display panels 408. Generally speaking, the only interruptions in the generally continuous display surface may be at the edges of the opening 410 and at the edges of the movable display units 414, where there may be small seams visible between the one or more first display panels 408 and the second display panels 416.

As can be seen, both the one or more first display panels 408 and the second display panels 416 may display graphical content, such as graphical images or animations. In this example, the second display panels 416 display symbols for a reel-type wagering game, each corresponding with a different reel stop 418 of a virtual reel. The one or more first display panels 408, in this example, are displaying graphics of flames along the sides as well as a credit balance and remaining number of reel spins for the wagering game. The content of the one or more first display panels 408 and the second display panels 416 may be coordinated so as to present a unified, coordinated display of graphical content.

Figure 5:
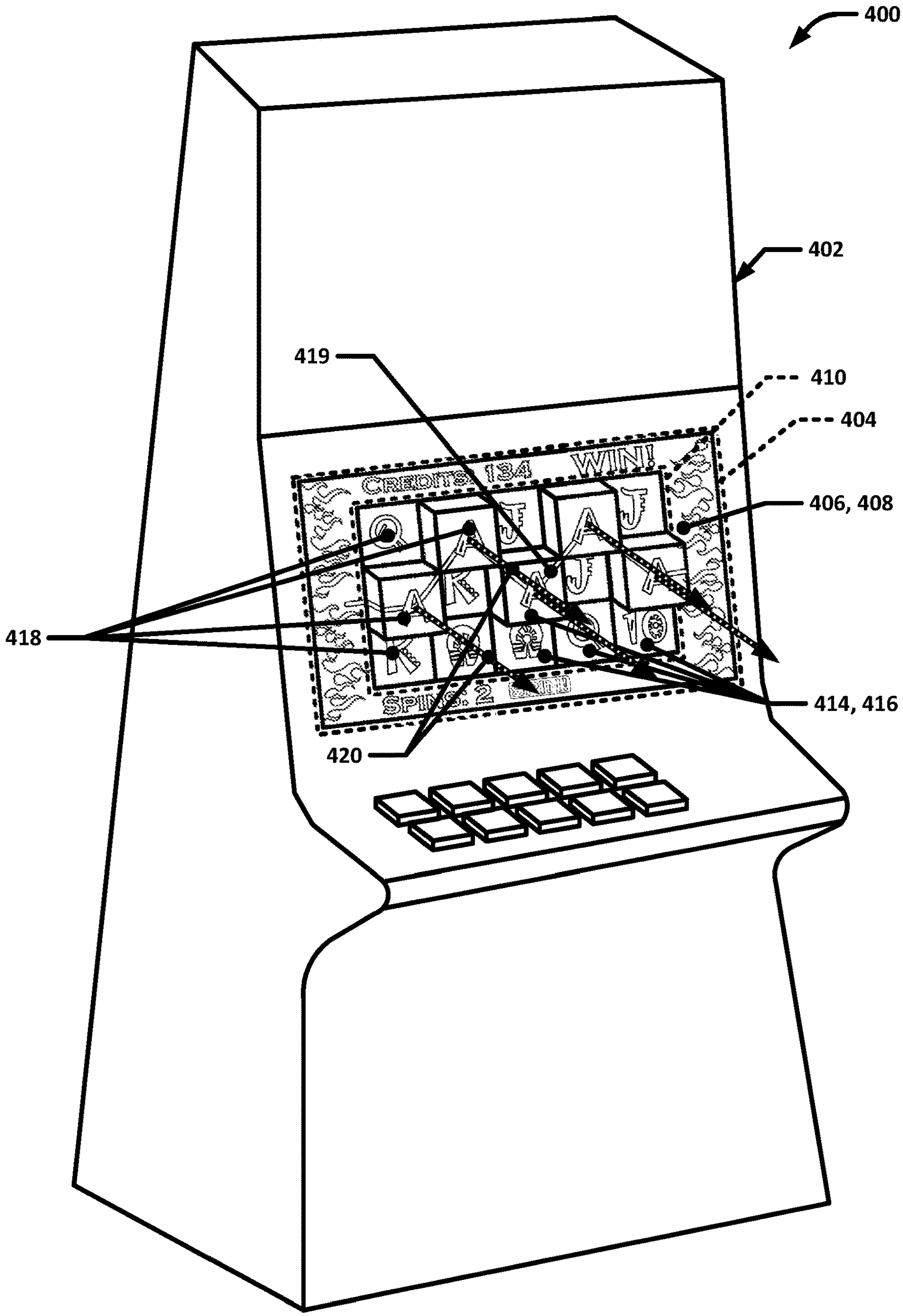
FIG. 5 depicts the electronic gaming machine of FIG. 4 with the dynamic display in a first actuated state.

FIG. 5 depicts the electronic gaming machine of FIG. 4 with the dynamic display in a first actuated state. As can be seen, five of the movable display units 414 have been translated along first axes 420 to cause those five movable display units 414 to be proud of the display frame 406. To a player, the five raised movable display units 414 will appear to have pushed out of the electronic gaming machine 400 towards the player. In this particular example, the movable display units 414 that have been translated were selected for translation since they displayed a winning pattern of reel stops 418—in this case, an “M” or inverted “W” pattern of identical reel stops (“A” reel stops in this example). Such a winning pattern may be highlighted, for example, by a payline 419, which may span across multiple second display panels 416 as well as the one or more first display panels 408. In this particular example, the movable display units 414 are similar to those discussed with reference to FIGS. 13 through 18 and have third display panels on the sides panels of the movable display units which may be caused to display additional graphical content—in this case, the additional graphical content includes a line segment of the payline 419 that bridges between second display panels 416 that are at different elevations from adjacent portions of the one or more first display panels 408 (a similar effect may be used to span between adjacent second display panels 416 that are at different elevations).

Figure 6:
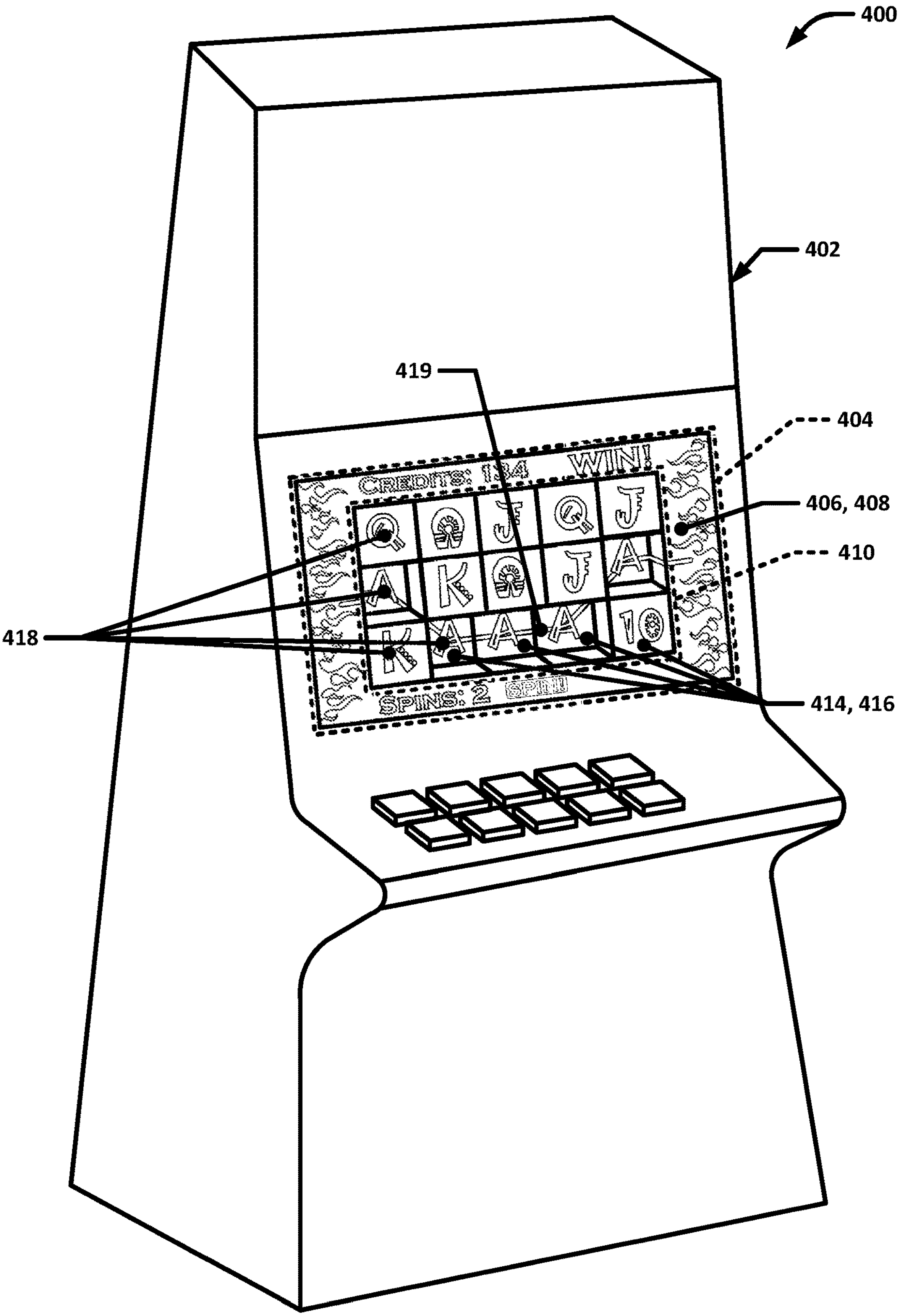
FIG. 6 depicts the electronic gaming machine of FIG. 4 with the dynamic display in a second actuated state.
Figure 7:
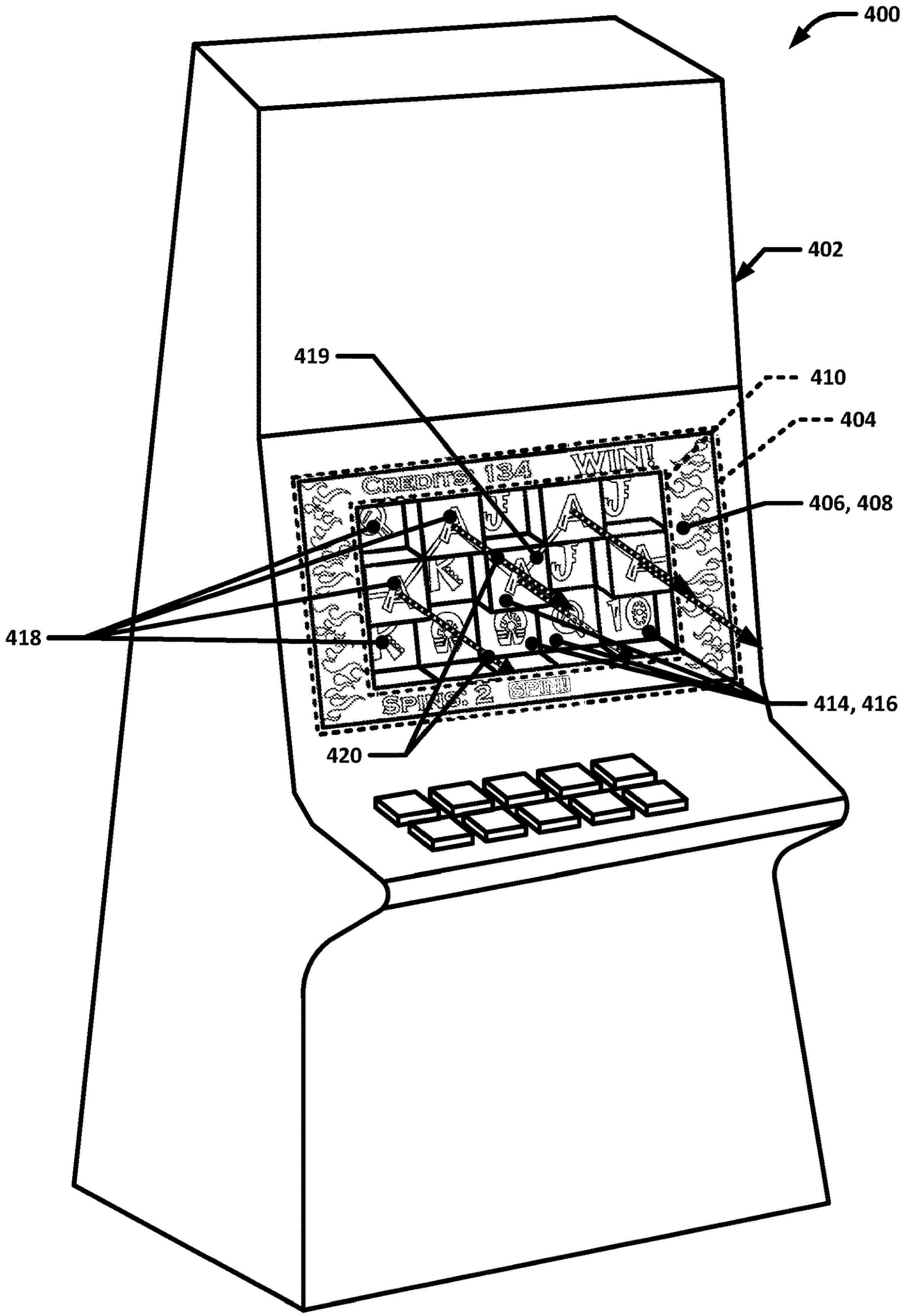
FIG. 7 depicts the electronic gaming machine of FIG. 4 with the dynamic display in a third actuated state.

FIG. 6 depicts the electronic gaming machine of FIG. 4 with the dynamic display in a second actuated state. As can be seen, a different combination of five movable display units 414 have been actuated so as to translate along their respective first axes 420 (not shown, but similar to those shown in FIG. 5). The translation of the movable display units 414, in this case, occurs in the opposite direction from that shown in FIG. 5, resulting in a “recessed” appearance to the translated movable display units 414. Similar to FIG. 5, the “recessed” movable display units 414 are associated with a payline 419 that indicates the winning pattern. Alternatively, in some implementations, the gaming machine may be configured to leave the movable display units 414 displaying a winning pattern alone and instead cause the movable display units 414 displaying symbols that are not part of the winning pattern to retract into the dynamic display 404, as is shown in FIG. 7. Such implementations may be particularly useful, for example, when there is a cover glass that protects the dynamic display 404 from being touched by players and that is generally flush against the display frame 406. In such implementations, it may not be possible to move the movable display units 414 to be proud of the display frame 406 without having the movable display units 414 collide with the cover glass. Accordingly, the movable display units 414 may, in some such implementations, only be able to be retracted into recessed positions relative to the display frame 406 (or have their ability to protrude proud of the display frame 406 limited by the cover glass) and restored to being flush with the display frame 406. Again, the movable display units 414 in this example are similar to those discussed with reference to FIGS. 13 through 18, and the opening 410 may have interior walls that have additional display panels that may be used to display graphical content in a similar manner to the third display panels of FIG. 5 discussed above. In some implementations, the cover glass may take the form of an elastic, clear membrane that may be placed over the movable display units 414 such that when the movable display units 414 are extended outwards, the membrane is able to distend to accommodate such displacement.

It will be recognized that different implementations of dynamic displays may operate in different ways. For example, in some dynamic displays, the movable display units 414 may be configured to be translated between a number of positions, including positions that are proud of the display frame 406, positions that are recessed with respect to the display frame 406, and positions that are flush with the display frame 406. In other implementations, the movable display units 414 may be configured to be movable only between a position that is flush with the display frame 406 and one or more positions that are recessed from the display frame 406. In yet further implementations, the movable display units 414 may be configured to be movable between a position that is flush with the display frame 406 and one or more positions that are proud of the display frame 406.

While in the depicted electronic gaming machine, each movable display unit 414 is associated with a different reel stop (or region within which a reel symbol may be displayed), other implementations may feature additional movable display units, e.g., there may be 4, 9, 25, etc. movable display units used for each reel stop, or the movable display units may be sized and shaped so as to correspond with areas of the display that do not necessarily correspond with reel stops. The size of the movable display units may also vary considerably. For example, some movable display units may have second display panels sized to be several inches on each side, e.g., 3" to 5" wide by 3" to 5" tall, although other implementations may feature much smaller second display panel sizes, e.g., ¾" square, ⅝" square, ½" square, and so forth. In some implementations, as discussed later herein, the second display panels may even be on the order of ~1 mm square or ~1.5 mm square, or of an even smaller size. In such implementations, the second display panel may even be a single-pixel display panel, e.g., an individual LED or a set of multiple LEDs of different colors that may be actuated in various combinations and to different degrees of intensity to provide a particular combined color spectrum. In various other implementations, the movable display units may have second display panels that are non-rectangular in aspect ratio, e.g., rhomboid, parallelogram, triangular, hexagonal, pentagonal, etc. and/or are different sizes. In some implementations, the movable display units may have second display panels that are not even a regular geometric shape, but may, for example, take on more complicated shapes. For example, in a wagering game in which the player may be awarded a "key" shape, gaming machine may have one or more movable display units that have a second display panel or panels that are shaped, in aggregate (or singly if including a single movable display unit) in the shape of a key. When the player is awarded such a key, then a graphic of the key may be caused to be displayed on the second display panel(s) of the movable display units and the movable display unit(s) displaying such content may be caused to extend outwards relative to the portions of the display surrounding the key graphic (or, similarly, the movable display units displaying the key graphic may be caused to remain stationary while surrounding movable display elements are caused to be retracted relative thereto) to emphasize the graphical content.

It will also be recognized that the dynamic displays discussed herein may be used in a manner other than that shown in FIGS. 5 and 6. Most notably, the movable display units 414 may be actuated in a variety of different circumstances, not just to facilitate display of a winning outcome. For example, in some wagering games, a player may be able to "freeze" certain reel stops so that high-value symbols that appear during one play of the game remain in place for a subsequent play of the game. In such instances, a dynamic-display enabled gaming machine may be configured, for example, to cause the movable display units displaying such reel stops to be actuated so as to extend outwards or retract inwards so as to highlight their "fixed" status. Alternatively, the dynamic display may be controlled so that the reel stops other than the selected reel stops are moved. For example, if a wagering game with a dynamic display enters a state in which the player is provided with the opportunity to pick a predefined number, e.g., 3, of reel stops that will remain at their currently displayed positions (or symbols) for the next reel spin, the movable display units depicting reel stops that are not selected by the player may be caused to retract to a recessed position relative to the selected reel stops, thus emphasizing their non-selection. In another implementation, the entire field of movable display units may first be actuated into a slightly recessed state, e.g., recessed a quarter inch or so, from the display frame and/or cover glass at the start of such a player-pick feature. As the player selects each reel stop that is to be "fixed", e.g., by touching a touch screen interface (as described later) in a location that corresponds to the reel stops in question, the movable display units for the selected reel stops may be caused to move forward to be flush against the cover glass. After the player has selected the maximum number of "fixed" reel stops permitted by the feature or otherwise signaled that reel stop selection is complete (by selecting a "confirm selection" button, for example), then the movable display units displaying the remaining, unselected reel stops may, for example, be translated to a further recessed position.

In some implementations, for example, the player may be associated with a loyalty program that includes a plurality of levels; the player's level in the loyalty program may be based on the player's engagement with the loyalty program, e.g., how often they log in or play under the loyalty program or how much they wager while logged in through the loyalty program. In these embodiments, one or more portions of the 3D images that may be displayed using movable display units may be based on the loyalty program level associated with the player. For example, a dynamic display device may animate a bouncing or spinning golden ball for a gold level player while having the movable display units showing the golden ball extend towards the player.

In some further implementations, a game controller may detect a mobile device of a player in proximity to a gaming device, e.g., using Bluetooth, NFC, or location reporting services in an app that is loaded and running on the mobile device and that is in communication with the game controller, e.g., via the Internet. If the gaming device is in attract mode, the game controller may cause a dynamic display device with movable display units to attract the attention of the player associated with the mobile device by, for example, causing the player's first name to be displayed on movable display units of the dynamic display device with an invitation to play the gaming device while also causing the movable display units featuring such content to move or displace to draw attention to the gaming device.

In some further implementations, a plurality of electronic gaming machines with dynamic display devices may communicate via a network or other communications interface. A controller may coordinate a 3D movable display unit visual effect between such electronic gaming machines such that a 3D effect that involves translating movable display units may begin on one electronic gaming machine and then appear to "move" in a direction towards a neighboring electronic gaming machine and then "cross over" into the dynamic display of that neighboring electronic gaming machine. This effect may then be continued for additional neighboring electronic gaming machines. For example, a "wave" pulse where sequential columns of movable display units are caused to extend and then retract to give the illusion of a "ripple" or "wave" that travels from left to right across a dynamic display device may be caused to continue on the dynamic display device of the electronic gaming machine to the right of that electronic gaming machine, and so on. In another example, a 3D rocket ship may start on one electronic gaming machine and continue along a plurality of electronic gaming machines that are positioned adjacent to each other. In these embodiments, multiple electronic gaming machines may simultaneously display part of the connected 3D image. In such implementations, a server device may coordinate the images between the corresponding electronic gaming machines. In some embodiments, the server device transmits display and movable display unit movement instructions to each of the electronic gaming machines.

Figure 8:
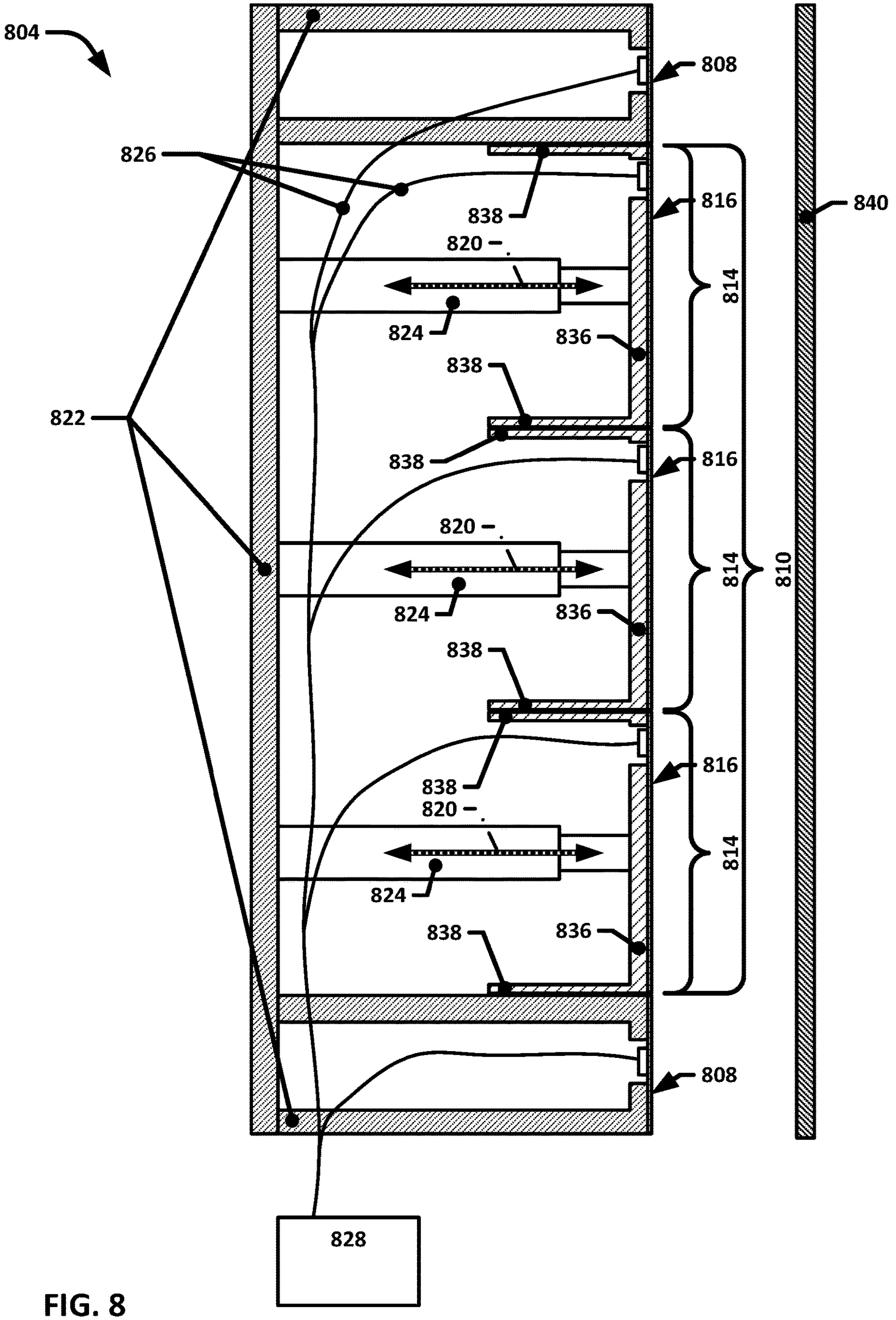
FIG. 8 depicts a side view of an example dynamic display for use in an electronic gaming machine.

FIG. 8 depicts a side view of an example dynamic display for use in an electronic gaming machine. The dynamic display 804, in this example, includes a support structure 822 that may serve as a foundation or overall support structure for the dynamic display 804. The support structure 822, for example, may be equipped with mounting points for fasteners to all the support structure 822, and thus the entire dynamic display 804, to be mounted within an electronic gaming machine.

The support structure 822 may, for example, serve as part of a display frame and may include a portion or portions that provide rigid support to one or more first display panels 808 that are used in the display frame of the dynamic display 804. The one or more first display panels 808 may have an opening 810, and one or more movable display units 814 may be positioned within the opening 810. The support structure 822 may also include a portion or portions that provide support to a plurality of linear drive mechanisms 824, which may be any electrically controllable actuation device that is able to cause the movable display unit 814 connected therewith to translate along an associated first axis 820. In the example dynamic display 804, the linear drive mechanisms 824 are linear actuators, e.g., linear actuators, linear solenoid actuators, servo actuators, voice coil actuators, hydraulic or pneumatic pistons, rotational output motors, e.g., servo, stepper, brush, piezoelectric, etc. motors, coupled with a linear translation device such as a rack, worm gear, or screw drive, or other types of linear actuator mechanisms. Alternatively or additionally, the movable display units 814 may be interfaced with linear guides or rails to allow for sliding motion along the first axes 820 and crank- or linkage-driven actuators may be used to impart a motive force to such movable display units 814. The linear drive mechanisms 824, the one or more first display panels 808, and second display panels 816 may be operatively or communicatively connected with a game controller 828, which may provide signals that cause the linear drive mechanisms to be selectively actuated to cause the movable display units 814 connected therewith to translate during presentation of a wagering game in association with an occurrence of one or more events during presentation of the wagering game, by way of cables 826. The game controller 828 may include, for example, one or more processors and one or more memory devices that store computer-executable instructions for controlling the one or more processors to cause the equipment operatively connected thereto to perform certain actions, e.g., cause certain graphical content to be displayed on the one or more first display panels and the second display panels or cause the linear drive mechanisms to actuate in a particular manner. The game controller 828 may be operatively or communicatively connected with the one or more first display panels, the second display panels, and the linear drive mechanisms in order to facilitate such control.

The movable display units 814 may be constrained in their movement, e.g., through the use of guide rails, tracks, grooves, channels, splines, keyways, or other constraints, so as to generally only be able to translate along a single axis. In the depicted example, each movable display unit 814 includes an understructure that serves to support the second display panel 816 that is part of the movable display unit 814. The understructure, in this example, has a generally box-like aspect, with a platform 836 with a major surface perpendicular to the corresponding first axis 820 and four smaller side panels 838 extending away from the platform in a direction perpendicular to the platform and parallel to the first axis 820. The side panels 838, in this example, extend down towards the support structure 822 that they may effectively serve as guides or constraints on the motion of adjacent movable display units 814, thereby limiting their movement to be generally along the corresponding first axes 820.

In some implementations, the dynamic display 804 may be located behind a cover glass 840 that may be spaced off from the display frame so as to allow the movable display units 814 to be actuated so as to be proud of the display frame, e.g., to the maximum extent permitted by the travel of the linear drive mechanism, without colliding with the cover glass. The cover glass may be used to prevent players or other unauthorized personnel from touching or otherwise interfering with the operation of the dynamic display 804. The cover glass 840, for example, may be set in the exterior surface of a housing of an electronic gaming machine, and the dynamic display 804 may be housed within the electronic gaming machine behind the cover glass 840. In other implementations, the cover glass 840 may be placed on top, e.g., contacting with or in very close proximity thereto, the display frame 806 such that the movable display units 814 may generally only be transitioned to recessed positions relative to the display frame 806 or to positions flush with the display frame 806. In some implementations with a cover glass 840, the cover glass 840 may also include a touch screen interface, e.g., a capacitive, resistive, or other type of touch-sensitive input interface to allow a player or user to input commands relative to the content displayed on the movable display units 814 and/or the display frame 806, e.g., to select paylines, reel stops, or other items (such as "spin" buttons, menu buttons, and/or help/rules buttons) displayed on the display frame 806 and/or the movable display units 814.

Figure 9:
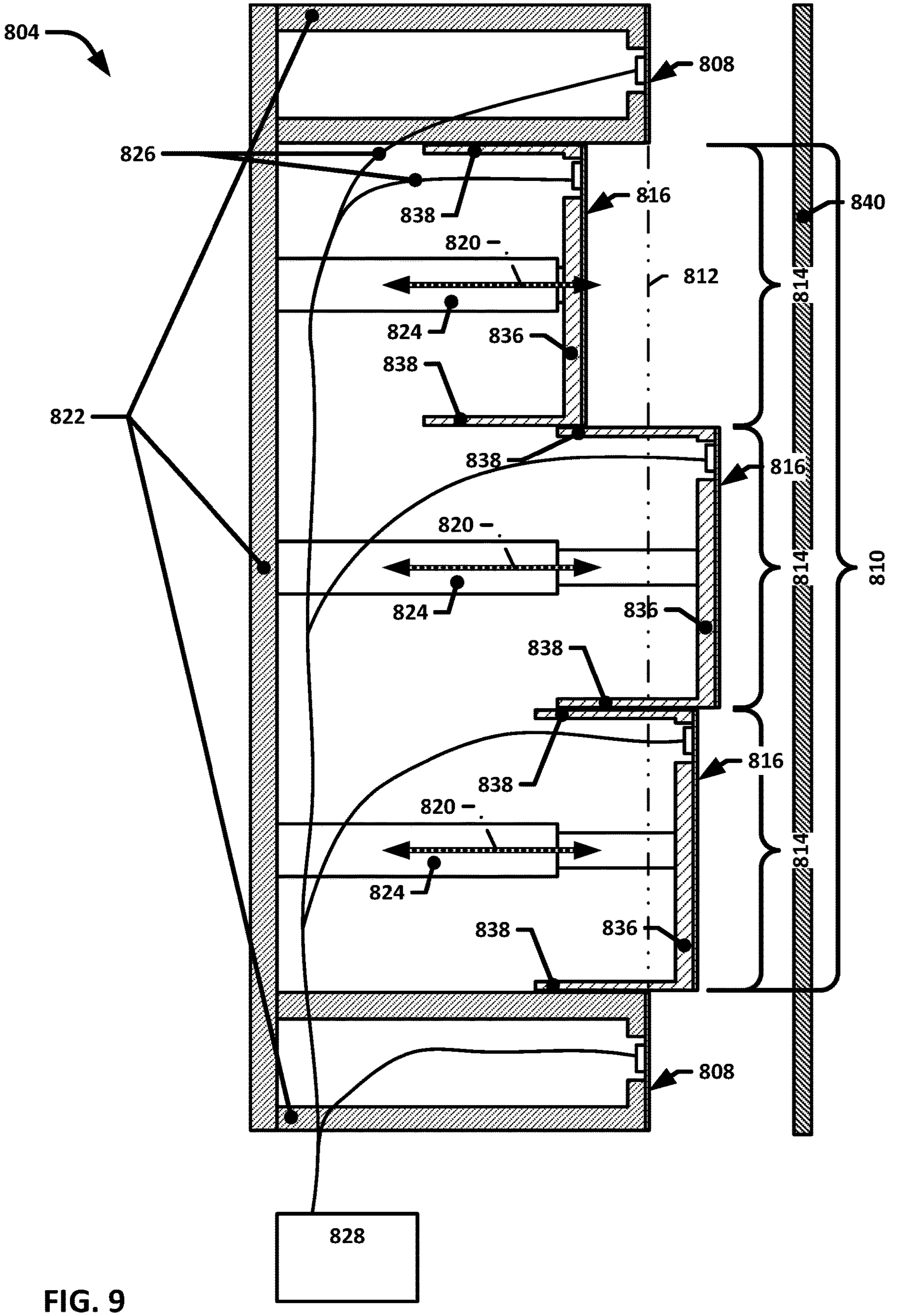
FIG. 9 shows the dynamic display of FIG. 8 in an actuated state.

FIG. 9 shows the dynamic display of FIG. 8 in an actuated state in which the linear drive mechanisms for the three movable display units shown have moved the movable display units connected therewith to various locations. As can be seen, the movable display units 814 have each been translated along their respective first axes 820 by their respective linear drive mechanisms 824 with respect to a nominal display plane 812, which may be generally co-planar with the one or more first display panels 808 that are part of the display frame. Such displacement of the movable display units 814 may be controlled so as to be choreographed with the display of particular graphical content on the one or more first display panels 808 and the second display panels 816.

The basic operational premise of the dynamic displays discussed above may be augmented or enhanced through additional features in some implementations. Examples of such additional features are discussed below with respect to several example dynamic displays. For clarity, structures in the following Figures that correspond with structures in FIGS. 8 and 9 and that share the same last two digits of the structures in FIGS. 8 and 9 may generally be assumed, unless otherwise indicated, to be similar to the corresponding structures in FIGS. 8 and 9. In such cases, the discussion of such Figures may not explicitly describe such elements, but the description of the corresponding elements in FIGS. 8 and 9 should be understood to be applicable to such structures in the Figures discussed below as well.

Figure 10:
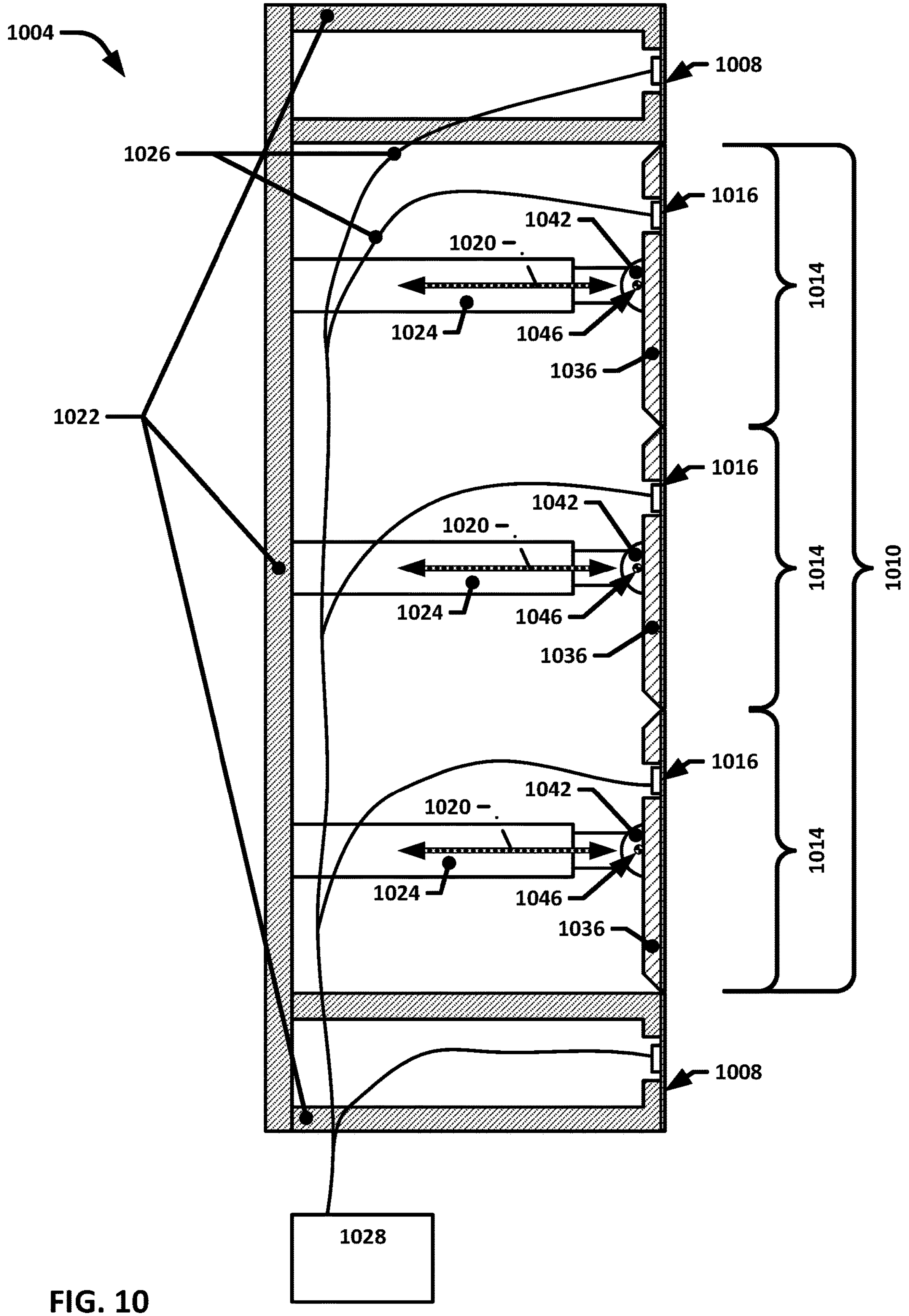
FIG. 10 depicts an example dynamic display in which the movable display units may not only be controlled to translate along corresponding first axes, but may also be controlled to pivot about axes perpendicular to the first axes.

FIG. 10 depicts an example dynamic display in which the movable display units may not only be controlled to translate along corresponding first axes, but may also be controlled to pivot about axes perpendicular to the first axes. As can be seen, platforms 1036 of the understructures of each movable display unit 1014 in dynamic display 1004 are each connected with a respective linear drive mechanism 1024 by a rotational actuator 1042. The linear drive mechanisms 1024 may be configured to translate the understructures, and second display panels 1016 mounted thereto, along respective first axes 1020, much as in the earlier-discussed examples above. The rotational actuators 1042, however, may be configured to provide rotational motion of the platforms 1036 (which may also be viewed as the understructures discussed previously), and thus second display panels 1016 mounted thereto, about second axes 846 responsive to input received from the gaming controller 1028.

Figure 11:
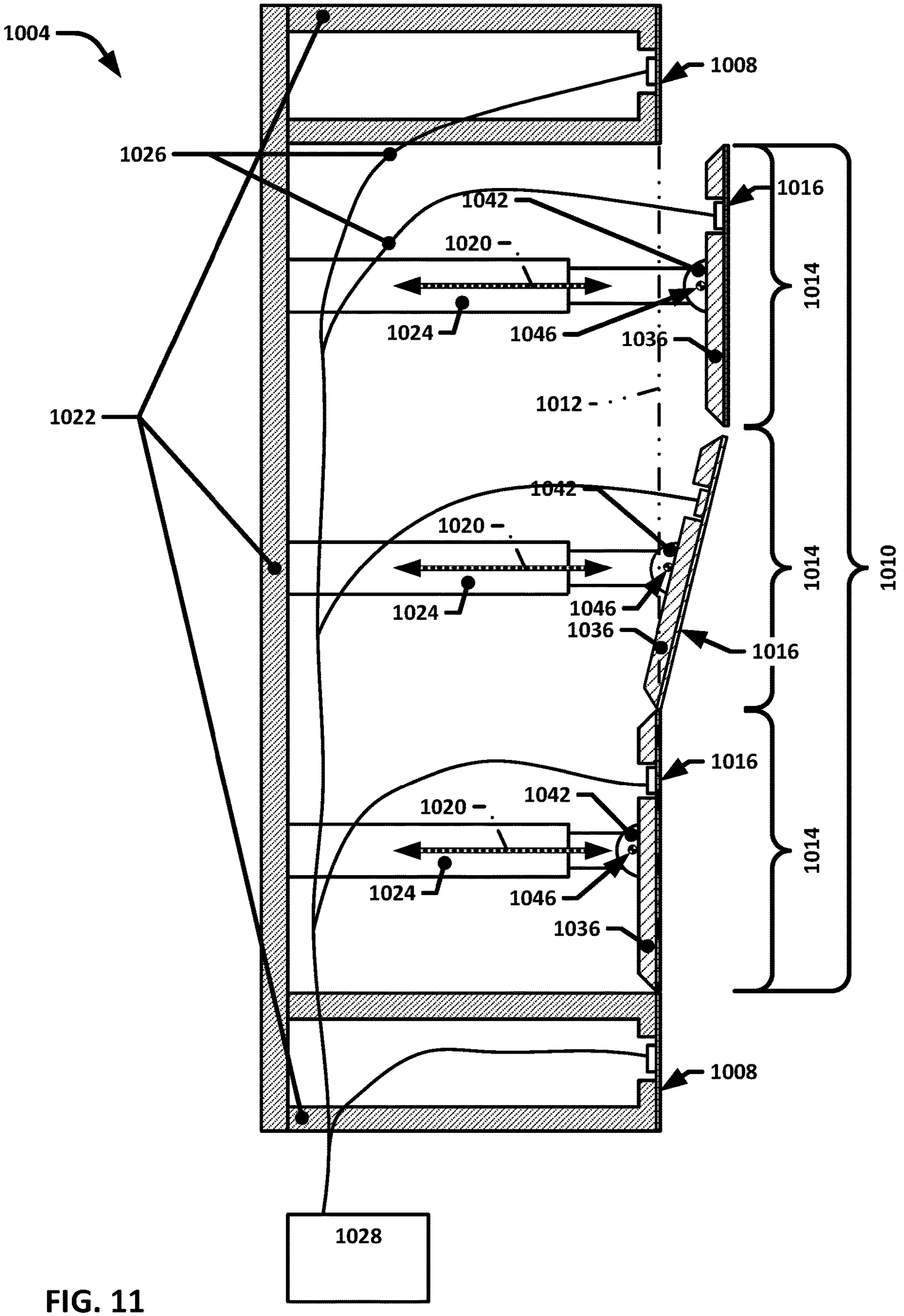
FIG. 11 depicts the example dynamic display of FIG. 10, but with two of the movable display units translated proud of a nominal display plane and with the middle movable display unit tilted through actuation of a rotational actuator associated therewith.

FIG. 11 depicts the example dynamic display of FIG. 10, but with two of the movable display units 1014 translated proud of a nominal display plane 1012 and with the middle movable display unit 1014 tilted through actuation of the rotational actuator 1042 associated therewith. Such movable display units 1014 may be used to provide a more "fluid" appearing surface (with just translation, differences in elevation between adjacent movable display units will have a stepped or "aliased" appearance, whereas movable display units with rotatable actuators may be tilted so as to make the transitions between adjacent movable interfaces less abrupt). In some implementations, the rotatable actuators 1042 may provide for rotation about two axes, e.g., two axes orthogonal to each other and to the first axes. Such implementations may allow for the movable display units to be tilted to align better with movable display units located on any side of the tilted movable display unit.

As can be seen, the movable display units 1014 lack side panels that extend from the platforms 1036, as was the case with the movable display units 814 discussed earlier. This avoids possible interference of the side panels of adjacent movable display units with each other during tilting of the movable display units. Instead, the platforms 1036 may have undercut edges 1044 to provide additional backside clearance for reducing the possibility of a collision for at least some range of tilting motion. In other implementations, the movable display units 1014 may include side panels that extend from the platforms 1036 and reposition in concert with the tilt of movable display units 1014 such that such collisions are avoided.

Figure 12:
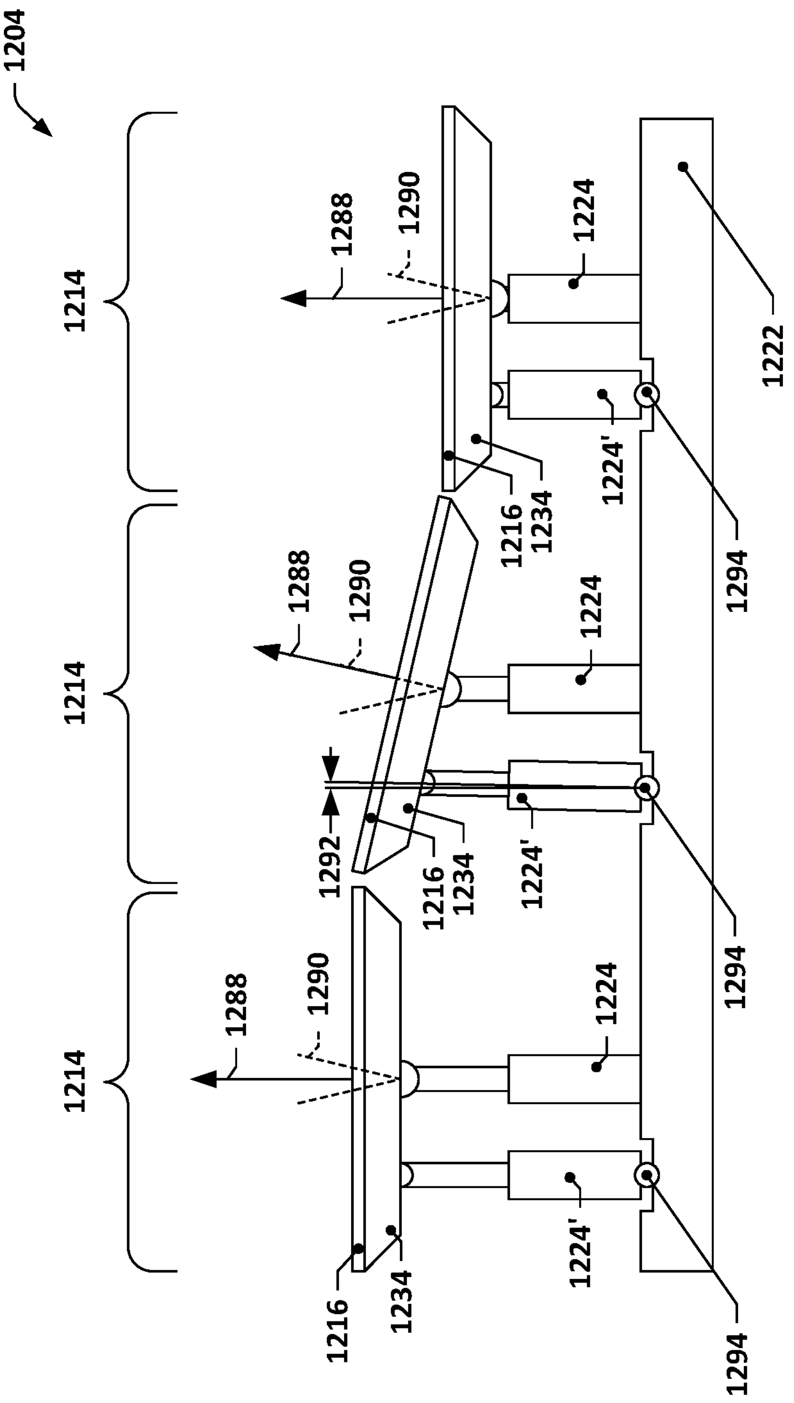
FIG. 12 depicts an example dynamic display device in which each movable display unit includes multiple linear drive mechanisms.

In another implementation, such as is shown in FIG. 12, a movable display unit may have multiple actuators that may all be connected with a common second display panel, e.g., three or four linear drive mechanisms that have linearly displaceable ends that are each rotatably or movably connected with the understructure supporting the second display panel of the movable display device. For example, if three actuators are used per understructure, each actuator may be extended in concert and by the same amount to cause the understructure to remain flat/level (as compared with the nominal display plane, for example). However, if one or two of the actuators are extended to different amounts (from the remaining actuator(s) and/or each other), the understructure may be caused to tilt in a particular manner. In such implementations, one of the actuators, e.g., an actuator that connects with the understructure near the center of the second display panel, may serve as an "anchor" and may be anchored to the support structure for that dynamic display panel such that the actuator cannot, itself, tilt, thus anchoring the center of the understructure, more or less, to be constrained to linear movement along the center axis of that actuator. The other actuators that are movably connected with the understructure may be movably connected with the support structure as well such that they can tilt relative to the support structure and about an axis that is perpendicular to the translation axis of the "anchor" actuator—in one implementation, there may be two actuators for each understructure in addition to the "anchor" actuator, and each of those additional actuators may be rotatably connected with the support structure such that each can pivot relative to the support structure about a tilt axis that is perpendicular to the translation axis of the "anchor" actuator and perpendicular to the tilt axis of the other additional actuator. Such an arrangement may allow for the understructure to be dynamically tilted such that an axis perpendicular to the second display panel can be oriented to any point within a conical volume with the center axis of the conical volume aligned with the translation axis of the "anchor" actuator and the with the point of the conical volume intersecting with the axis perpendicular to the second display panel (with the conical volume growing in diameter with increasing distance from the "anchor" actuator).

FIG. 12 depicts an example dynamic display device in which each movable display unit includes multiple linear drive mechanisms. In FIG. 12, a dynamic display device 1204 is shown that includes three movable display units 1214. Each movable display unit 1214 has a second display panel 1216 (no first display panels/display frame are shown in this example, but may optionally be included in a manner similar to other implementations discussed herein) supported by a corresponding understructure 1234 that is connected with three linear drive mechanisms 1224. In FIG. 12, only two of the linear drive mechanisms 1224 for each movable display unit 1214 are shown; the third is positioned behind the center linear drive mechanism 1224 for each movable display unit 1214. The linear drive mechanism 1224 for each movable display unit 1214 is the "anchor" linear drive mechanism and is constrained so that the end of the linear drive mechanism 1224 is constrained to only translate linearly along a single axis. The end of the linear drive mechanism 1224 may be connected with an understructure 1234 of the corresponding movable display unit 1214 using a spherical or gimballed rotational joint, thereby allowing the understructure 1234 and a corresponding second display panel 1216 supported thereby to be rotated in any direction for at least some angular distance. For example, the understructure 1234 and the second display panel 1216 may be rotatable such that a normal vector 1288 to the second display panel 1216 falls within a conical volume 1290 that has a center axis that is aligned with the linear translation axis of the linear drive mechanism 1224 and a point that intersects the normal vector 1288. Due to the use of a spherical rotational joint or gimballed rotational joint, the second display panel may be oriented to any direction that results in the normal vector 1288 falling within the conical volume 1290.

The linear drive mechanism 1224' is similar to the linear drive mechanism 1224, except that it may be mounted to support structure 1222 with a rotational joint 1294 such that it can pivot relative to the support structure about a rotational axis, e.g., a rotational axis perpendicular to the page in FIG. 12, to allow for slight misalignment, e.g., tilt 1292, between the linear translation axes of the linear drive mechanisms 1224 and 1224'. When the linear drive mechanisms 1224 and 1224' are actuated in concert and by the same amount, then no misalignment between their respective translation axes will occur. However, when actuated asynchronously and/or by different amounts, the resulting displacement mismatch will cause the corresponding understructure 1234 and the second display panel 1216 supported thereby to tilt.

It will be understood that other implementations of tiltable movable display units with multiply linear drive mechanisms may be implemented differently, e.g., using linear drive mechanisms where the linear drive mechanism linear translation axes remain aligned but the rotational joints connecting the linear drive mechanisms to the understructure may be equipped with some form of compliant or sliding interface to allow the understructure to tilt without binding.

Figure 13:
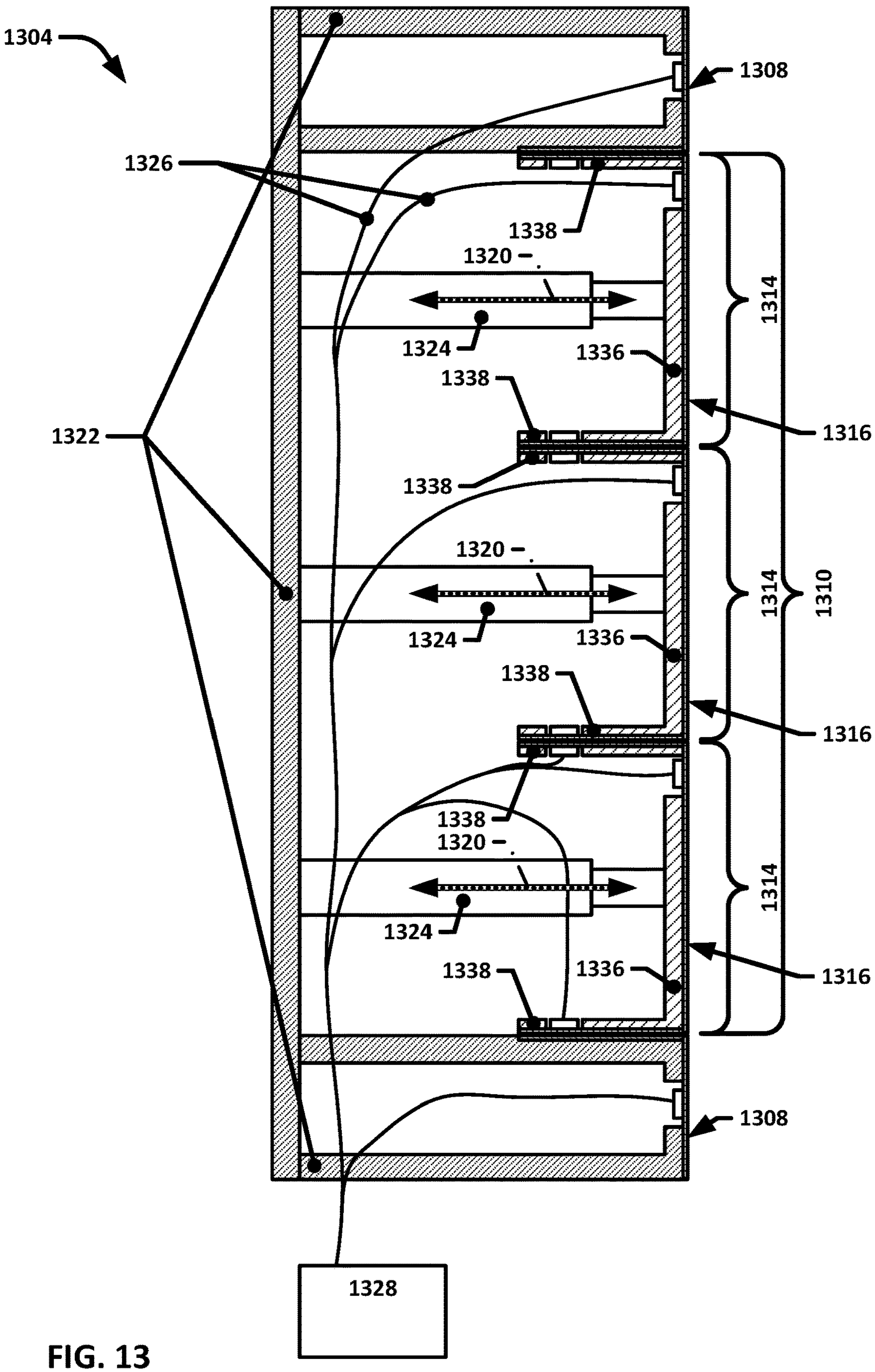
FIG. 13 depicts an example dynamic display in which the movable display units include side panels featuring additional controllable visual elements.

FIG. 13 depicts an example dynamic display in which the movable display units include side panels featuring additional controllable visual elements. In FIG. 13, each movable display unit 1314 includes an understructure that has side panels 1338 that extend away from a platform 1336 and towards a linear drive mechanism 1324 connected with the corresponding movable display unit 1314. The side panels 1338 each support a corresponding third display panel 1348 (see FIG. 14), which may also be communicatively or operatively connected with a game controller 1328. The third display panels 1348 for a movable display unit 1314 may be controlled so as to display graphical content that may, for example, enhance or coordinate with the graphical content displayed on the second display panel 1316 of that movable display unit 1314, as shown in FIG. 5 with the payline 419. Such dynamic displays 1304 may also include, in some implementations, fourth display panels 1349, which may be mounted such that they line the opening 1310 and face inwards towards the movable display units 1314. Such fourth display panels may be controlled in a similar manner to the third display panels 1348, e.g., to display graphical content that aligns or coordinates with graphical content on adjacent second display panels 1316 when the corresponding movable display units 1314 are retracted into the dynamic display 1304.

Figure 14:
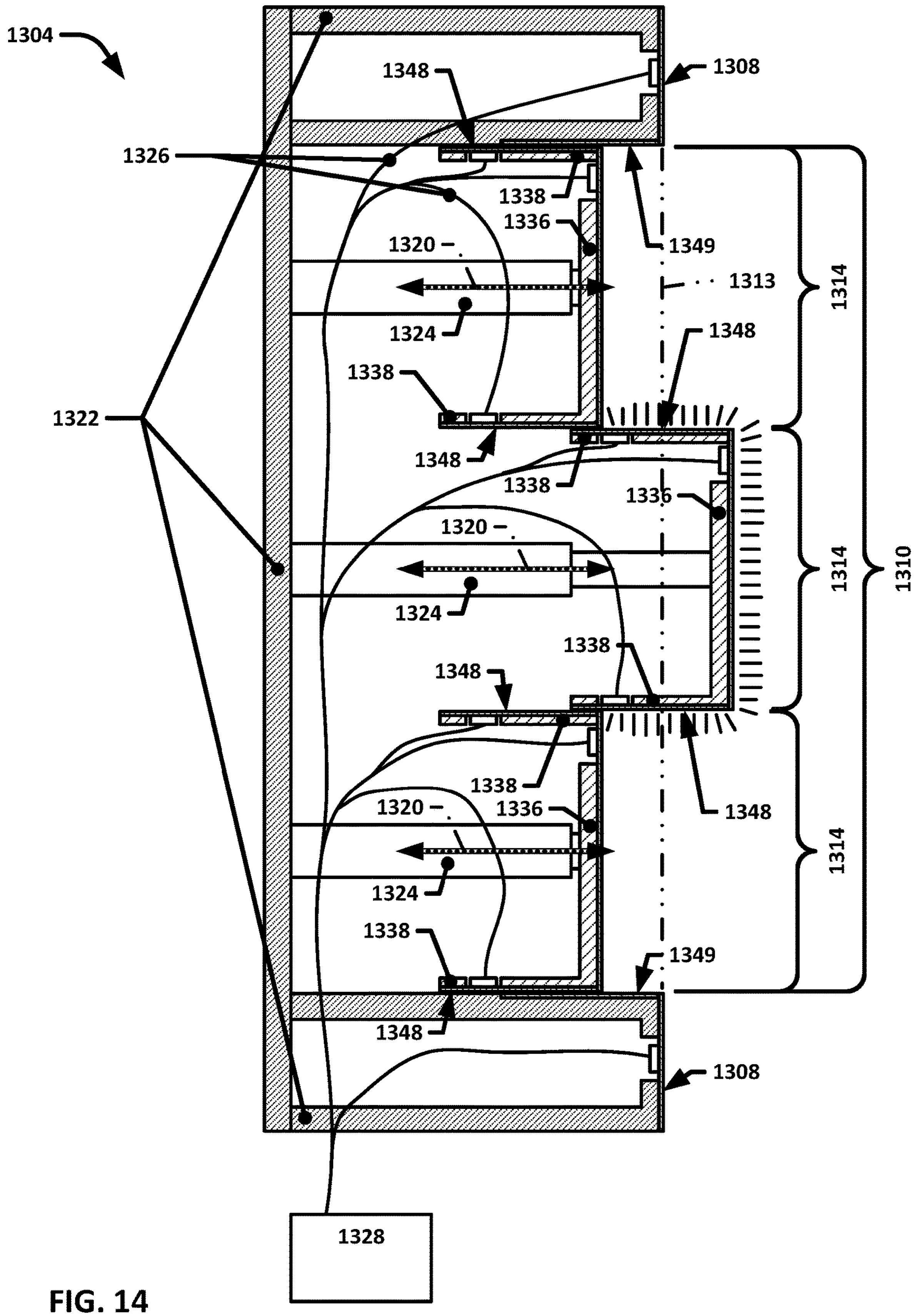
FIG. 14 depicts the dynamic display of FIG. 13 with the center movable display unit extended and the flanking movable display units retracted.

FIG. 14 depicts the dynamic display of FIG. 13 with the center movable display unit 1314 extended and the flanking movable display units 1314 retracted. As can be seen in FIG. 14, the second display panel 1308 and the third display panels 1348 have been activated to cause graphical content to be displayed (resulting in light being emitted from virtually the entire exposed surface of the center movable display unit—as indicated by the light rays emanating away from the center movable display unit 1314).

Figure 15:
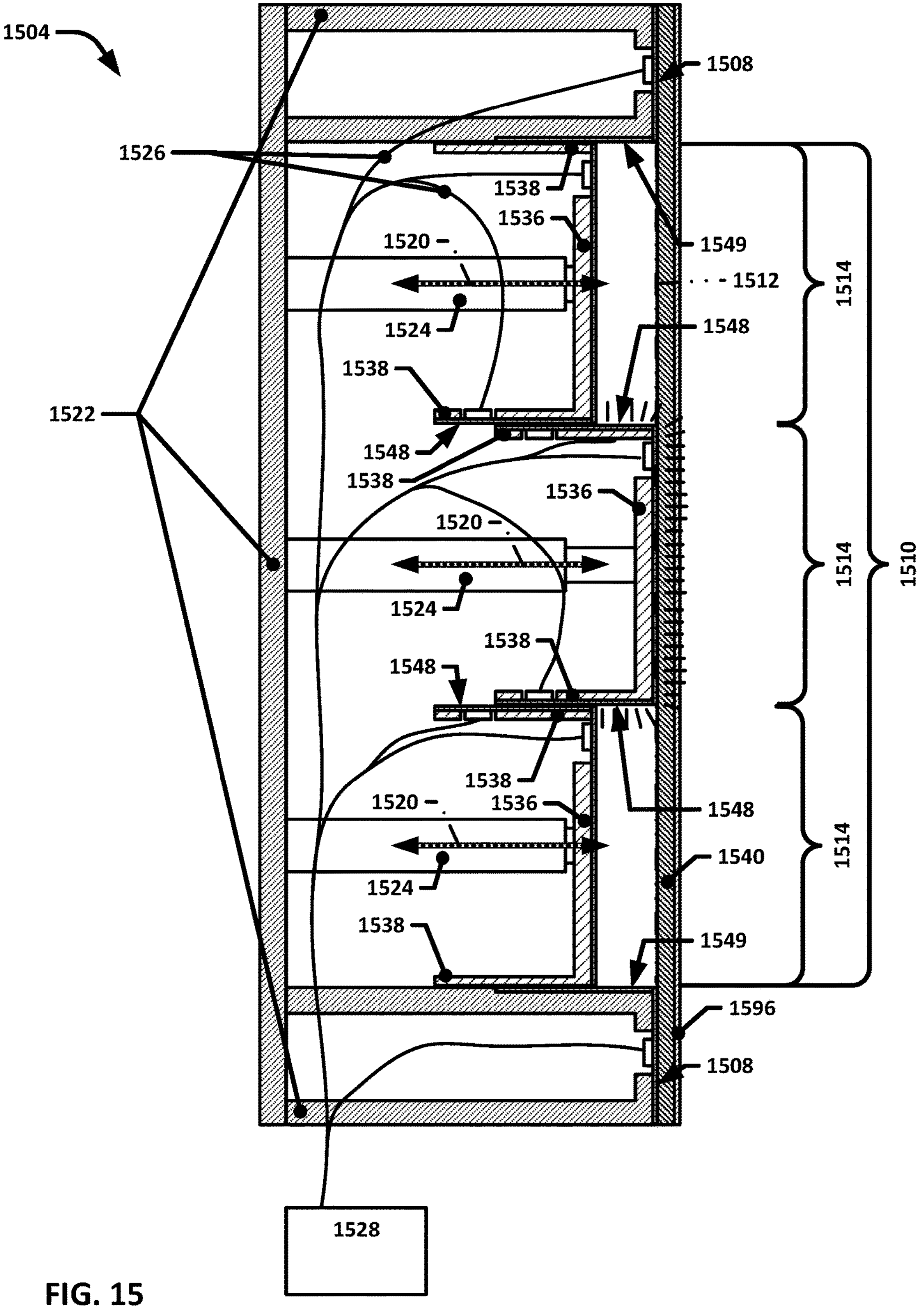
FIG. 15 depicts a dynamic display similar to that of FIGS. 13 and 14, but with a cover glass added.

FIG. 15 depicts a dynamic display similar to that of FIGS. 13 and 14, but with a cover glass 1540. Features of FIG. 15 may generally be similar to corresponding features in FIGS. 13 and 14, with such similar features sharing the same last two digits of their callout numbers; the description of elements from FIGS. 13 and 14 is generally applicable to the corresponding elements in FIG. 15 unless otherwise noted.

In FIG. 15, the cover glass 1540 is positioned proximate to or flush against the first display panel 1508 of the display frame, which limits the ability of the movable display units 1514 to extend beyond the nominal display plane 1512. As a result, movement of the movable display units 1514 may consist of movement to draw the movable display units 1514 into a recessed position relative to the cover glass 1540 or to move the movable display units 1514 to be flush against the cover glass 1540. The cover glass 1540 may optionally include a touchscreen interface 1596 to facilitate player interaction with the dynamic display.

Another difference between the dynamic display of FIG. 15 is that the movable display units 1514 that have one or more edges that are directly adjacent to the display frame may, if third display panels 1548 are used, omit such third display panels 1548 on the sides of the movable display units 1514 that are directly adjacent to the display frame, as is shown for the two outermost movable display units 1514. Third display panels 1548 would never be visible in such display-frame-adjacent locations since the edge-located movable display units 1514 are not capable of extending beyond the display frame and cannot expose the sides of the movable display units 1514 that are adjacent to the display frame.

Figure 16:
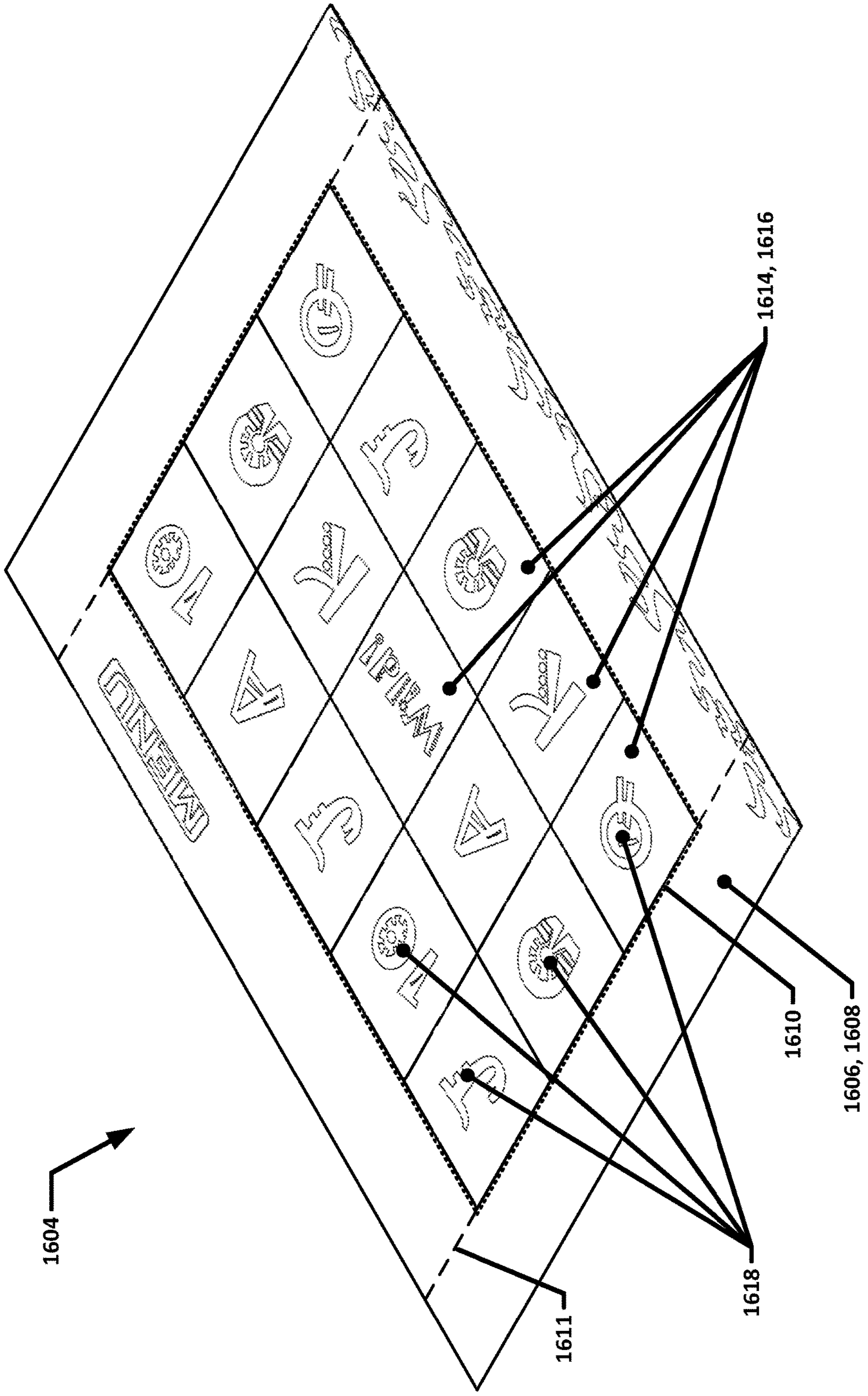
FIGS. 16 through 18 depict a perspective view of the exterior surfaces of an example dynamic display.
Figure 17:
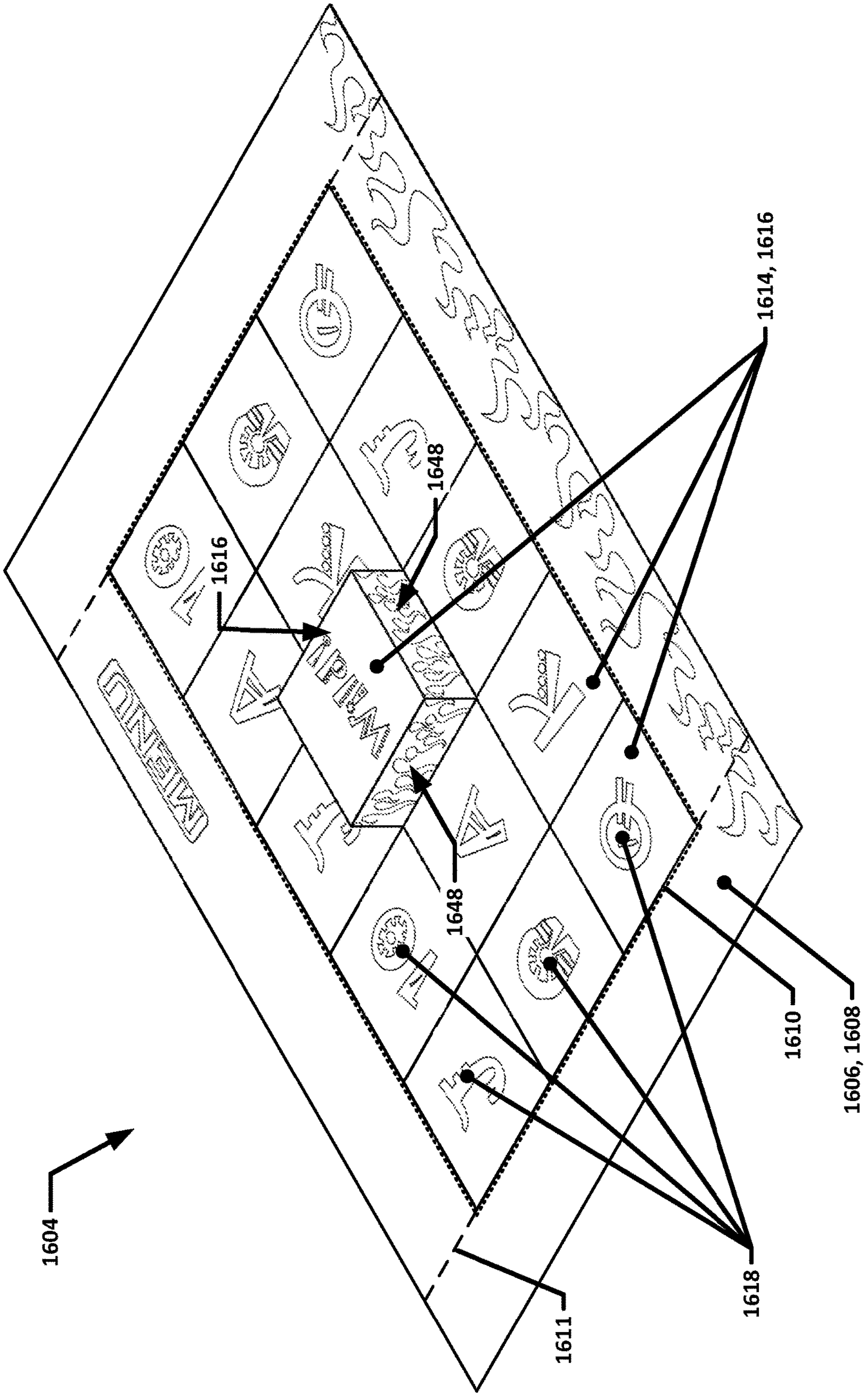
Figure 18:
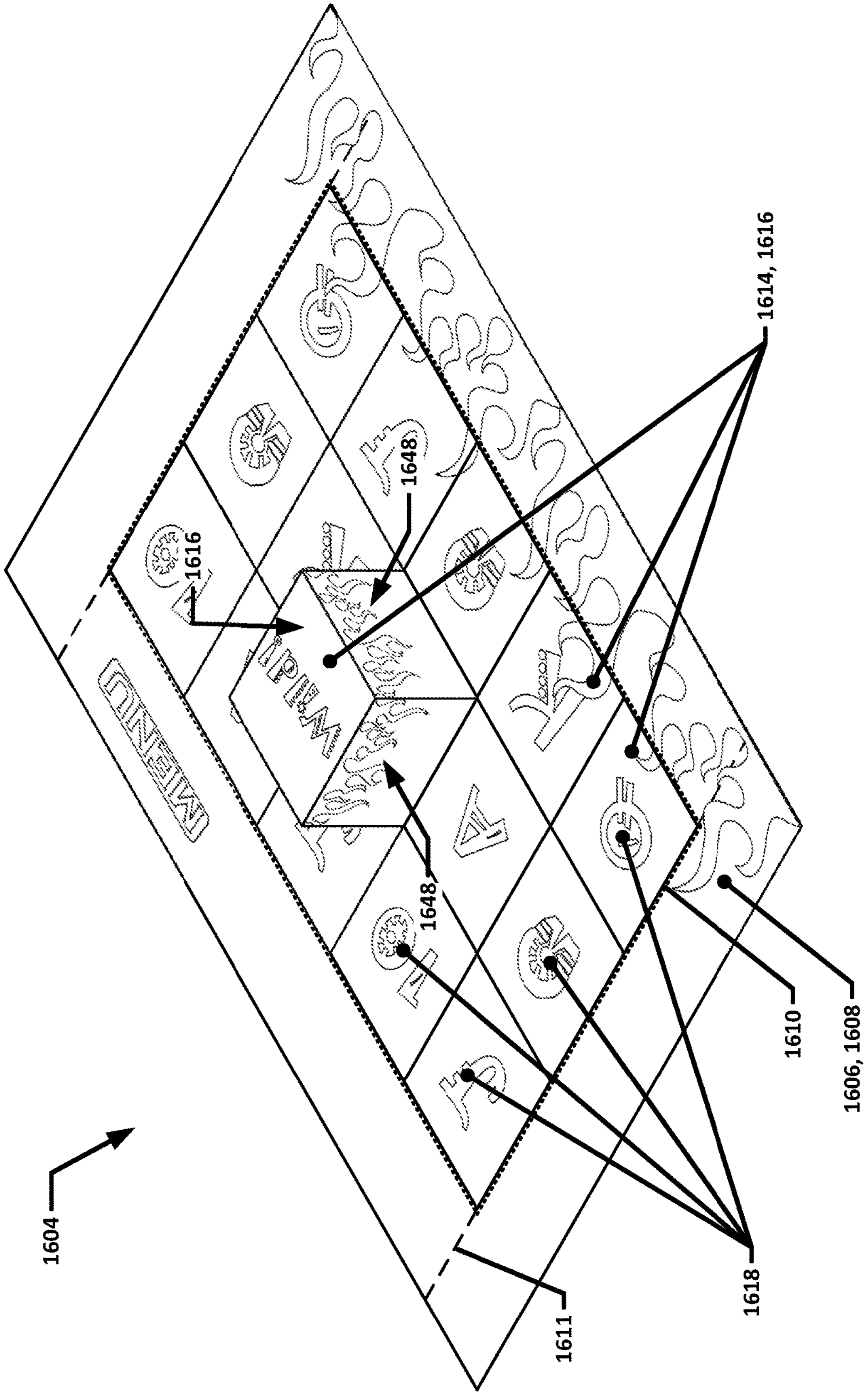

FIGS. 16 through 18 depict a perspective view of the exterior surfaces of an example dynamic display. In FIG. 16, the center movable display unit 1614 with a second display panel 1616 has a "Wild" indicator displayed on it, which may provide a special in-game effect, such as being able to stand in for any symbol that might provide a winning outcome. To further highlight the "Wild" indicator, the movable display unit 1614 displaying the "Wild" indicator may be controlled to rise up proud of the display frame 1606, as shown in FIGS. 17 and 18 (alternatively, such a movable display unit may instead be retracted into the display to differentiate it from the surrounding movable display units displaying non-Wild content). As can be seen, when the movable display unit 1614 stands proud of the surrounding movable display units 1614, the third display panels 1648 located on the side panels of the extended movable display unit 1614 are visible. In this example, a graphic or animation of flames is caused to be depicted on the third display panels 1648, giving the impression that the "Wild" is "hot" or "on fire." Additionally, the first display panel (which may, alternately, be four thin display panel strips, as indicated by the dashed display panel seams 1611) 1608 may display a graphic or animation—in this case, an animation of flames—that grows in size and spills over onto the second displays 1616 that are adjacent to the bottom of the dynamic display 1604.

In some implementations, the third display panels 1648 of such an implementation may be instead be replaced with an illumination device, e.g., a light pipe or other light-transmissive structure connected with one or more light-emitting diodes (LEDs) or other light sources, a layer of electroluminescent material, or other electrically controllable material or structure that can be controlled by game controller 1628 to produce certain lighting effects in response to receipt of a control signal.

Figure 19:
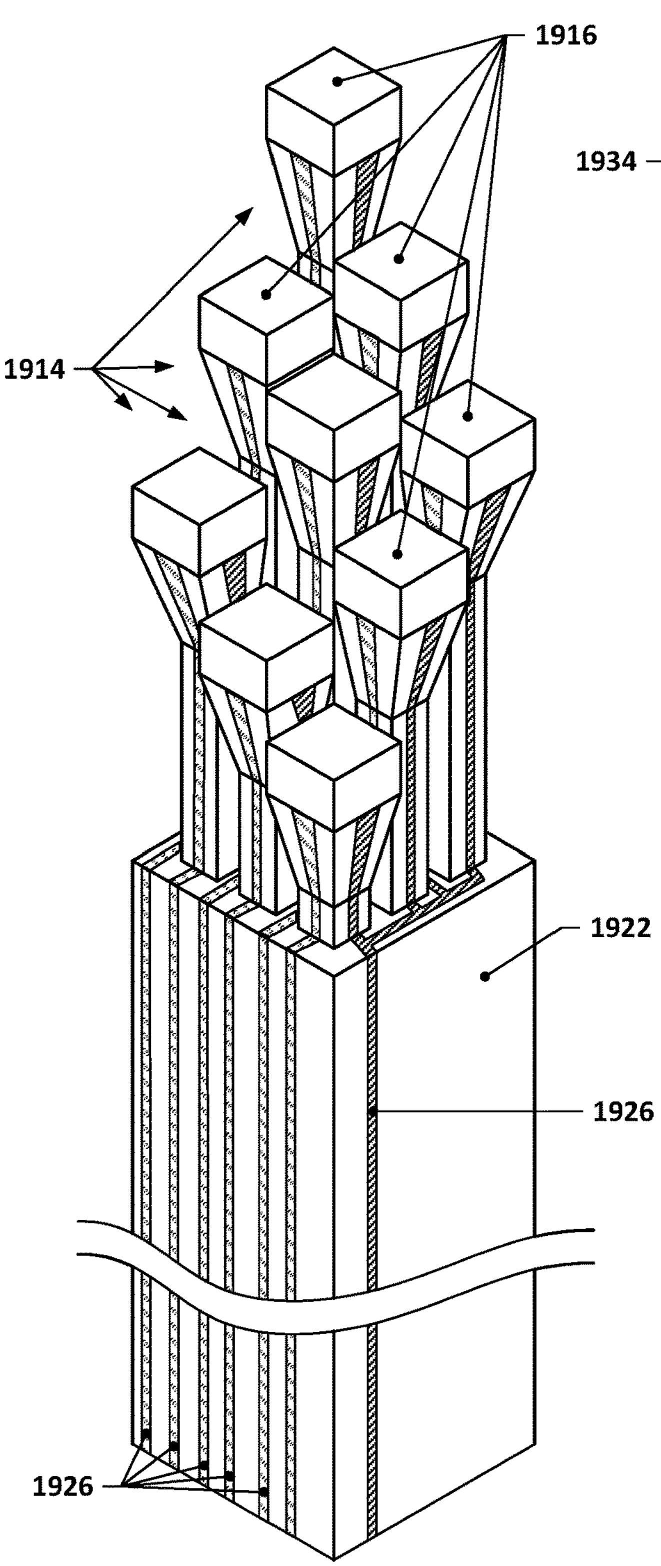
FIG. 19 depicts an example configuration of movable display units featuring single-pixel second display panels.

FIG. 19 depicts an example configuration of movable display units featuring single-pixel second display panels. In FIG. 19, an assembly is shown that features nine separate movable display units 1914 that share a common support structure 1922. The support structure 1922, in this example, includes a 3×3 array of square guide holes, each of which is used to constrain movement of one of the movable display units 1914 to primarily linear translation along the long axis of the assembly. Each movable display unit 1914 may include a single-pixel second display panel 1916, e.g., a single LED or a triplet of red, green, blue LEDs that may be selectively activated to produce a wide range of different colors.

In this example, the second display panels 1916 are approximately 1.5 mm on a side (when viewed along their translation axes), and the 3×3 array of movable display units 1914 may occupy a 4.5 mm square region. Such pixel sizes are somewhat on the large size for many display devices, but are still sufficiently small that the resolution of such displays may be acceptable for use in electronic gaming machines.

As can be seen in FIG. 19, each second display panel 1916 may be supported by an understructure 1934 that is located at the end of a riser 1982 or other structure. In this example, the riser 1982 and the understructure 1934 are an integral, unitary piece, although other implementations may feature a different construction. The understructures 1934 in this example implementation perform several functions. One such function is to transition between the larger sized second display panels 1916 and the smaller sized risers 1982, which allows the second display panels 1916 provide a nearly continuous surface when at the same elevation while allowing the support structure 1922 to have sufficient room to provide the square guide holes. Another function of the understructures 1934 is to provide a sloped surface that may minimize or prevent binding/catching when two adjacent movable display units 1914 are actuated so as to have their second display panels 1916 slide past one another. By having sloped side surfaces, the understructures 1934 may cause any second display panels 1916 with which they come into contact with to be urged outwards, thereby preventing catching/interference between two second display panels. In such arrangements, the understructure 1934 may be the same size or slightly larger than the second display panel 1916 when viewed along the translation axis. A third function provided by the understructures 1934 is to provide different lateral offsets between the centers of the second display panels 1916 and the centers of the actuator rods 1984 and/or the centers of the risers 1982 depending on the relative locations of the movable display units 1914. This is discussed in more detail with respect to FIG. 23 later in this discussion.

Since each second display panel 1916 may include only a single LED or a small number, e.g., three, of LEDs, electrical signals delivered to each second display panel 1916 may only require a small number of electrical traces, e.g., two to four electrically conductive traces per movable display unit 1914. In this example, each second display panel 1916 is provided with two electrically conductive traces 1926 that extend from the second display panel 1916 down along the length of the riser 1982. Corresponding electrically conductive traces 1926 may also be included on the support structure 1922 such that each electrically conductive trace 1926 in the support structure 1922 is in sliding contact with a corresponding electrically conductive trace 1926 of a corresponding riser 1982. Thus, when a riser 1982 translates in and out of the corresponding hole in the support structure 1922, the second display panel 1916 supported by that riser 1982 may stay electrically connected with the electrically conductive traces 1926 of the support structure 1922, thereby allowing the illumination of the second display panel 1916 to be maintained during such movement without interruption. Given the potentially small size of such assemblies, such an arrangement may be much more economical and easier to package than using discrete cables attached to each second display panel 1916. In some implementations, assemblies of movable display units 1914 such as are shown in FIG. 19 may be modular and configured to be inserted into a modular backplane that includes arrays of electrical connections that make electrical contact with the electrically conductive traces 1926 when each assembly is inserted or installed into the backplane, thereby allowing for modular and scalable assemblies to suit any of a variety of different dynamic display sizes.

Figure 20:
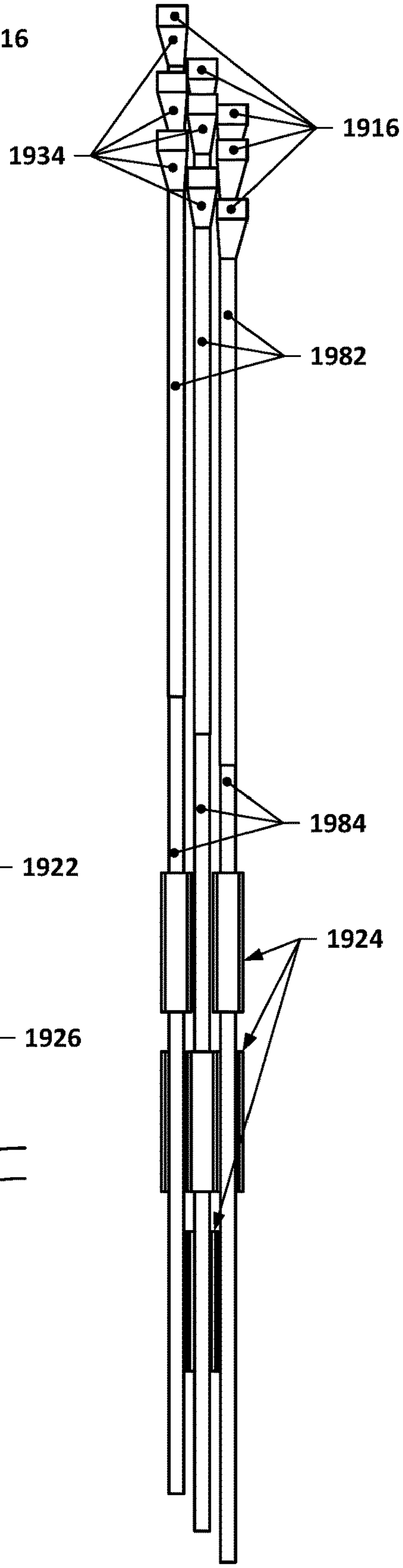
FIG. 20 depicts the example assembly of FIG. 19 with the support structure removed.
Figure 21:
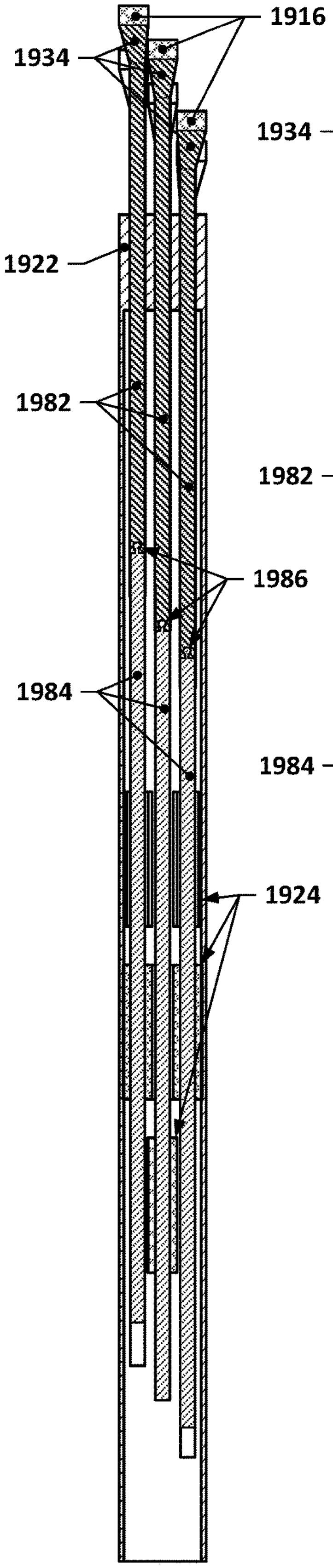
FIG. 21 shows a cutaway view of the assembly of FIG. 19.

FIG. 20 depicts the example assembly of FIG. 19 with the support structure removed. As can be seen, each riser 1982 is connected with a linear drive mechanism 1924. In this example, the linear drive mechanisms 1924 may be miniature linear screw drives that have an actuator rod 1984 that may be caused to extend/retract at a variety of speeds responsive to actuation of the linear drive mechanisms 1924. Since the actuator rod 1984 rotates during extension, the connection between the actuator rods 1984 and the risers 1982 may be established to permit such rotation while keeping the risers 1982 from rotating. For example, the tips of the actuator rods 1984 may terminate in small spheres or other suitable shapes that may "snap" into corresponding receptacles on the ends of the risers 1982 so that the two components are joined together for the purposes of axial translation but are free to rotate relative to one another about the axis of that axial translation. Such a feature is shown in FIG. 21, which shows a cutaway view of the assembly of FIG. 19.

The linear drive mechanisms 1924 of the present example may, for example, be piezoelectrically driven ultrasonic lead screws, such as are described in U.S. Pat. No. 6,940,209, which is hereby incorporated herein by reference in its entirety. Such lead screw actuators may be exceedingly small, e.g., having outer dimensions in planes perpendicular to the extension axis thereof on the order of 1.5 mm, with actuator rods having diameters of 0.75 mm. Even with the small size of such linear drive mechanisms 1924, it may be desirable to stagger some of the linear drive mechanisms 1924 relative to one another to allow for more condensed packaging and thus higher resolution dynamic displays.

Figure 22:
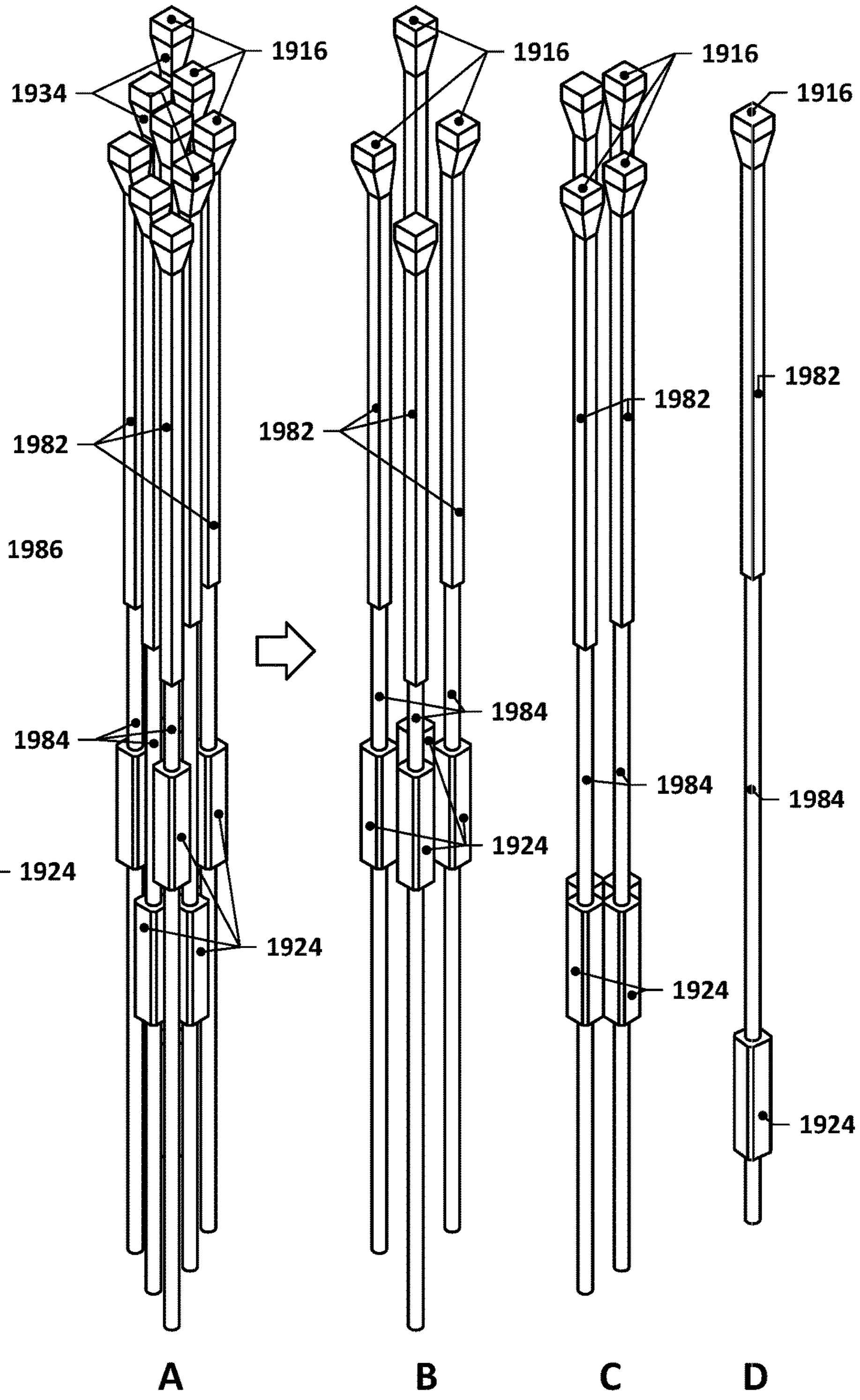
FIG. 22 shows the example assembly of FIG. 19 with the support structure removed and various different subgroupings of components.

For example, in FIG. 20, it can be seen that the stationary portions of the linear drive mechanisms 1924 (not the actuator rods 1984) have been arranged into three groups that are staggered relative to each other along the extension axes of the linear drive mechanisms 1924. In this example, there are two groups of four linear drive mechanisms 1924, and a third ground consisting of a single linear drive mechanism 1924. This allows the housings of the linear drive mechanisms 1924 of adjacently-located movable display units 1914 to overlap each other when viewed along the linear extension axes thereof. Generally speaking, the linear drive mechanisms 1924 for an assembly such as is shown may be arranged in groups such that no group includes linear drive mechanisms 1924 for two edge-to-edge-adjacent movable display units 1914. The actuator rods 1984 may extend through the gaps between the edges of the linear drive mechanisms 1924 in the various groups. This is more clearly shown in FIGS. 22A through 22D. In FIG. 22 view A, the example assembly of FIG. 19 is shown with the support structure 1922 removed in view A. Views B, C, and D show each group of movable display units 1914 and the respective linear drive mechanisms 1924 for each group. As can be seen, the actuation rods 1984 for each linear drive mechanism 1924 may extend through the interstices between the linear drive mechanisms 1924 in each group, thereby allowing for a more compact arrangement of the linear drive mechanisms 1924 in the plane that is perpendicular to the extension axes thereof at the expense of increased depth required along the extension axes to house all of the linear drive mechanisms 1924. In the example provided, each movable display unit 1914 may be caused to extend or retract approximately 0.5 inches, although it will be recognized that since the linear drive mechanisms 824 that are used are lead screw drive mechanisms, additional travel can be obtained merely through the lengthening of the actuator rods 884 (which, in this example, are the lead screws and would thus be threaded; for simplicity of illustration, the threading is not shown in the Figures).

Figure 23:
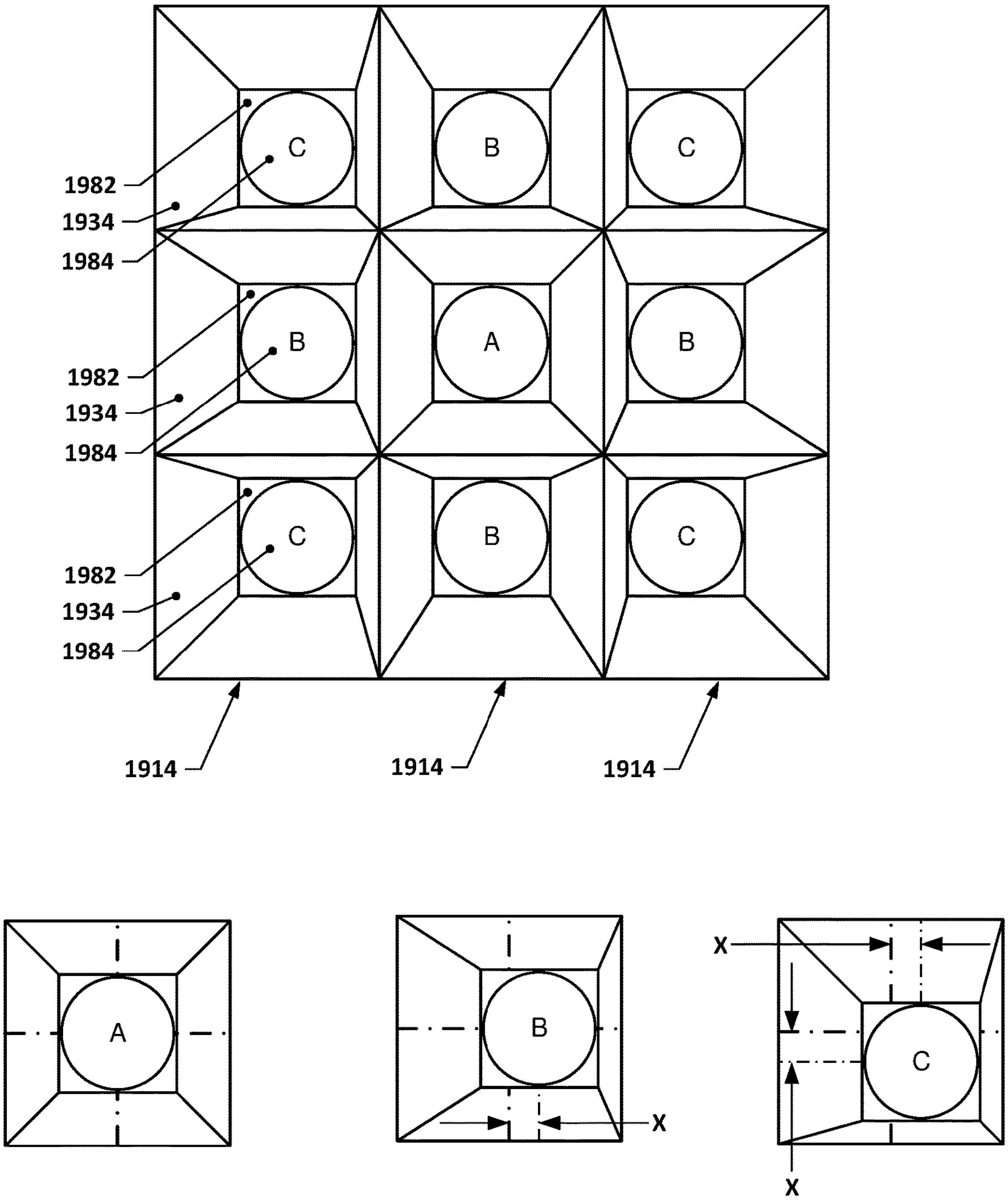
FIG. 23 depicts a bottom view of the movable display units of FIG. 19.

FIG. 23 depicts a bottom view of the movable display units of FIG. 19. As can be seen, the nine movable display units 1914 shown come in three distinct types-a single center movable display unit "A," four edge movable display units "B," and four corner movable display units "C" (these are arranged in different orientations, but otherwise have similar geometries). In this example, there are only nine movable display units 1914, but it will be understood that more or fewer quantities of movable display units 1914 may be used in other similar assemblies, in which case the number of each type of movable display unit may vary. For example, if only four movable display units are included in each assembly or subassembly, then there may be no edge or center movable display units and all of the movable display units may be corner-type units. Similarly, if there are 4×4 movable display units, there may be eight "edge" movable display units and four "center" movable display units.

To facilitate having the linear drive mechanisms 1924 be completely "in the shadow" of the second display panels 1916 when viewed along the translation axes thereof, the understructures 1934 may be designed so that the centers of the second display panels 1916 are sometimes offset from the centers of the risers 1982 and/or actuation rods 1984, as mentioned earlier. In this example, the center movable display unit 1914 "A" has a riser 1982 that is centered on the second display panel 1916, the edge movable display units 1914 "B" have risers that have center axes that are offset by distance X, e.g., 0.2 mm (as compared with a 1.5 mm square second display panel 1916), from the center of the second display panel 1916 in one direction, and the corner movable display units 1914 "C" have risers 1982 that have center axes that are offset from the center of the second display panel 1916 by distance X in two orthogonal directions. Such offsets may provide room to package the respective linear drive mechanisms 1924 for each movable display unit 1914 while still providing adequate room for the support structure 1922 around the movable display units 1914 and the linear drive mechanisms 1924. The amount of offset used may vary depending on the size of the assembly, the second display panels, and the linear drive mechanisms, and some implementations may feature differing amounts of offsets between corner, edge, and center movable display units. For example, in some implementations, there may be multiple "edge" movable display units with different amounts of such offsets.

Figure 24:
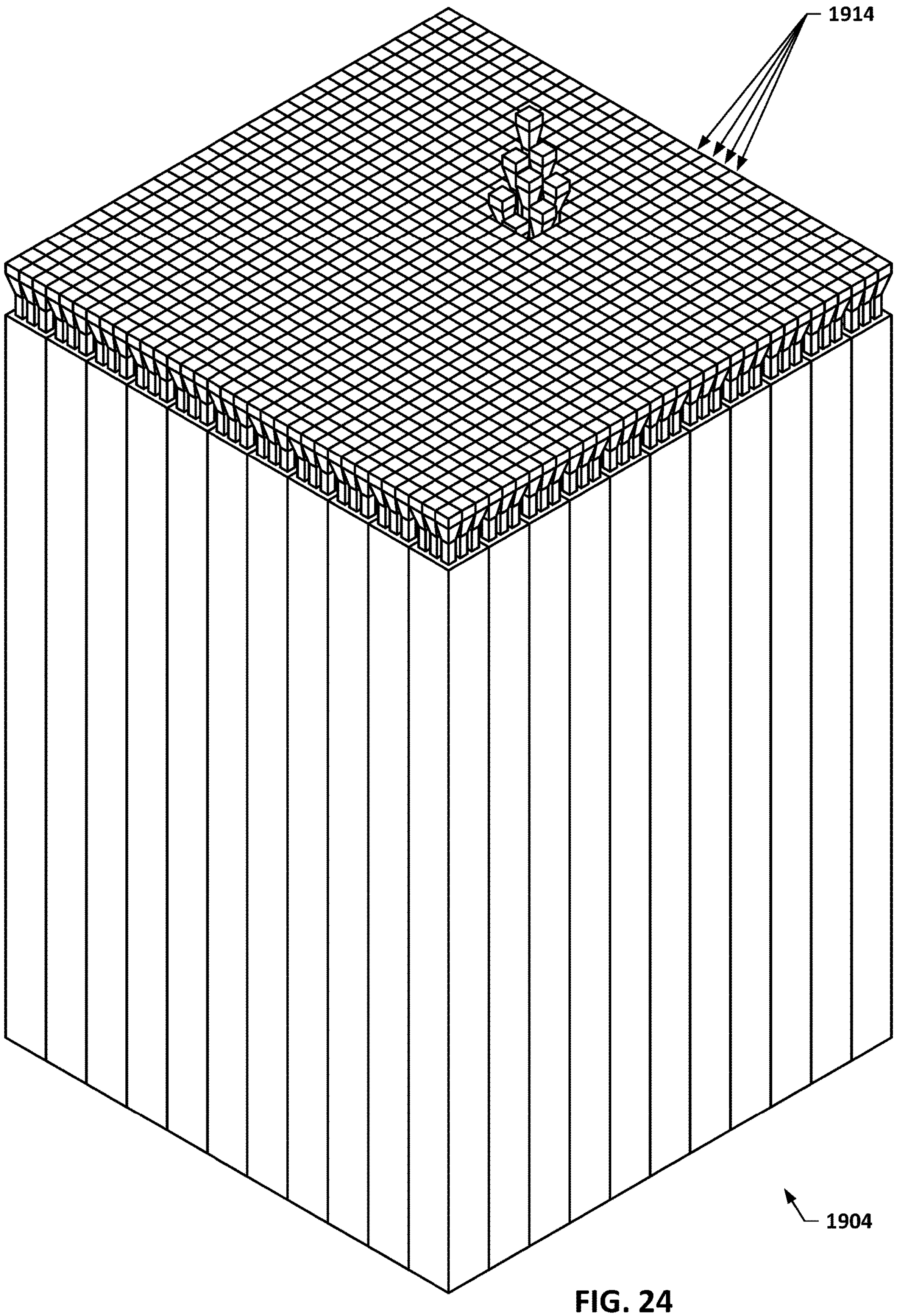
FIG. 24 depicts an example dynamic display panel using the assembly of FIG. 19.

FIG. 24 is an example of an 11×11 array of the movable display unit assembly shown in FIG. 19; most of the movable display units in the array are actuated so as to be at the same elevation, but the movable display units in one such assembly are shown in various extended states. Such an array may form a dynamic display 1904, and may be scaled larger or smaller as necessary.

FIGS. 25 through 28 depict an example dynamic display in which the movable display units include movable side panels; the side panels are shown in various states of deployment in these Figures. In FIGS. 25 through 28, each movable display unit 2514 includes side panels 2538 that are movably mounted with respect to a second display panel 2516 and platform 2536 by way of mechanism, e.g., hinges 2562. Each movable display unit 2514 may also include an actuation mechanism 2556 (in this case, a linear actuator that drives a piston 2558 in and out) that may be used to cause the side panels 2538 of that movable display unit 2514 to transition between different configurations including a first configuration and a second configuration.

Figure 25:
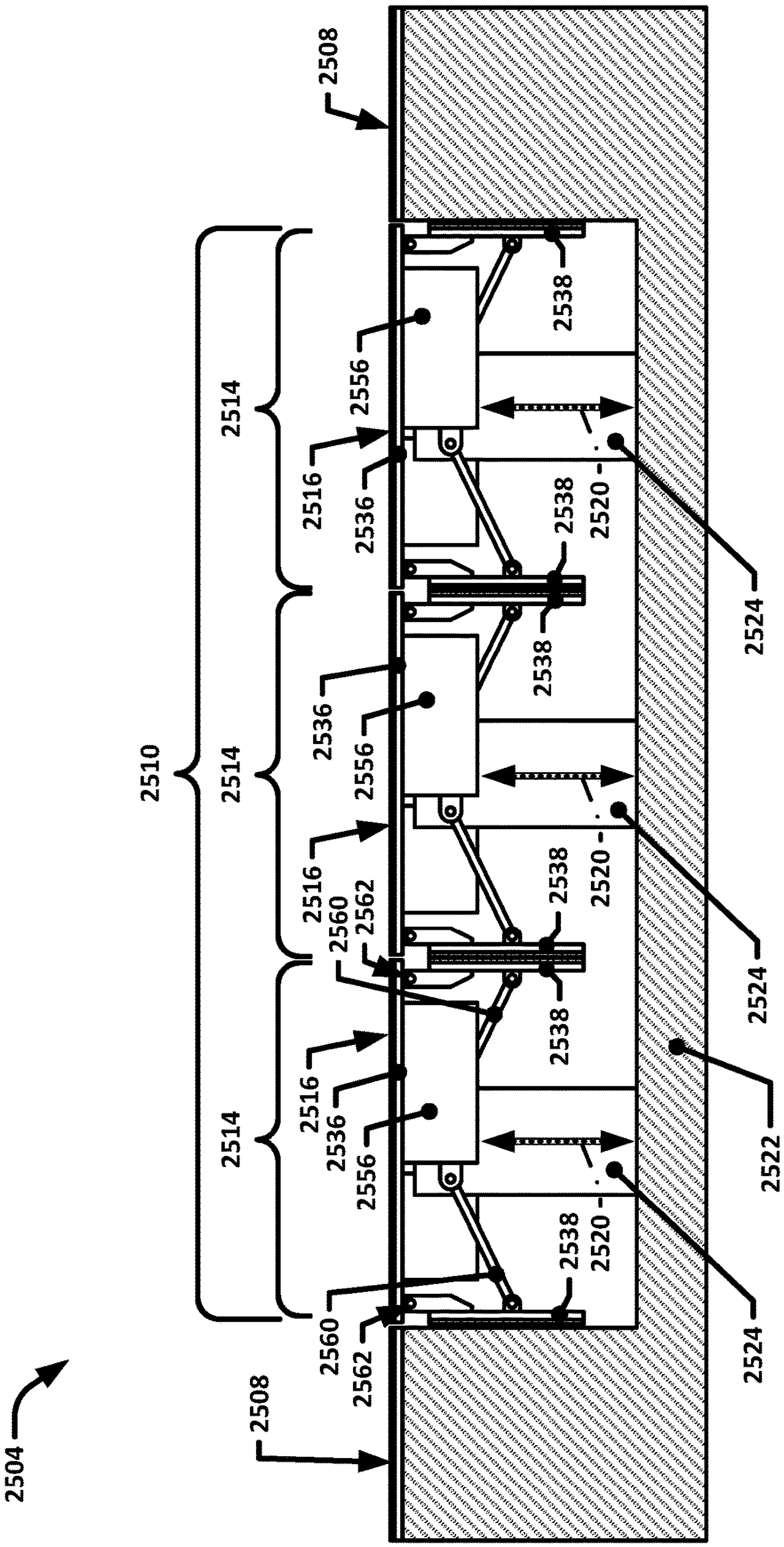
FIGS. 25 through 28 depict an example dynamic display in which the movable display units include movable side panels; the side panels are shown in various states of deployment in these Figures.
Figure 26:
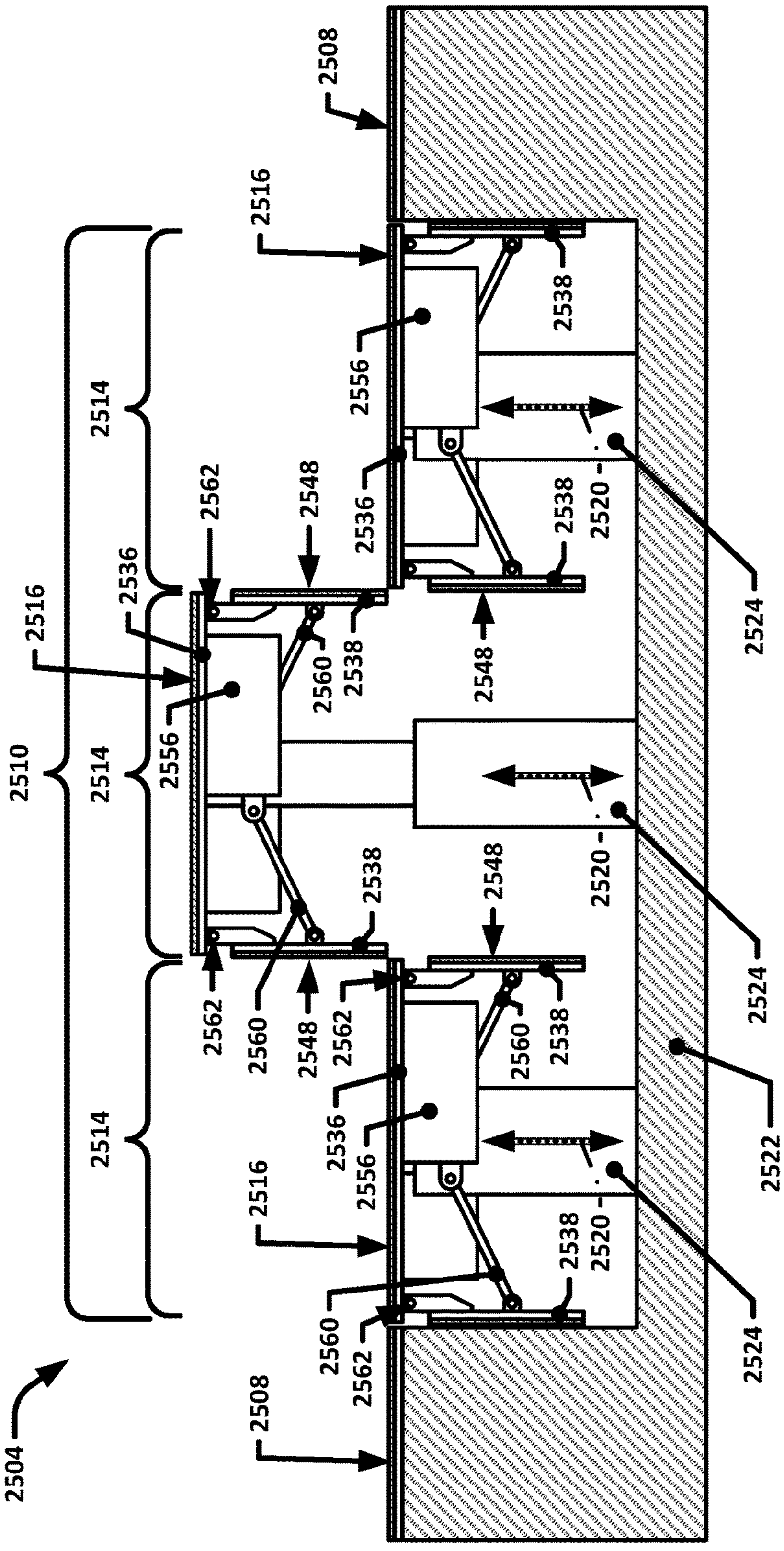
Figure 27:
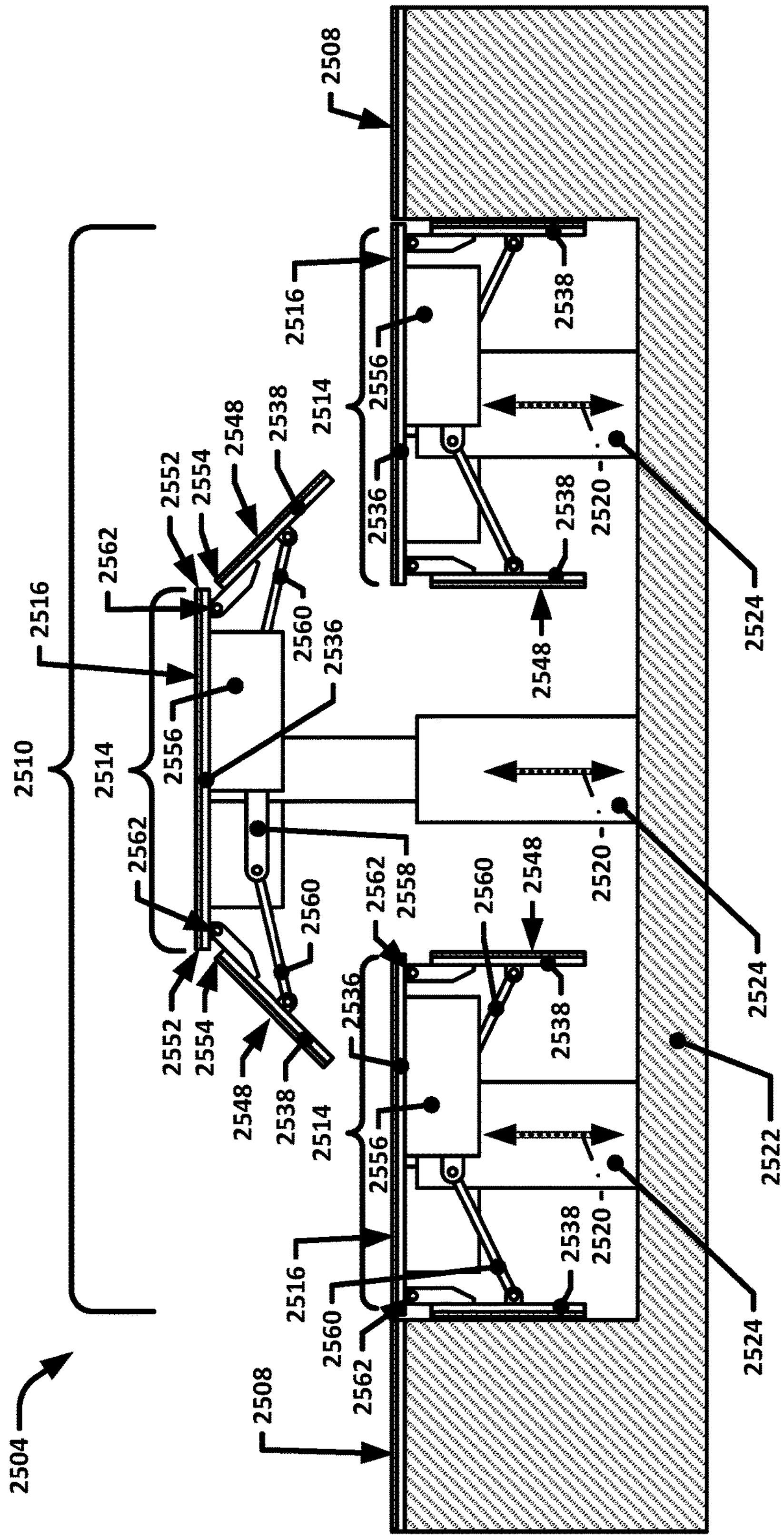
Figure 28:
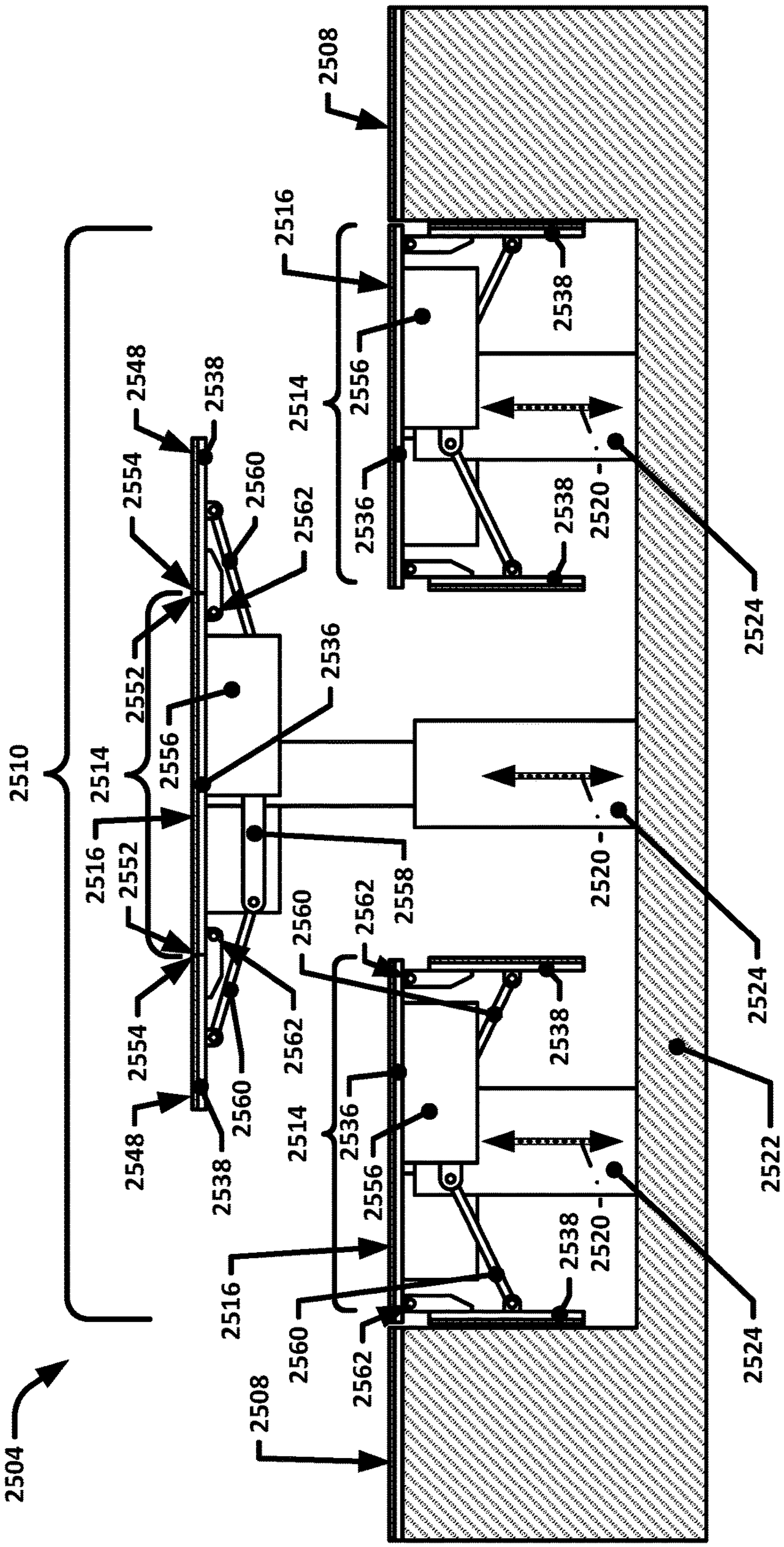

In the first configuration, the side panels 2538 of a movable display unit 2514 may be positioned behind the second display panel 2516 of the movable display unit 2514 when viewed along the first axis 2520 with the linear drive mechanism 2524 of the corresponding movable display unit 2514 located behind the second display panel 2516, as shown for all of the movable display units 2514 in FIGS. 25 and 26 and for the two outer movable display units 2514 in FIGS. 27 and 28. In such a configuration, the footprint of the movable display unit 2514 may be constrained to generally be the same size as the second display panel 2516 of that movable display unit 2514 when viewed along the associated first axis 2520.

In the second configuration, the side panels 2538 of the movable display unit 2514 may be positioned such that a major surface of each side panel 2538 is positioned with an edge 2554 proximate to one of the edges 2552 of the second display panel 2516 of the corresponding movable display unit 2514 and such that the major surface is substantially parallel with the second display panel 2508 of the corresponding movable display unit 2514, e.g., as shown for the middle movable display unit 2514 in FIG. 28.

In the depicted implementation, each actuation mechanism 2556 is a piston-type actuator that, when actuated, causes the associated piston 2558 to extend from the housing of the actuation mechanism 2556. The piston 2558 may be connected with a respective side panel 2538 by way of a link 2560 that is pivotally connected with the piston 2558 and the respective side panel 2538 at each end so as to cause the side panel 2538 to rotate about the rotational axis of the hinge 2562 to which it is attached and into the second configuration when the actuation mechanism 2556 is actuated. FIG. 27 depicts the actuation mechanisms 2556 in a semi-deployed state, and the side panels 2538 halfway transitioned between the first configuration and the second configuration.

It will be recognized that other types of mechanisms aside from the depicted hinge/piston/link mechanism may be used as well, and this disclosure is to be understood to include implementations where a different mechanism is used to transition the side panels between the first and second configurations. For example, more complex linkages, such as four-bar linkages, may be used, as well as other types of actuators, e.g., rotary actuators. In some implementations, the side panels 2538 for a movable display unit 2514 may be driven by a common actuation mechanism 2556 that causes all of the side panels 2538 to move in unison. In other implementations, however, each side panel 2538 of a movable display unit 2514 may be provided with its own actuation mechanism 2556 so as to allow each side panel 2538 to be transitioned between the first and second configurations independently. Such implementations may be useful when the side panels 2538 of two adjacent movable display units 2514 that are at the same elevation are to be actuated—the side panels 2538 that are adjacent may not be able to be actuated into the second configuration in such circumstances since they will collide with each other, potentially causing damage to the system. In such instances, the side panels 2538 that are adjacent may be left unactuated to prevent such an occurrence.

As shown, the side panels 2538 include third display panels 2548 (the cabling/connectors for such display panels are not shown) so that, in the second configuration, the second display panel 2516 and the adjacent third display panels 2548 may form a generally contiguous display area. It will also be understood, however, that some similar movable display units 2514 may not include third display panels 2548 on the side panels 2538, but may instead include illuminable elements, e.g., electroluminescent panels, large-format LEDs (as opposed to pixel-based LEDs used, for example, in OLED displays), and/or translucent or transparent light pipe features coupled with light sources, in order to provide an illumination effect around the second display panel 2516 of such movable display units 2514. In yet other implementations, the side panels 2538 may not include any illuminable elements or third display panels 2548, and may instead simply include static decorations, e.g., silkscreened or printed embellishments or designs, or other decorative patterns.

It will also be understood that a movable display unit may include a combination of different types of side panels. For example, some movable display units may include some side panels that are fixed in place, e.g., similar to the side panels of FIG. 8, and some side panels that are transitionable between first and second configurations, such as side panels 2538. For example, some movable display units may include two transitionable side panels mounted opposite one another, and two static side panels along the edges interposed therebetween.

Various types of linear drive mechanisms may be used to provide the linear translation capability of the movable display units discussed herein. As discussed earlier, solenoids, stepper motors, servo motors, hydraulic or pneumatic pistons, screw drives, or other types of linear actuator mechanisms may be used. Additionally, some linear drive mechanisms may use a cam mechanism to drive the linear translation capability of the movable display units in some implementations.

Figure 29:
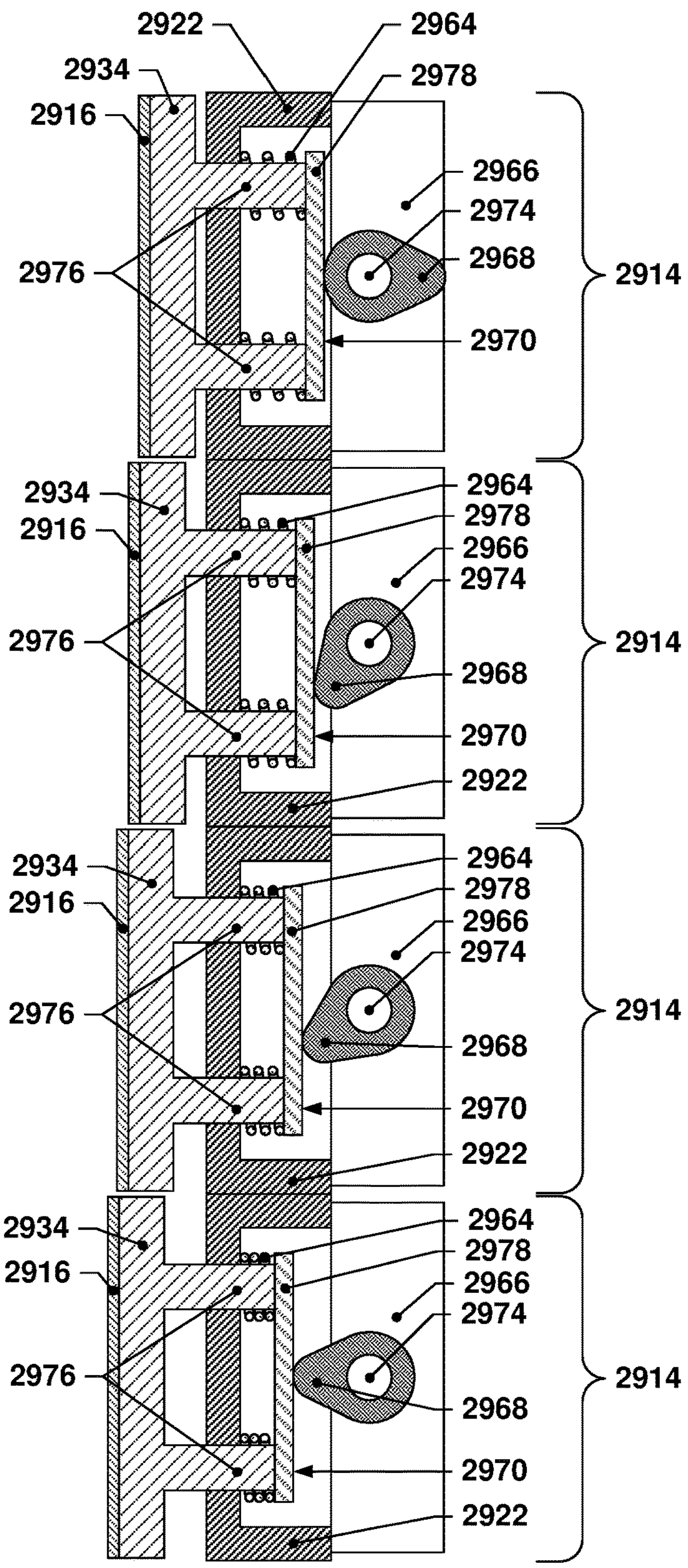
FIG. 29 depicts a side section view of one implementation of example movable display units.

FIG. 29 depicts a side section view of one implementation of example movable display units with a cam-type linear drive mechanism. In FIG. 29, a side view of an array of movable display units 2914 is shown (four are shown, but more or fewer could be used; additionally, a two-dimensional array of movable display units 2914 may be used as well). Each movable display unit 2914 may include a second display panel 2916 that is supported by an understructure 2934 that is configured to slide relative to a support structure 2922, e.g., by linear guides 2976. In this example, the linear guides 2976 are two or more cylindrical rods, although other types of linear guides may be used as well. In this example, the linear guides 2976 are capped by a cap plate 2978 and a pair of springs 2964 are sandwiched between the cap plate 2978 and the support structure 2922, thereby causing the understructure 2934 to be biased towards the support structure 2922. When force is applied to the cap plate 2978 of a movable display unit 2914 and towards the second display panel 2916, this causes the understructure 2934 and the second display panel 2916 of that movable display unit 2914 to actuate and translate the second display panel outwards into an extended position or configuration.

Such actuation force may be provided, for example, by a rotary cam mechanism. For example, the movable display units 2914 may each include a motor 2966 that is fixed in space with respect to the support structure 2922, a driveshaft or camshaft 2974, and a cam 2968. When the motor 2966 is actuated, this may cause the driveshaft or camshaft 2974 to rotate, thereby rotating the cam 2968. As the cam 2968 rotates, it may engage with a cam engagement surface 2970 that is part of the movable portion of the movable display unit 2914. In this example, the cam engagement surface 2970 is the surface of the cap plate 2978 that faces towards the cam 2968. When the cam lobe (the "high" point of the cam, or the portions of the cam that are generally further from the rotational center of the cam than the portions of the cam that are closest to the rotational center of the cam) engages with the cam engagement surface 2970, this causes the cam engagement surface 2970 to be pushed away from the driveshaft or camshaft 2974, thereby providing the force needed to cause the understructure 2934 and the second display panel 2916 to be displaced outwards. When the cam lobe is no longer engaged with the cam engagement surface 2970, the springs 2964 may act to push the cam engagement surface 2970 back into the non-actuated position. In this example, each of the movable display units 2914 has been actuated to a different degree, resulting in the second display panels 2916 being translated outwards by different amounts (the uppermost second display panel 2916 is in an unactuated state due to the positioning of the cam 2968.

Figure 30:
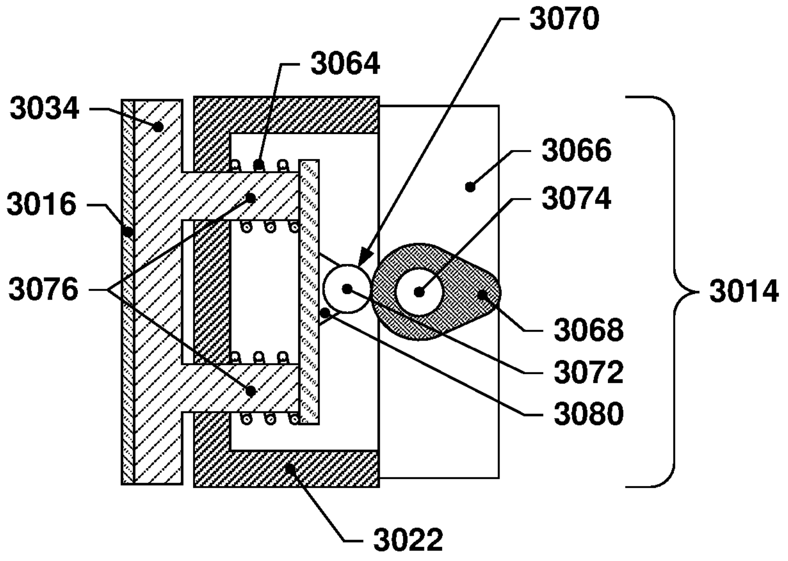
FIG. 30 depicts a side section view of another implementation of an example movable display unit.
Figure 31:
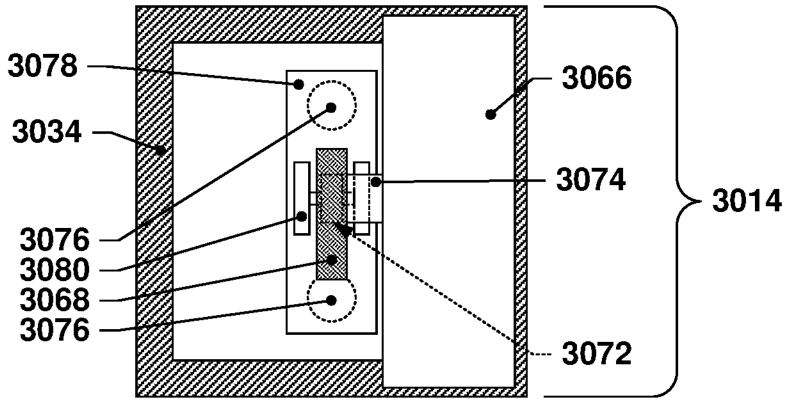
FIG. 31 depicts a rear view of the implementation of the example movable display unit of FIG. 30.

FIG. 30 depicts a side section view of another implementation of an example movable display unit with a cam-driven linear drive mechanism; FIG. 31 depicts a rear view of the implementation of the example movable display unit of FIG. 30. Movable display unit 3014 is similar to those shown in FIG. 29, and reference numbers with the same last two digits are used to indicate components common to both; the descriptions of such components from FIG. 29 are equally applicable to the counterpart components of FIGS. 30 and 31 unless otherwise indicated.

The movable display unit 3014 differs from the movable display unit 2914 in that the cam engagement surface 3070 is provided by a cam follower 3072, which may be rotatably supported by a pillow block 3080 mounted to, supported by, or otherwise fixedly connected with the understructure 3034 and/or the linear guides 3076. The use of the cam follower 3072 may provide a rolling contact surface that may reduce friction and actuation force needed to actuate the movable display unit 3014. The operating principles are similar, however, to those of the implementation of FIG. 29.

Figure 32:
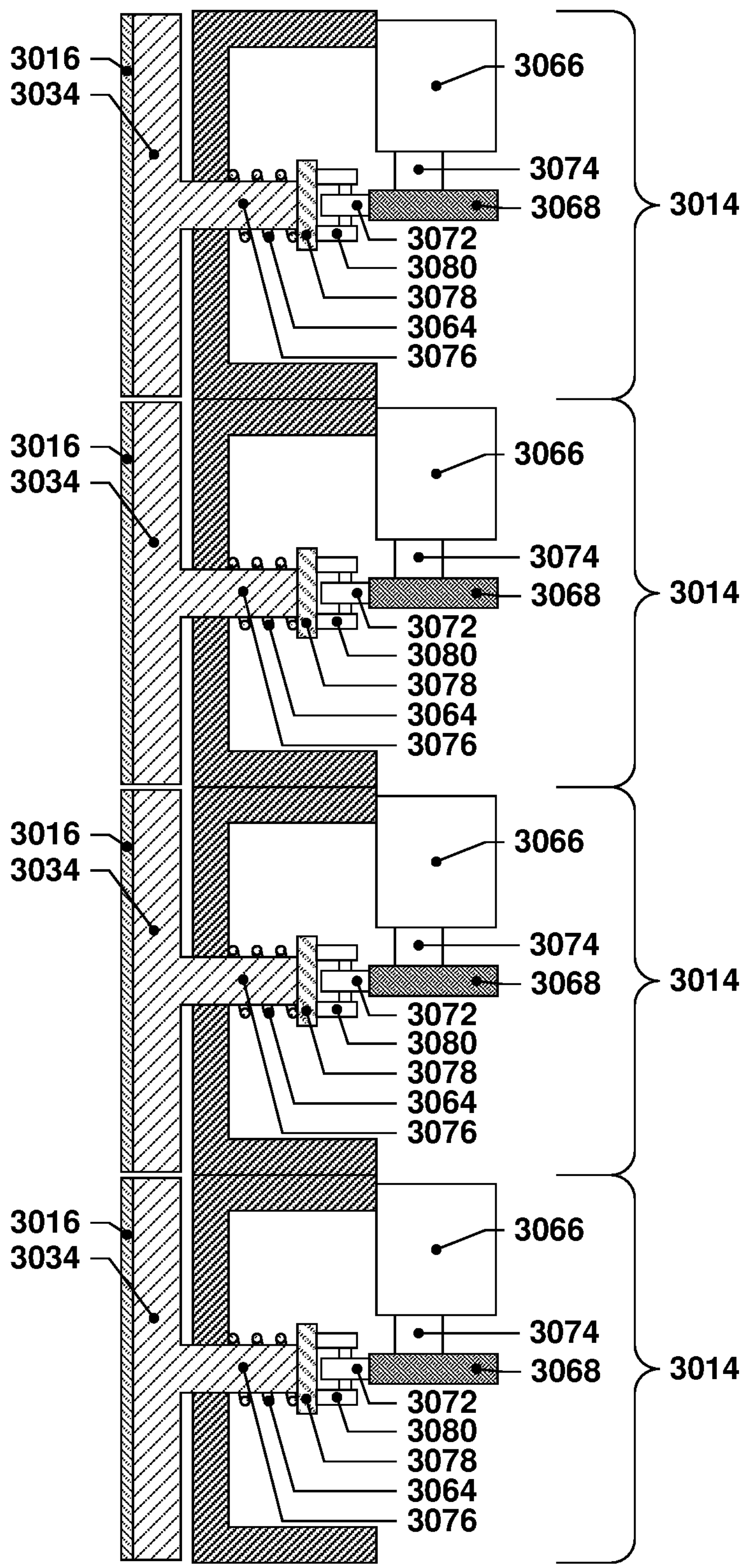
FIG. 32 depicts a side section view of a plurality of the example movable display units of FIGS. 30 and 31 arranged side-by-side.

FIG. 32 depicts a side section view of a plurality of the example movable display units of FIGS. 30 and 31 arranged side-by-side. As can be seen, the movable display units 3014 may be ganged together in a manner similar to that shown for the implementation of FIG. 29. It will be generally evident that dynamic display units using movable display units may be manufactured in a modular fashion, or as a device with a non-modular support structure. If built in a modular fashion, one or more movable display units may be housed in a single unit, with a common support structure that may be joined to adjacent support structure(s) of other movable display units—this may allow for easy assembly of custom-sized displays and may facilitate repairs if a movable display unit fails (the failed unit may be removed and replaced with an operable unit).

Figure 33:
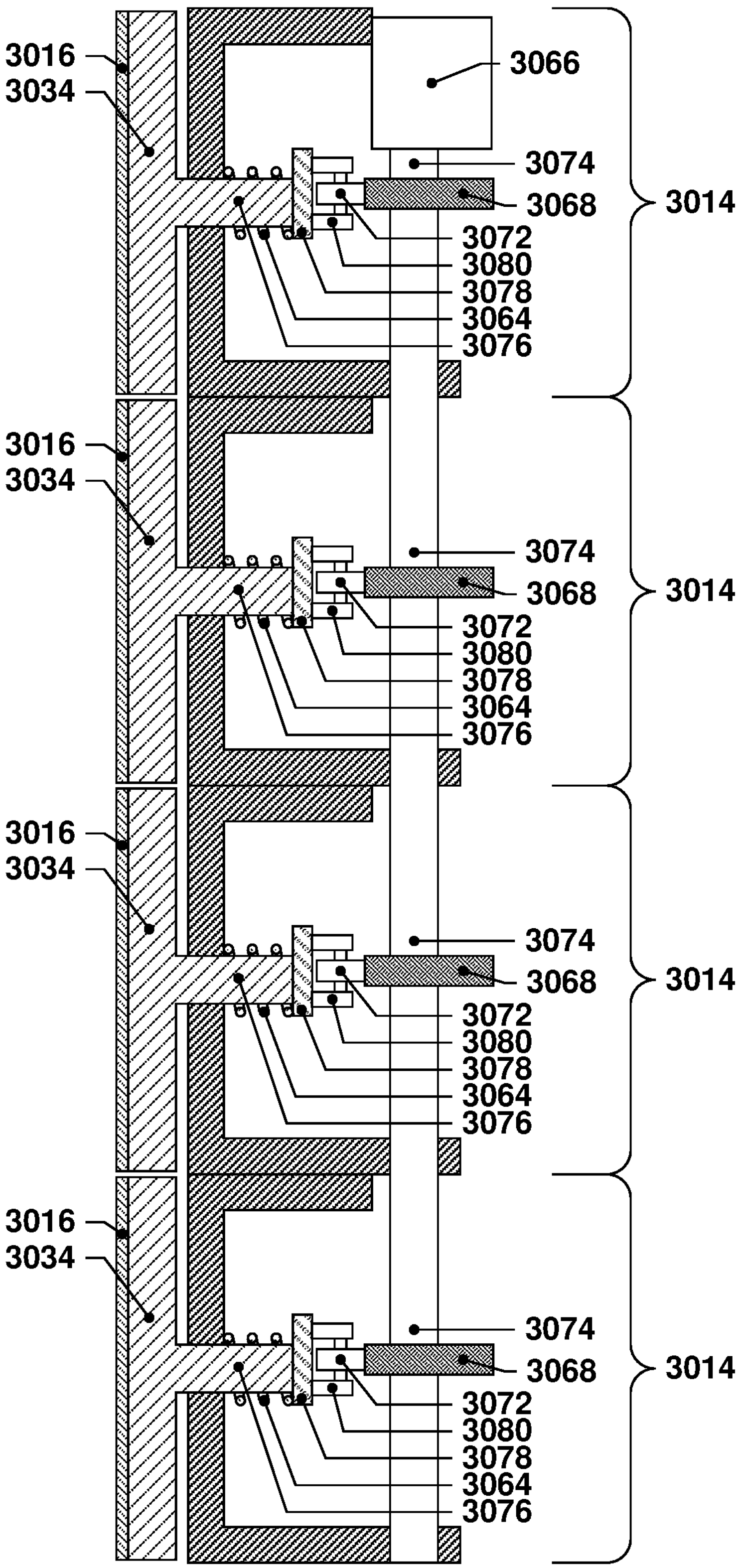
FIG. 33 depicts a side section view of another example of a plurality of example movable display units arranged side-by-side.

FIG. 33 depicts a side section view of another example of a plurality of example movable display units arranged side-by-side. In FIG. 33, the movable display units 3014 have cam-equipped linear drive mechanisms that are all connected with a common driveshaft or camshaft 3074. In such an example, the actuation of the movable display units 3014 may be "fixed" in that for any given rotational position of the driveshaft or camshaft 3074, there is one and only one corresponding position of each understructure 3034 and second display panel 3016. If a dynamic display is intended to be controlled to show "linear" effects, e.g., to cause the movable display units to actuate in a "wave" that travels across the display, then such commonly driven actuation systems may be used and may avoid the need for separate linear drive mechanisms (or at least multiple motors therefore), thereby driving down cost.

For example, if five of the arrangements shown in FIG. 33 were placed side-by-side with the driveshafts or camshafts 3074 spaced apart from one another along a direction perpendicular to their rotational axes, then each motor 3066 could be actuated for a full revolution and at the same speed but with different angular starting positions (or different start times) to produce a wave that travels across the display. If desired, the cams 3068 mounted to each driveshaft or camshaft 3074 may also be mounted out of phase with one another so as to produce a "pulse" effect that travels in a direction parallel to the rotational axis of the driveshaft or camshaft 3074. For example, each cam 3068 mounted to a driveshaft or camshaft 3074 may be positioned at an X° offset from the angular orientation of the adjacent cam 3068.

In some implementations, movable display units as discussed herein may be provided in a non-planar format, e.g., with the axes of translation for the movable display units in a given column of movable display units being non-parallel with each other. For example, the axes of translation for the movable display units in a column of movable display units may be arranged so as to intersect at a common point, e.g., the axes of translation for the movable display units in that column may radiate outward from a common point. Such arrangements may be used to make a column of movable display units appear to be more "reel-like," e.g., having observable curvature.

Figure 34:
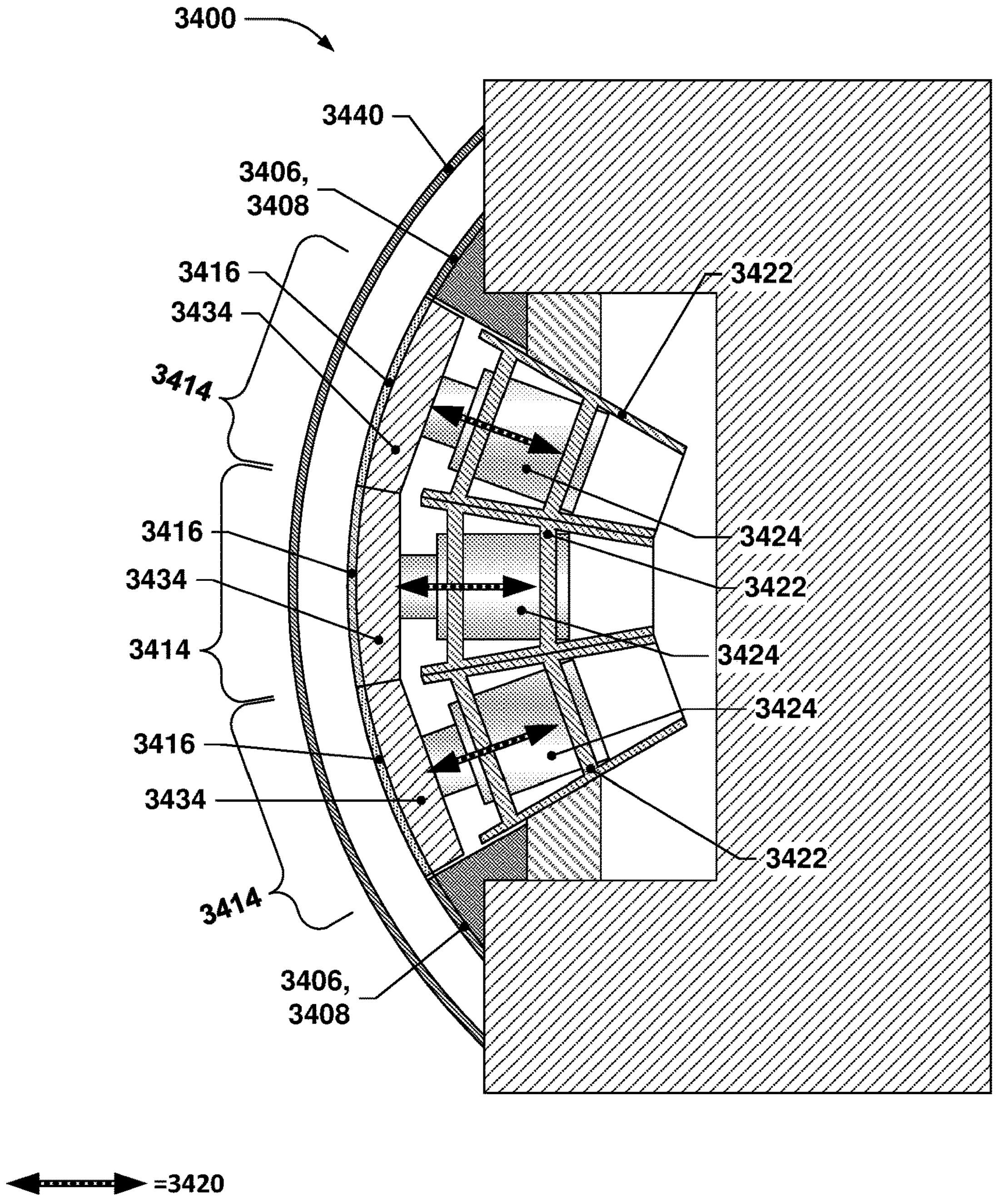
FIGS. 34 and 35 depict an apparatus with movable display units with non-parallel translation axes in two different use states.

FIG. 34 depicts an example of an apparatus 3400 that features a bank of movable display units 3414, each of which is supported by a linear drive mechanism 3424 that is attached to a support structure 3422 and includes an understructure 3434 and a display panel 3416 supported thereby. As can be seen, each linear drive mechanism 3424 may be configured to independently extend and retract the understructure 3434 and the display panel 3416 of the movable display unit 3414 supported thereby along a corresponding first axis 3420 responsive to one or more input signals.

In some implementations, the display panels 3416 may be flat display panels, giving the appearance of providing a faceted arcuate aggregate display surface. In other implementations, however, such as the one depicted, the display panels 3416 may be curved or arcuate display panels that may have a radius of curvature that is selected such that the display panels 3416 in a column of movable display units 3414 form a generally co-radial aggregate display surface when the movable display units 3414 are placed into a first retracted state, e.g., with each movable display unit 3414 fully retracted. "Co-radial," as the term is used herein, refers to arcs having the same radius and center point (or, in the case of an aggregate display surface composed of multiple smaller arcuate display surfaces, that the smaller arcuate display surfaces have the same radius of curvature and the same center point). The display panels 3416 may, for example, be liquid crystal display (LCD) panels, organic light emitting diode (OLED) display panels, etc.

Figure 35:
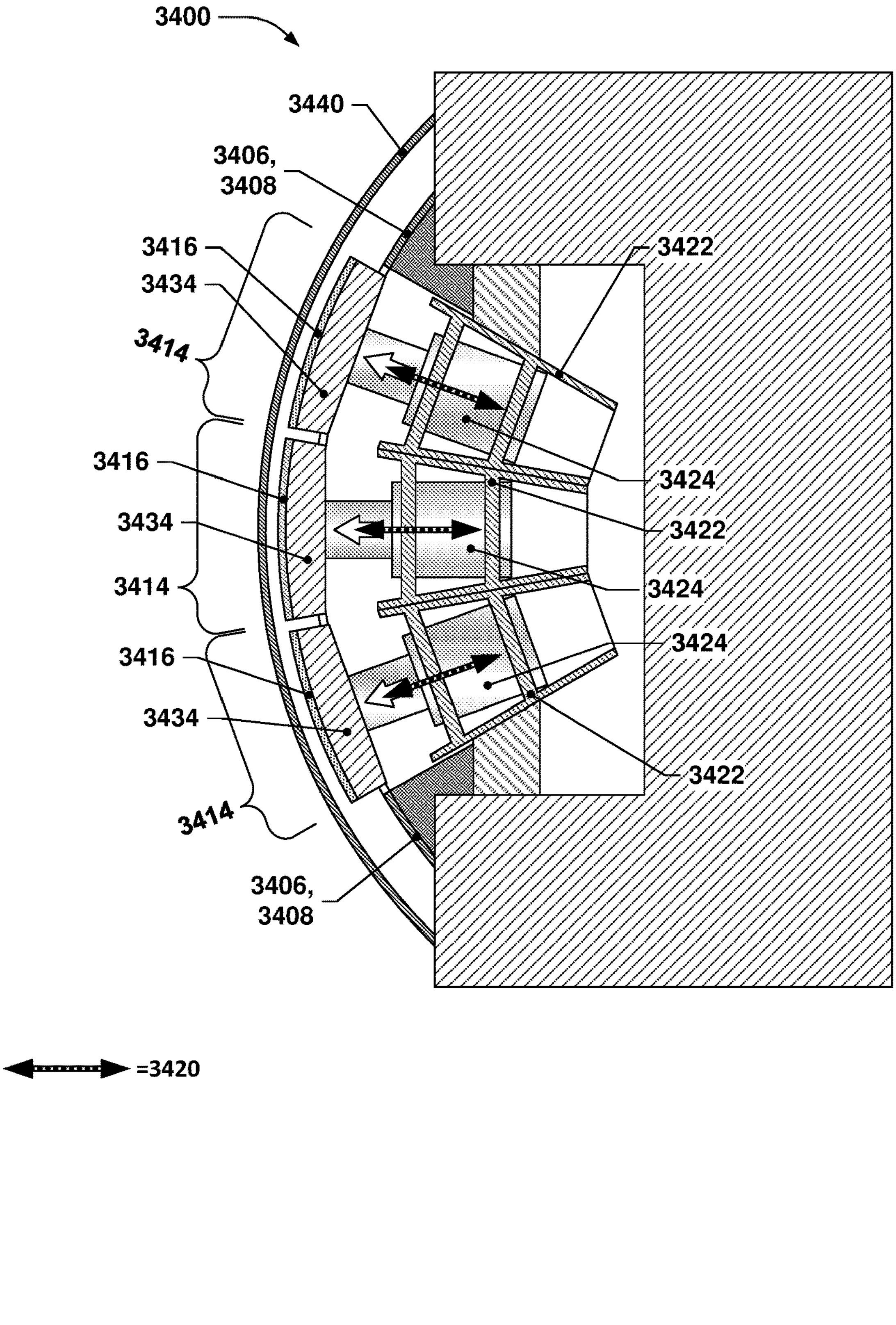

Such an arrangement may give the appearance of a generally contiguous reel strip of a slot machine. However, if a winning combination of symbols is displayed, for example, the movable display units 3414 that display symbols that form part of the winning combination of symbols may be actuated so as to cause the display panels 3416 displaying those symbols to translate outward along the first axis 3420, as shown in FIG. 35 (in FIG. 35, all of the display panels 3416 in the depicted column of movable display units 3414 have been extended outwards along their respective first axes 3420).

In some implementations, a display frame 3406 may be provided above, below, and/or at the sides of the array of movable display units 3414 using display panels 3408, similar to the flat display frames discussed with respect to earlier implementations presented herein. As shown in FIG. 34, such a display frame may also have curved elements so as to be co-radial with the display panels 3416 when in the movable display units 3414 are in a retracted state. In such implementations, a cover glass 3440 may be provided as well to provide a protective, but transparent, barrier between the movable display units 3414 and the player. The cover glass 3440, as well as other cover glass elements discussed herein, may be understood to be curved (as shown) or flat, and may optionally be made of a suitable material other than glass, e.g., transparent polycarbonate. In other words, the term "cover glass" should not be construed to be limited only to structures made of actual glass, but is a term of art that is used to refer to transparent structures that act to cover a reel display of a gaming machine to protect it against dust, liquids, damage, etc. while still allowing the underlying reel display to be seen by a player-such structures may be made of glass, polycarbonate, acrylic, or any suitable transparent material.

It will also be understood that in implementations having a cover glass, the cover glass may also, as discussed earlier herein with respect to the dynamic display 804, incorporate a touch screen interface that may be used by a player to interact with the movable display units 3414 (or other movable display units of other implementations) or other displays of electronic gaming machines incorporating the movable display units discussed herein.

It will also be understood that for implementations with curved cover glass structures, the radius of curvature of the curved cover glass may be selected so as to generally align with the radius of curvature defined by the movable display units when in their fully extended states. For example, if there are three movable display units that are fully extended, there will be a smallest-radius arc that touches, but is not crossed by, all three of the extended movable displays—the cover glass may be configured to have, for example, that same radius of curvature or a radius of curvature slightly larger than that, e.g., 1 mm, 2 mm, 3 mm, 4 mm, or 5 mm larger than that, or any value in between any of those values.

In arrangements such as those discussed above, a "reel spin" may be presented by causing images of reel symbols to move from top to bottom (or bottom to top) of the display panels 3416 in each column of display panels 3416 in a sequential manner so as to give the appearance of a continuous strip of symbols being rotated about an axis coinciding with the intersection point of the first axes 3420 of a given column of movable display units 3414. When the spin terminates, the animations of such symbols may slow and stop. Any movable display units 3414 that show symbols of interest, e.g., symbols forming part of a winning pattern, wild symbols, free game symbols, feature game trigger symbols, scatter symbols, multiplier symbols, etc., may be actuated so as to move radially outward towards the player. In some implementations, such movement may be cyclic, e.g., repeatedly moving inward and outward.

Figure 36:
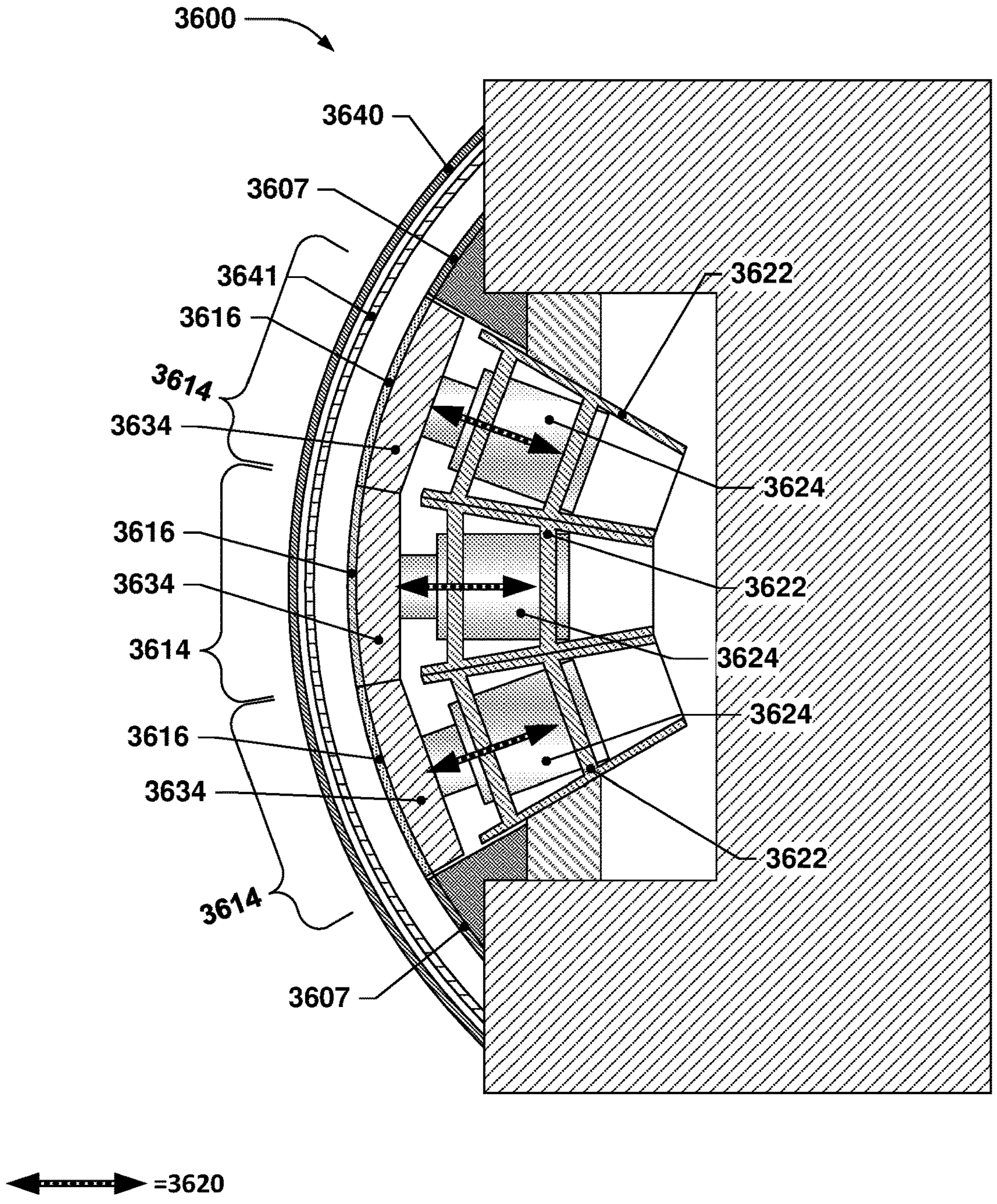
FIGS. 36 and 37 depict another apparatus with movable display units with non-parallel translation axes in two different use states.

FIG. 36 depicts an example of an apparatus 3600 that features a bank of movable display units 3614, each of which has an understructure 3634 that supports a display panel 3616. Each movable display unit 3614 may be movably supported by a linear drive mechanism 3624 that is mounted to a support structure 3622. As in the apparatus 3400, which is very similar in construction, each linear drive mechanism 3624 may be configured to independently extend and retract the understructure 3634 and the display panel 3616 of the movable display unit 3614 supported thereby along a corresponding first axis 3620 responsive to one or more input signals.

As with the apparatus 3400, the display panels 3616 may be flat display panels in some implementations, giving the appearance of providing a faceted arcuate aggregate display surface. In other implementations, however, such as the one depicted, the display panels 3616 may be curved or arcuate display panels that may have a radius of curvature that is selected such that the display panels 3616 in a column of movable display units 3614 form a generally co-radial aggregate display surface when the movable display units 3614 are placed into a first retracted state, e.g., with each movable display unit 3614 fully retracted. The display panels 3616 may, for example, be liquid crystal display (LCD) panels, organic light emitting diode (OLED) display panels, etc.

The apparatus 3600 differs from the apparatus 3400 in that the apparatus 3600 includes a transmissive display element 3641 that is interposed between the cover glass 3640 and the movable display units 3614. The transmissive display element 3641 may, for example, be a planar or curved transmissive display screen that is configured to be able to provide video output responsive to one or more input signals. Illumination for the transmissive display element 3641 may be provided, for example, via light emitted from the underlying display panels 3616. For example, the underlying display panels may be configured to display an image of a single color, e.g., white, so as to provide even illumination to the transmissive display element 3641. In some implementations, one or more backlights 3607 positioned above, below, and/or on the sides of the array of movable display units 3614 may be provided to provide for additional illumination to the transmissive display element 3641 so as to make content displayed thereupon visible to a player.

Figure 37:
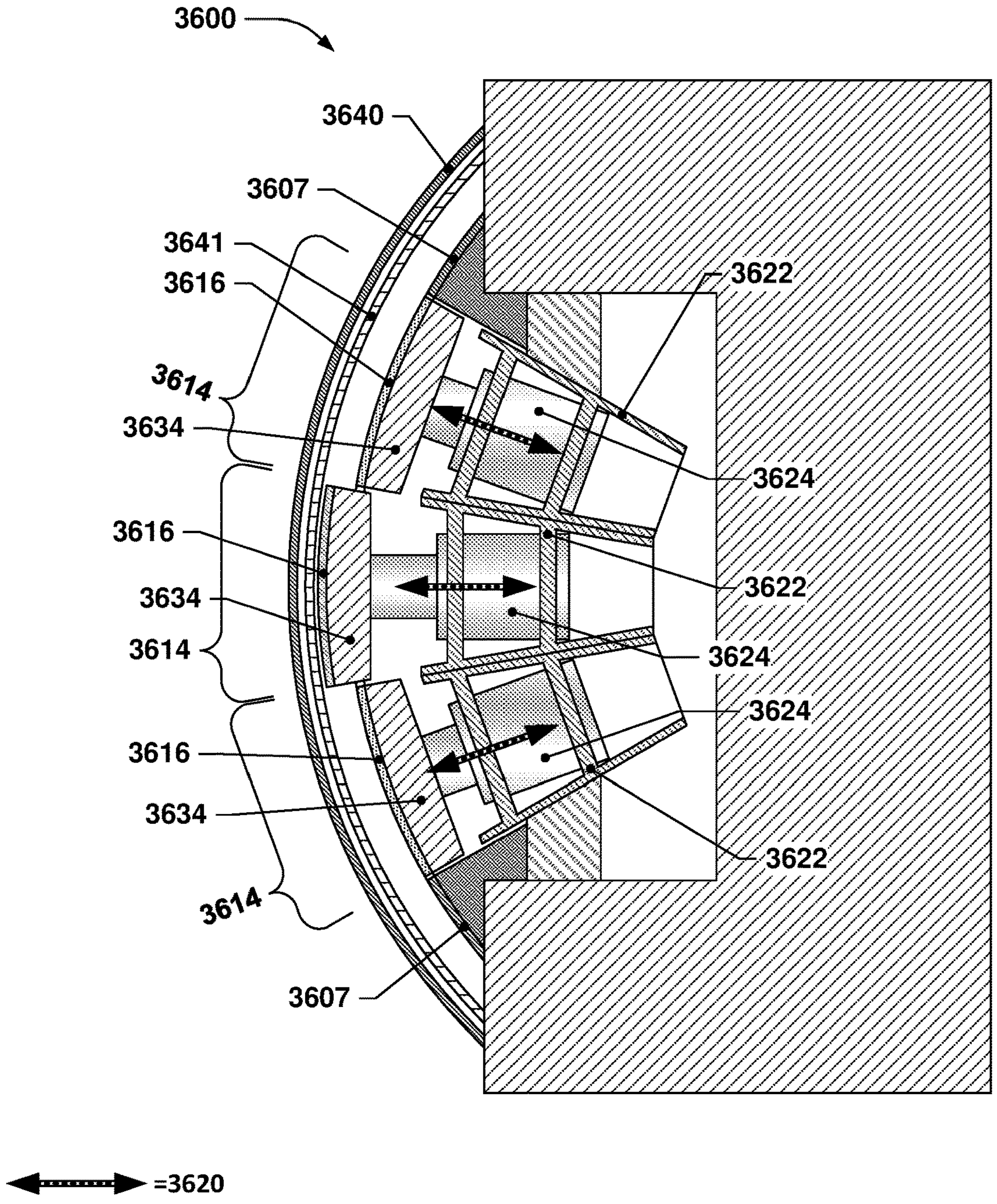

In such implementations, the transmissive display element 3641 may be configured to display animations of reel spins during play of a symbol-based game. During such displays, the movable display units 3614 may be used as backlights for the transmissive display element 3641. When it is desired to emphasize a particular symbol position shown on the transmissive display element 3641, the movable display unit 3614 positioned behind the transmissive display element 3641 in the location corresponding with that symbol position may be caused to display the same symbol as is shown on the transmissive display element 3641 in that location (or a graphic associated with that symbol) in conjunction with the transmissive display element 3641 being caused to no longer display that symbol in that location, e.g., display a "blank" image (for example, an image showing a uniform field of white). Thus, display of the graphics in that symbol position of the transmissive display may be "handed off" to the movable display unit 3614. The movable display unit 3614 may then be actuated so as to move the associated display panel 3616 to move closer to/further from the transmissive display element 3641, as shown in FIG. 37, thereby creating visual presentation that emphasizes the associated symbol position. It will be understood that for implementations with transmissive display elements discussed herein that the transmissive display elements may be caused to, at desired times, display "blank" images (as discussed above) over all or part of their active display area in order to turn that region of the transmissive display element effectively transparent so that the movable display unit(s) or other hardware positioned behind the transmissive display elements can be seen by the viewer.

For example, in some implementations, animations of spinning reels may be caused to be shown on the movable display units of an electronic gaming machine while a transmissive display element of such an electronic gaming machine may be caused to display a "blank" image in at least the regions thereover that overlay the movable display units, thereby allowing the animations shown on such movable display units to be seen by the viewer. The transmissive display element may, in such implementations, then be used to provide other visual effects, e.g., highlighting particular underlying movable display units by displaying glowing borders around the same.

In another use case, a transmissive display element may be caused to be mostly transparent in the region(s) over one or more movable display elements, but may also be caused to display a portion of a symbol over one or more such movable display elements. The displayed portion of a symbol may have a corresponding or complementary portion that is displayed on the movable display elements, and if a movable display element that is behind a region of the transmissive display element that displays such a symbol portion is caused to display the complementary symbol portion therefor as a symbol at the conclusion of a reel spin, then the two displayed, complementary portions may be treated as forming a particular symbol, e.g., a bonus trigger symbol, an award multiplier, or other special symbol.

In some implementations, a display frame 3606 may be provided above, below, and/or at the sides of the array of movable display units 3614 using display panels 3608, similar to the flat display frames discussed with respect to earlier implementations presented herein. In some such implementations, a cover glass 3640 may be provided as well to provide a protective, but transparent, barrier between the transmissive display element 3641 and the player. The cover glass 3640, as well as other cover glass elements discussed herein, may be understood to be curved (as shown) or flat, and may optionally be made of a suitable material other than glass, e.g., transparent polycarbonate.

The implementations of FIGS. 34 through 37 do not feature moving parts in the display area other than the movable display units. Other implementations, however, may combine movable display units with other movable elements, e.g., rotatable reel strips, for a unique visual effect.

Figure 38:
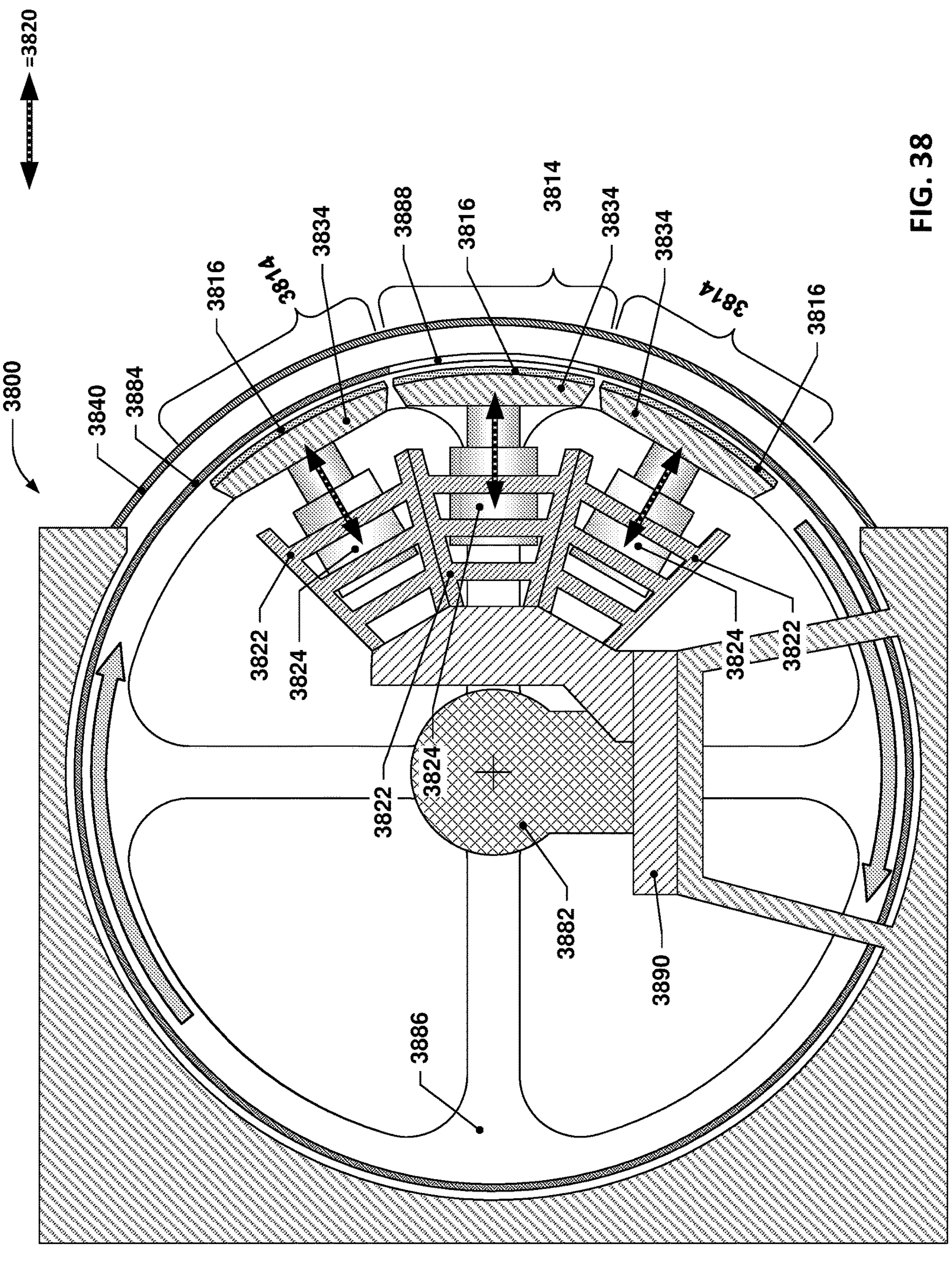
FIGS. 38 through 41 depict an apparatus with movable display units and a rotatable reel strip.

FIG. 38 depicts a diagram of an example apparatus with movable display units combined with other movable components.

In FIG. 38, an apparatus 3800 is shown that includes a plurality of movable display units 3814 that are arranged in a manner similar to that shown in FIGS. 34 and 36, e.g., with first axes 3820 that converge on a common center point. The movable display units 3814 may each be supported by a corresponding support structure 3822 that supports a linear drive mechanism 3824 that may be controlled via one or more input signals to cause a corresponding understructure 3834 of the corresponding movable display unit 3814 supporting a display panel 3816 to either extend or retract along the corresponding first axis 3820.

Figure 39:
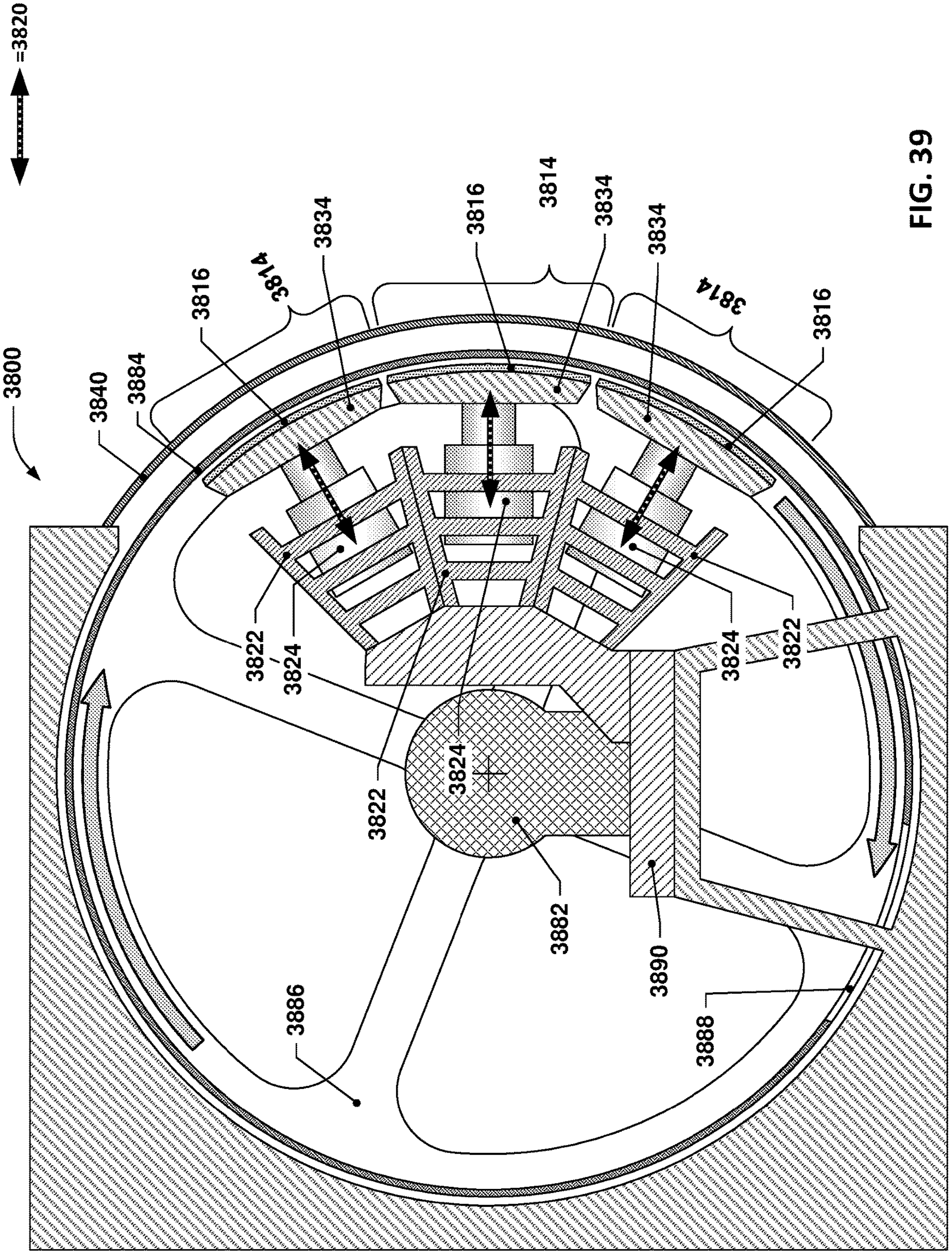

The movable display units 3814 may be mounted within a reel basket 3886 that may be configured to rotate about a center axis. The reel basket 3886 may, for example, include a cylindrical structure that may be configured to have a reel strip 3884 (a flexible strip of material that typically has a sequence of symbols printed thereupon) wrapped around it as well as a structure that supports this cylindrical structure relative to a rotational bearing or other rotational device, e.g., the output shaft of stepper motor 3882. It will be understood that rotational movement of reel baskets, as discussed herein, may also be provided via any suitable rotational drive system, including, but not limited to, servo motors, AC brushless motors, DC brushed motors, DC brushless motors, and other devices that may be controlled to produce a rotational output. The interior of the reel basket 3886 may largely be hollow or empty so that the stepper motor 3882, the movable display units 3814, and the linear drive mechanisms 38 24 and support structures 3822 may be housed within a cylindrical volume located within the reel basket 3886 and the reel strip 3884. In such a configuration, the stepper motor 3882 and the support structures 3822 of the movable display units 3814 may be supported, directly or indirectly, within the reel basket 3886 by a stepper motor ledge 3890 or other structure, which may be fixed with respect to the overall apparatus 3800, but may be designed so as to allow the reel basket 3886 to rotate freely about its center axis when actuated using the stepper motor 3882, as shown in FIG. 39. As shown in FIG. 38, the rotation is clockwise, although it will be understood that the rotation may also be counter-clockwise.

The reel strip 3884 in the apparatus 3800 is different from typical reel strips used in symbol-based reel games in that the reel strip 3884 may have one or more reel strip openings 3888 located along its length/circumference. In the depicted implementation, only one reel strip opening 3888 is shown, but it will be understood that additional reel strip openings 3888 may be included in the reel strip 3884 in other implementations. In some implementations, there may be reel strip openings 3888 spaced around the entire reel strip 3884, with each reel strip opening 3888 spacing being the same as the reel stop spacing for the apparatus (spacing that aligns with the spacing between adjacent movable display units 3814 in a given column of movable display units 3814). Each reel strip opening 3888 may be sized slightly larger in size than the display panels 3816 of the movable display units 3814, thereby allowing the display panel 3816 of a given movable display unit 3814 to be extended therethrough when that reel strip opening 3888 is rotationally aligned with that movable display unit 3814 and that movable display unit 3814 is actuated so as to translate the corresponding understructure 3834 and display panel 3816.

It will be understood that the apparatus 3800 may have multiple sets of the movable display units 3814 arranged in an array that is arranged along an axis parallel to the axis of rotation of the reel baskets 3886 so as to present a X by Y array of movable display units 3814.

Figure 40:
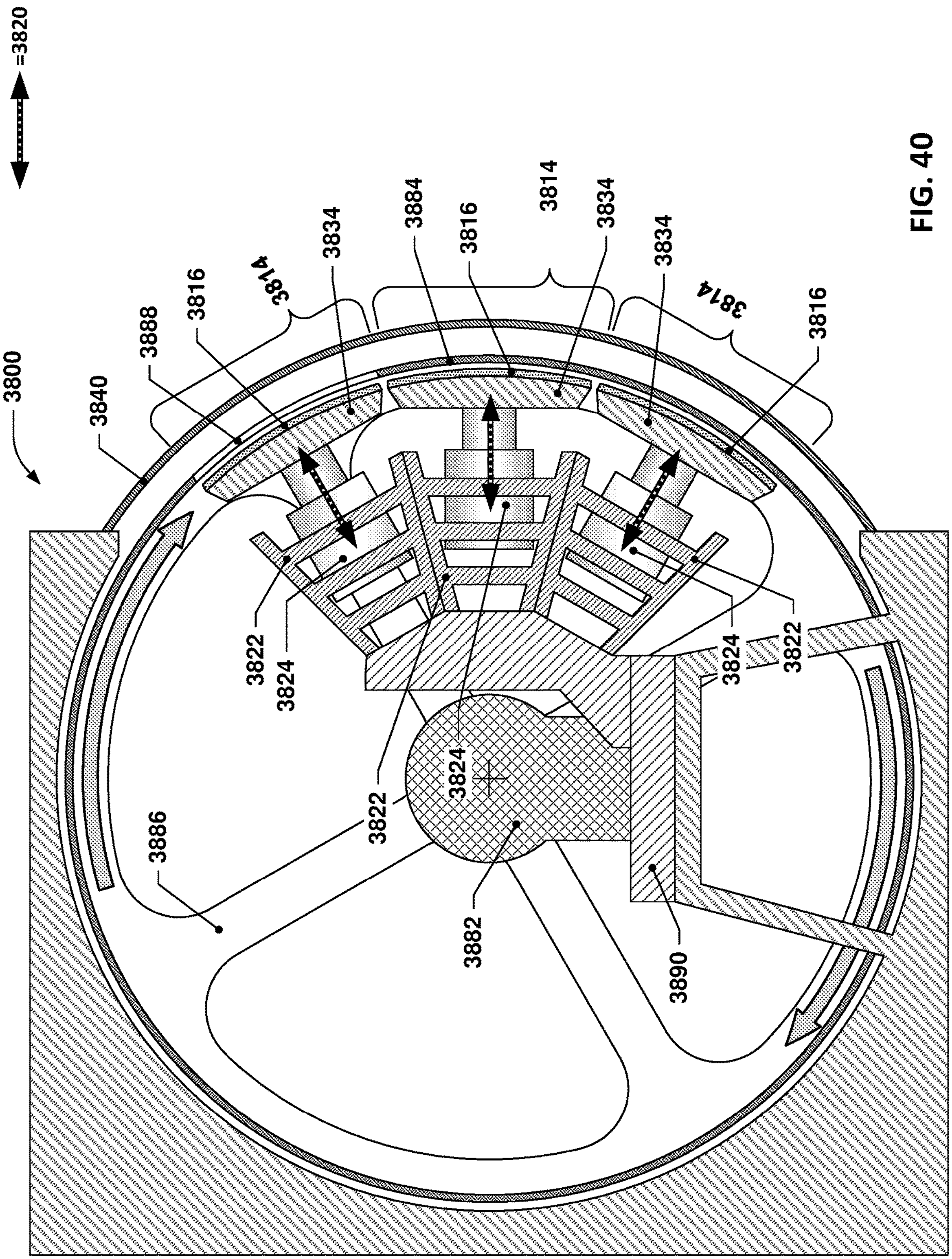
Figure 41:
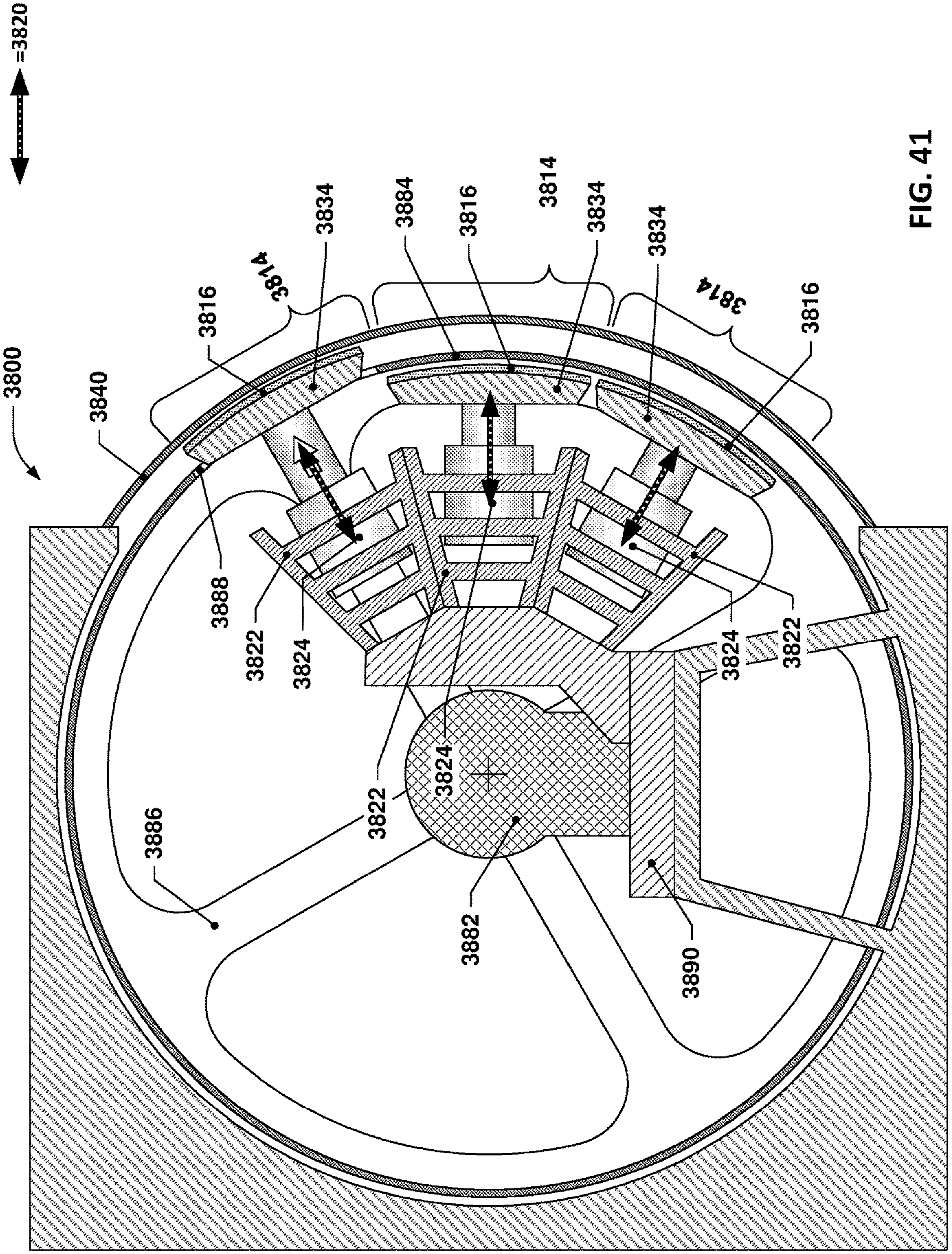

In some implementations, the apparatus 3800 may, for example, be configured to provide reel-based symbol outcomes at reel stops corresponding with the positions of the movable display units 3814 using symbols printed on the reel strips 3884 when the reel baskets 3886 are spun using the stepper motors 3882. The location(s) of the reel strip opening(s) may correspond to locations on the reel strip that are associated with a particular symbol or outcome which is not shown on the reel strip 3884, but which may, when such a reel strip opening 3888 stops over a movable display unit 3814, i.e., at one of the reel stops and as shown in FIG. 40, be displayed on the display panel 3816 of that movable display unit 3814. In conjunction with such display, the movable display unit 3814 that is caused to display that symbol may be actuated so as to cause the linear drive mechanism 3824 associated therewith to extend the display panel 3816 thereof through the reel strip opening 3888, as shown in FIG. 41.

The apparatus 3800 may also include a cover glass 3840 that may prevent players from contacting the reel strips 3884, reel baskets 3886, or movable display units 3814. It will be further understood that in some implementations, the reel strip opening(s) 3888 may instead be transparent windows in the reel strip, i.e., surfaces that the movable display units 3814 cannot translate through. In such implementations, the movable display units 3814 may be radially offset inward from the reel strip in both the extended and retracted states, with extension of a movable display unit causing it to move closer to the reel strip but not pass through it. The transparent window in the reel strip may still allow the movement of the movable display unit to be observed by a player, however.

Figure 42:
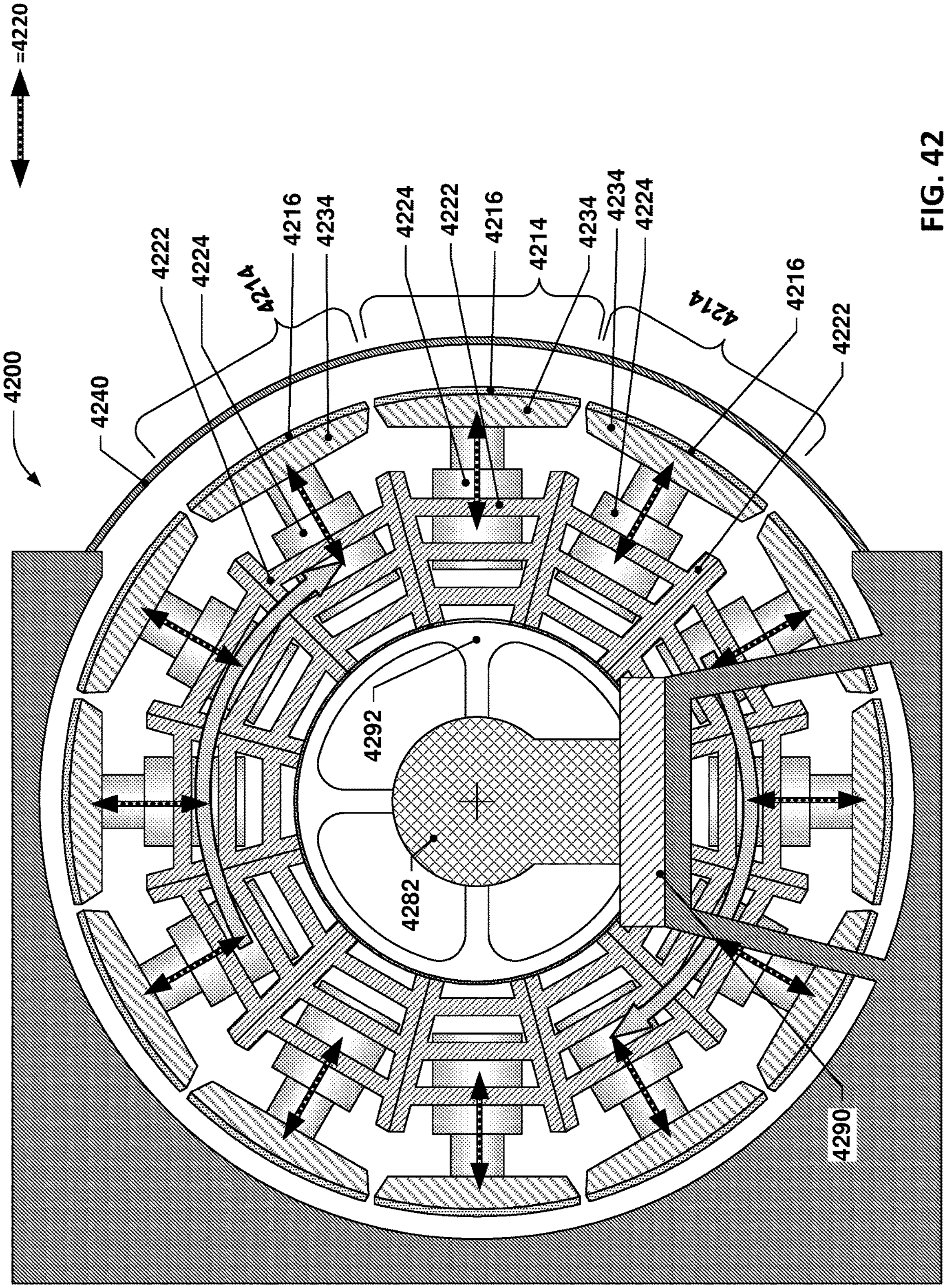
FIGS. 42 through 44 depict an apparatus with movable display units mounted to a rotatable support structure.
Figure 43:
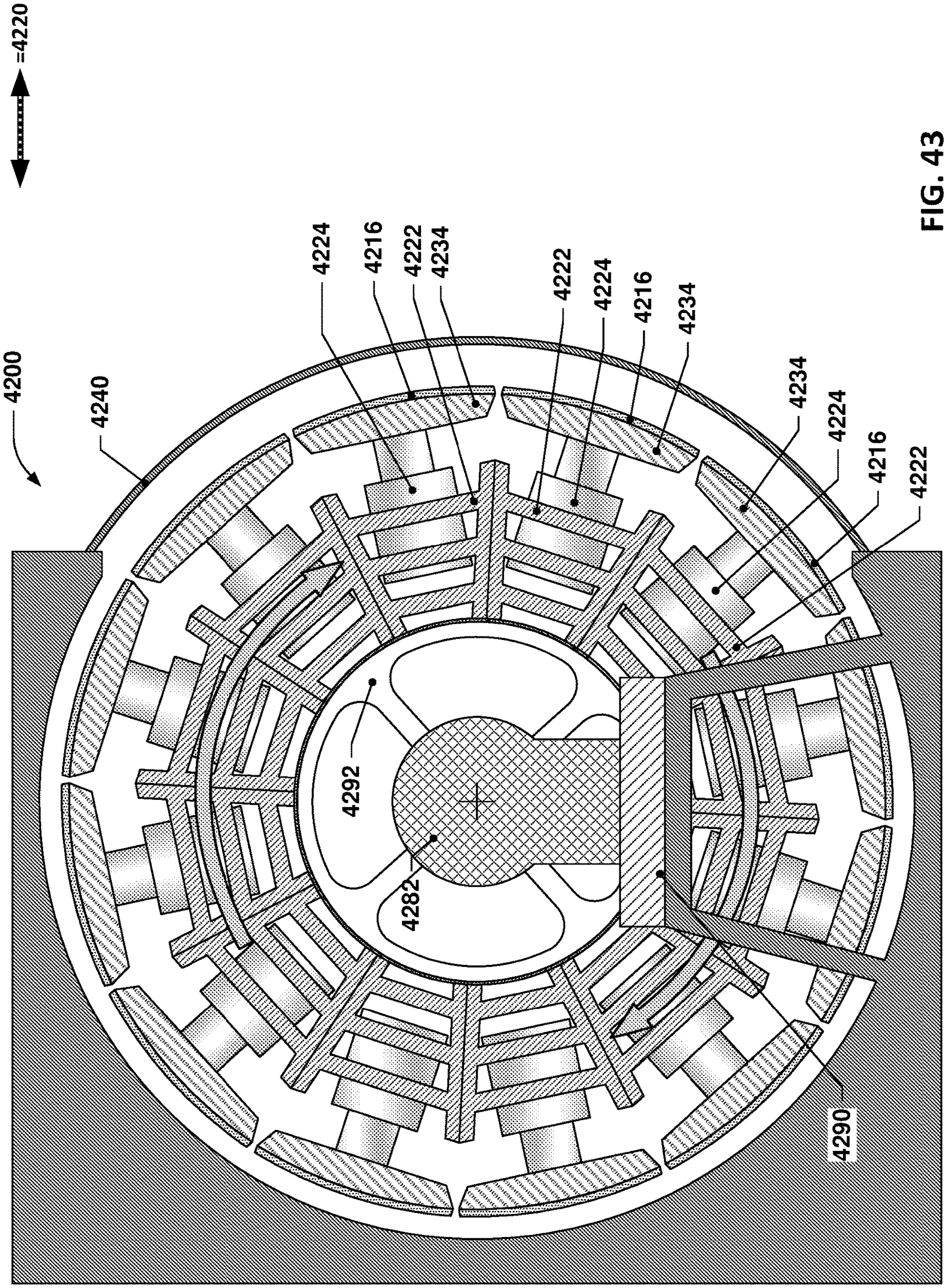

FIG. 42 shows another variant in which movable display units are coupled with another movable mechanism to provide for a unique visual display. In FIG. 42, an apparatus 4200 is shown that includes a plurality of movable display units 4214 that are arranged in a circular array. Each movable display unit 4214 has a corresponding display panel 4216 supported by a corresponding understructure 4234 that may be translated along a corresponding first axis 4220 by a corresponding linear drive mechanism 4224 that is supported by a corresponding support structure 4222. The support structures 4222 that support the linear drive mechanisms 4224 and the movable display units 4214 supported thereby may be affixed to a rotatable support structure 4292 that may, in turn, be mounted to a stepper motor 4282 that is supported by a stepper motor ledge 4290 or similar support structure that is fixed with respect to the overall apparatus 4200. The stepper motor 4282 may, responsive to receipt of one or more input signals, cause the rotatable support structure 4292 to rotate in the manner of a typical reel basket. Such rotation causes the movable display units 4214 to rotate about the same axis as well, in unison with the rotatable support structure 4292, as shown in FIG. 43. In effect, each circular array of movable display units 4214 (as in previous examples, there may be multiple sets of movable display units provided in a given apparatus 4200 and arranged in a linear array along a direction perpendicular to the page of the Figures) may act as a dynamically reconfigurable reel—any desired symbols and/or animations may be displayed on the display panels 4216.

During operation, the "reel" may be spun by activating the stepper motor 4282 so as to cause the circular array of movable display units 4214 to rotate about the stepper motor 4282 rotational axis. In some implementations, the display panels 4216 may be caused to change the content displayed thereupon in conjunction with a reel spin. For example, in some implementations, the display panels 4216 may be caused to display a particular sequence of symbols around the circumference of the reel that does not change during spinning of the reel or between reel spins. In some other implementations, however, a controller in the apparatus may cause the display panels 4216 to change the symbols that are displayed thereupon in between reel spins and/or during reel spins.

For example, in some implementations, the symbols that are displayed on the display panels 4216 may be caused to be replaced with different symbols in between two reel spins. In some such implementations, the apparatus may cause only the display panels 4216 that are not visible to the player, e.g., not visible to the player through cover glass 4240, to change the symbols that they display while the display panels 4216 that are visible to the player in between spins of the reel are caused to not change the symbols that they display. This may allow for most of the symbols for a reel to be changed in between spins without making it appear that the reel is being reconfigured. This may permit a reel to, in effect, be switched between multiple reel sets for each spin of the reel.

In some other implementations, the display panels 4216 may be caused by the apparatus to change the symbols that they display in conjunction with spinning of the reel. For example, a reel with twelve movable display units 4214 (and thus twelve display panels 4216) may, in effect, be virtually expanded by virtue of causing the display panels to display symbols taken from a set of symbols having thirteen or more symbols, i.e., a number of symbols greater than the number of movable display units 4214. The set of symbols, in effect, may act as a virtual reel strip, establishing the number and order of symbols to be displayed. The display panels 4216 arranged around the circumference of the reel may be caused to display a subset of the symbols from the set of symbols in the same order as in the set around the circumference of the reel. As the reel turns, the apparatus 4200 may cause the symbols shown by each display panel 4216 to be changed while the display panel 4216 is not visible to the player so as to display a new symbol in the sequence of symbols. For example, if there are N movable display units 4214 for a given reel and the ordered set of symbols from which symbols are to be shown has more than N symbols, then the symbol shown on a given display panel 4216 may be changed to the symbol that is associated with the sequence position M+N, where M is the sequence position associated with the symbol shown on that display panel 4216 that is to be replaced. In such an arrangement, the sequence of symbols is to be understood to, in effect, be a repeating cyclic sequence. In the case of a repeating cyclic sequence, it will be understood that for a sequence with X symbols in it, the sequence position may be determined using a modulo operation, e.g., if there are 20 symbols in the sequence and M+N=24, then the sequence position may be 24 mod 20=4. Such an apparatus may allow for physical reels to be used that may, in effect, provide outcomes based on virtual reel strips of theoretically any size regardless of how many movable display units are used (it will also be understood that this effect may be realized in reels that feature non-movable display units, i.e., display panels that are simply fixed in place relative to the rotatable support structure and are not capable of linear translation).

Figure 44:
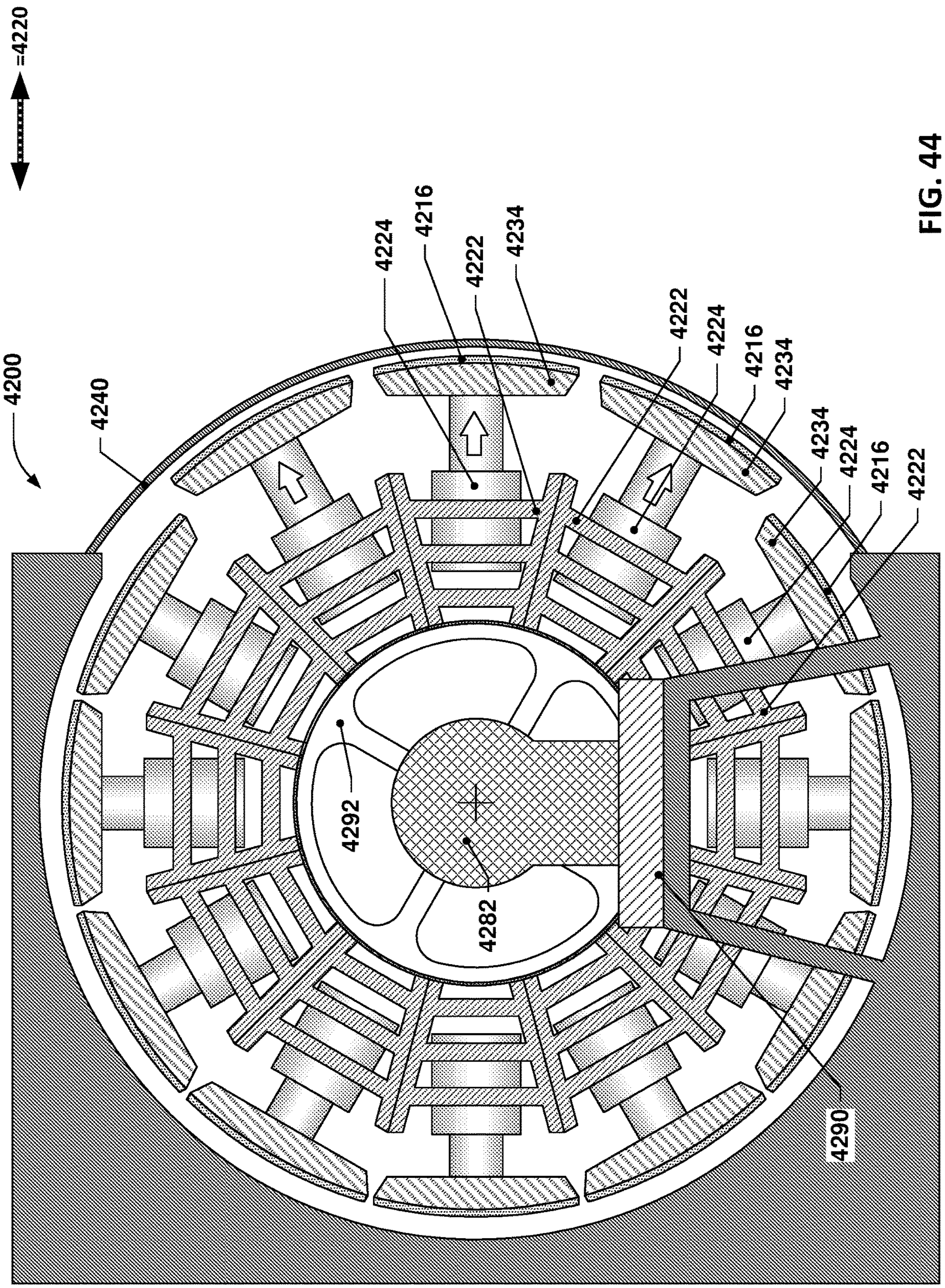
Figure 45:
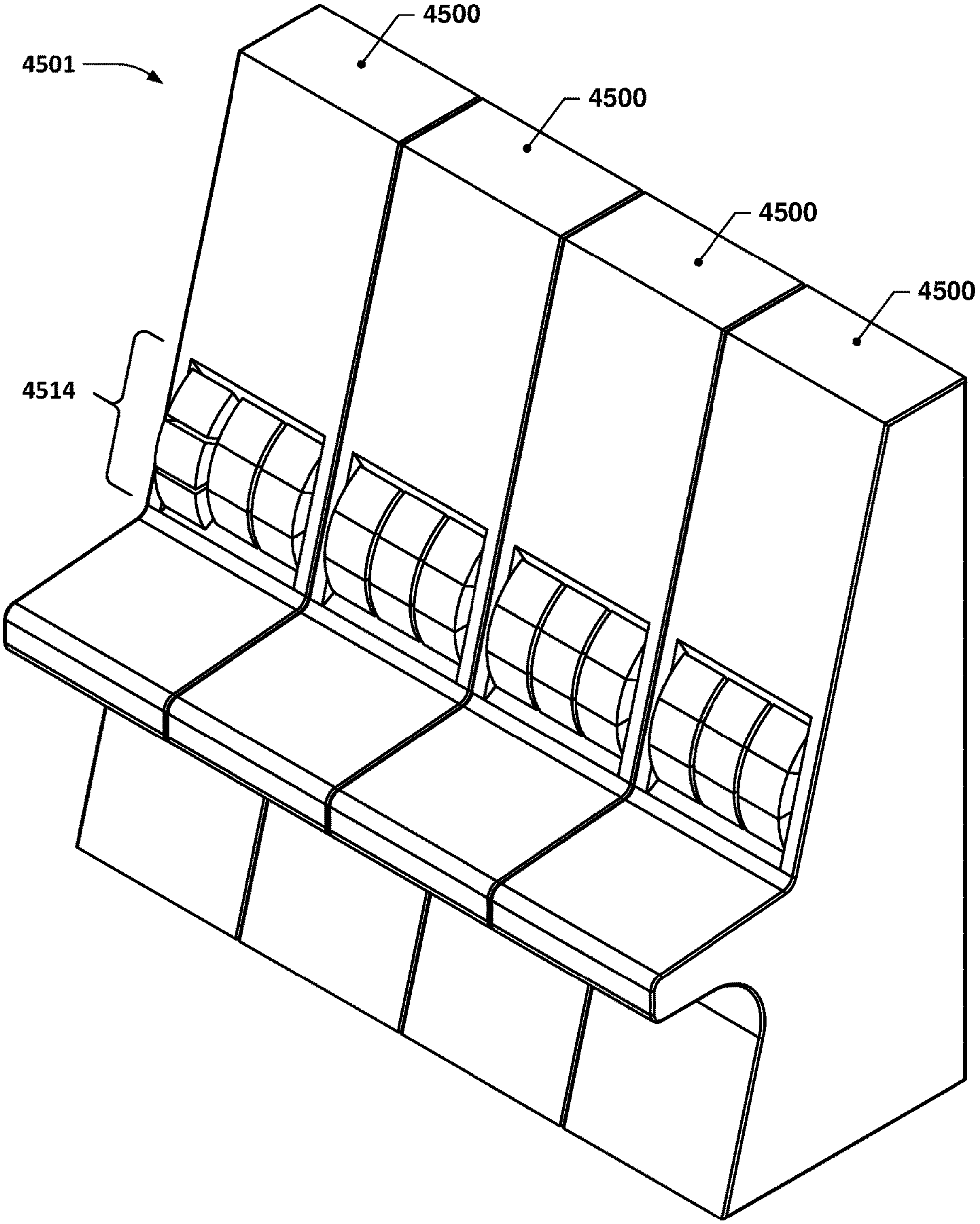
FIGS. 45 through 56 depict a bank of electronic gaming machines with movable display units in various states of actuation.
Figure 46:
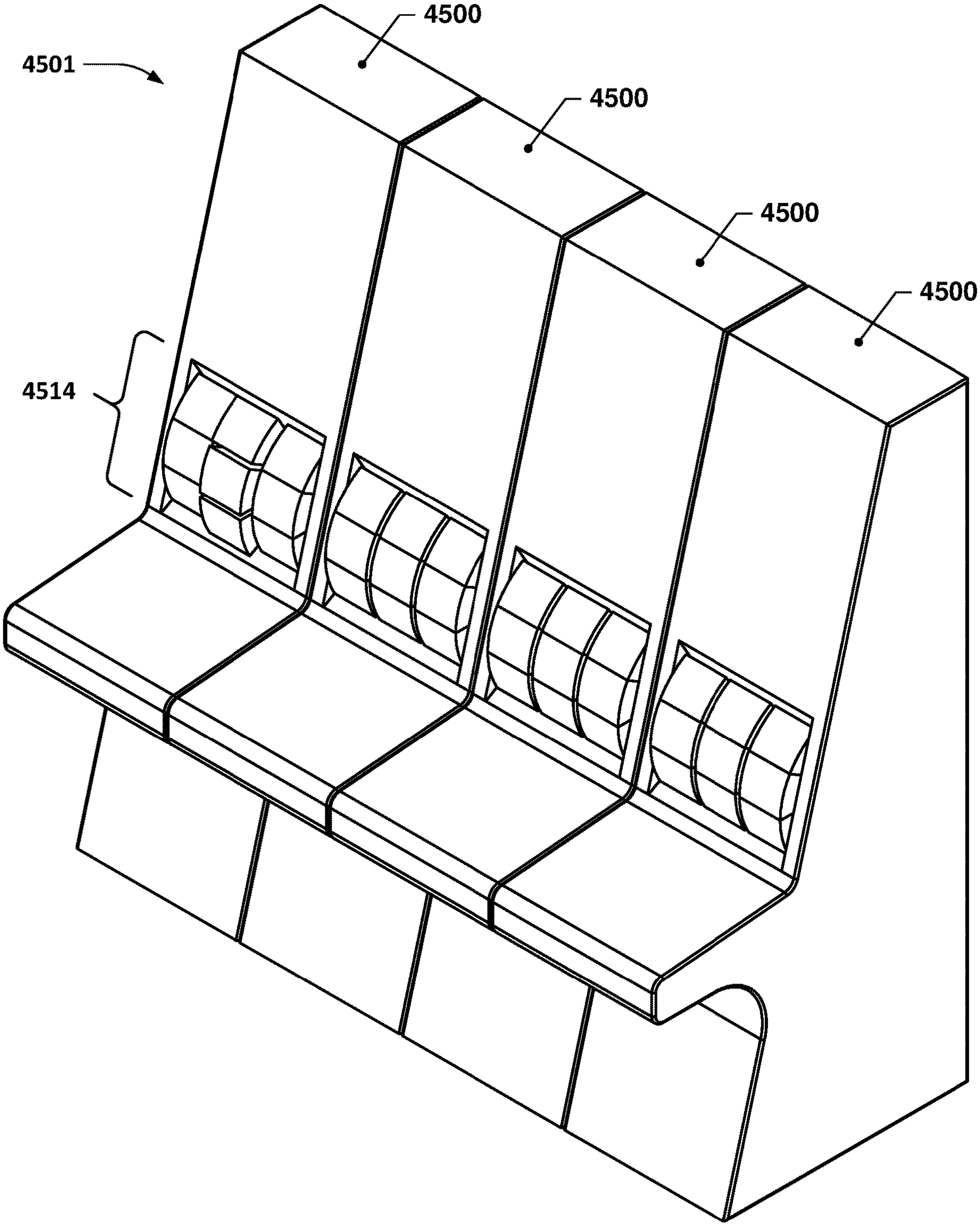
Figure 47:
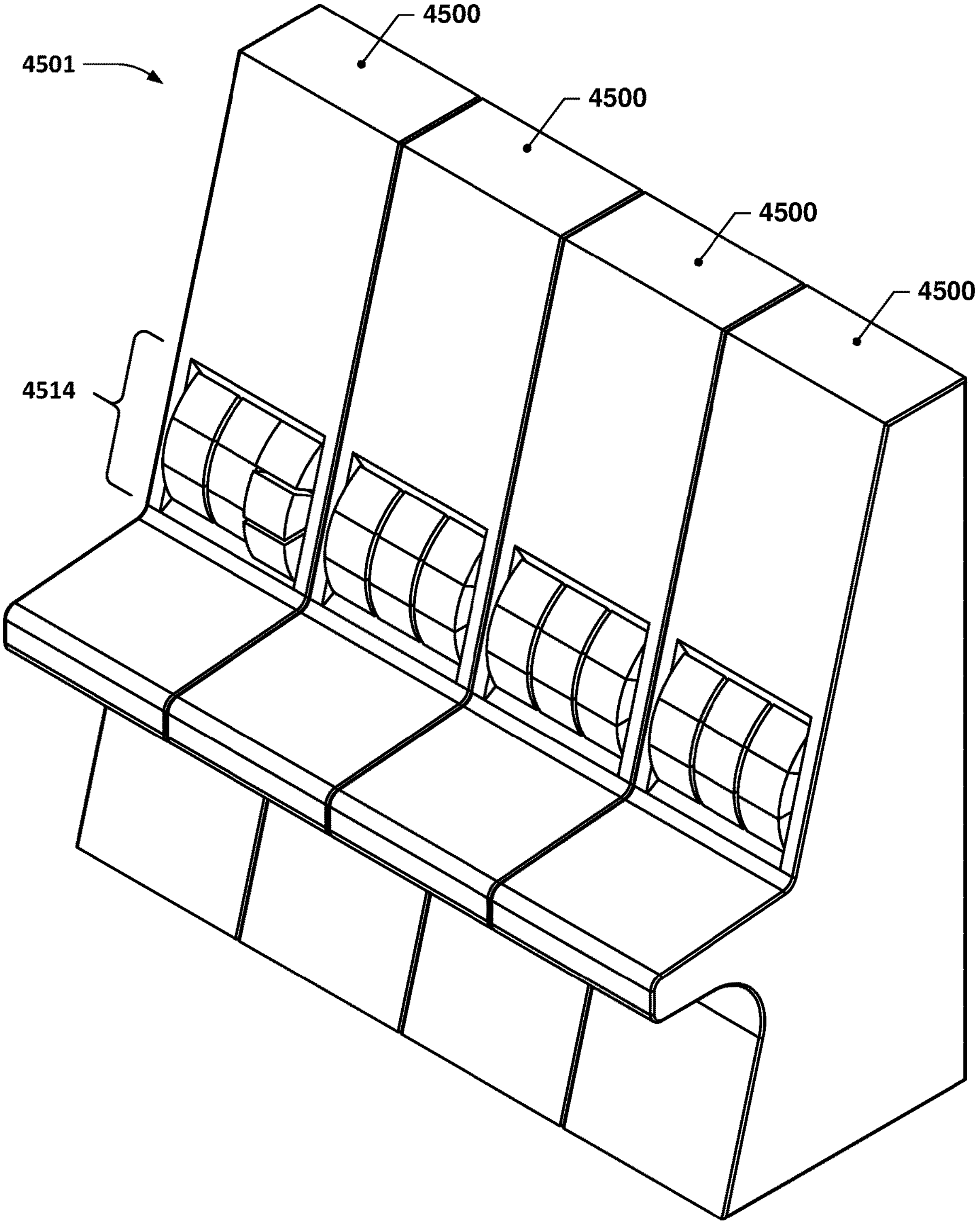
Figure 48:
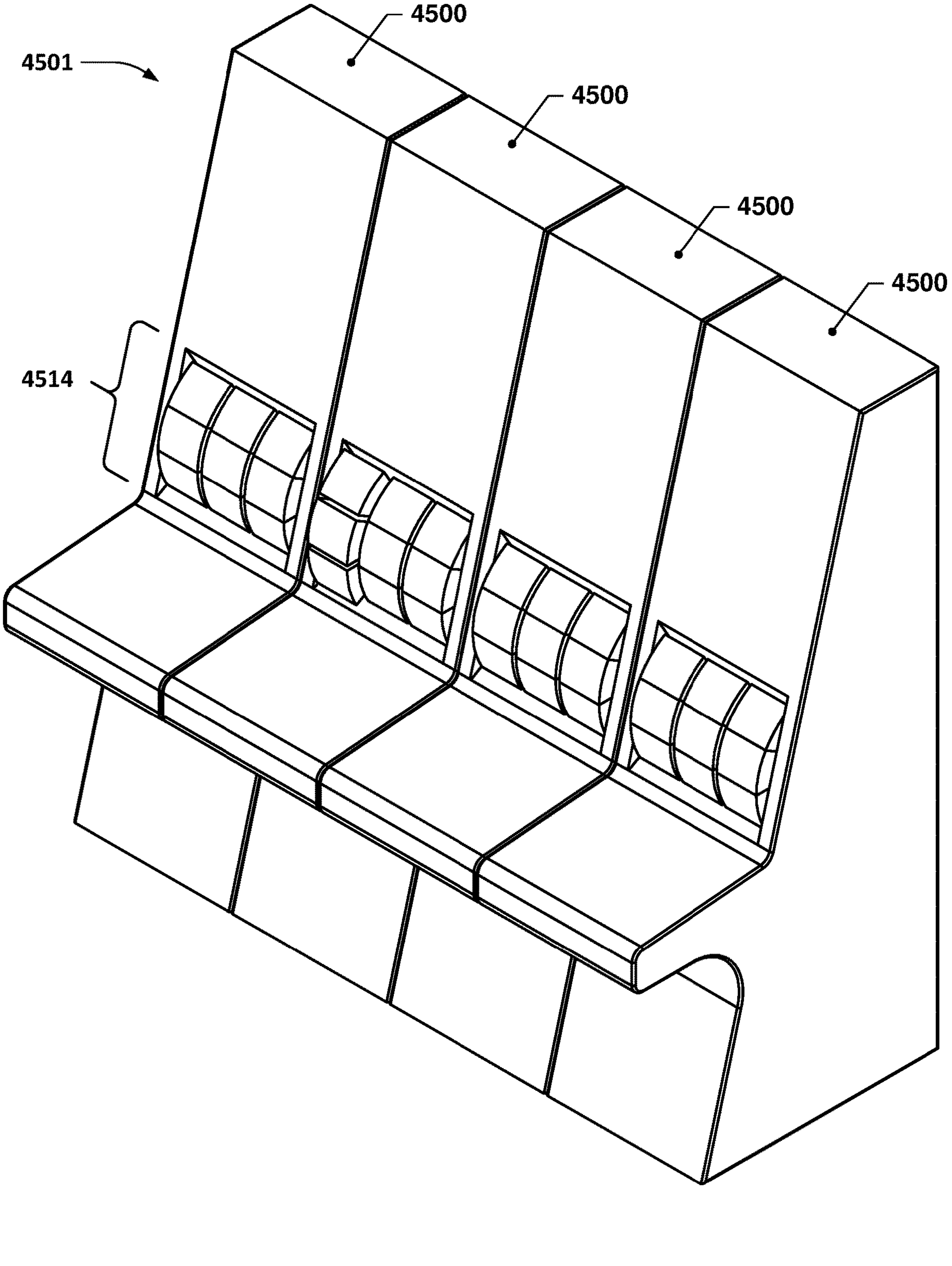
Figure 49:
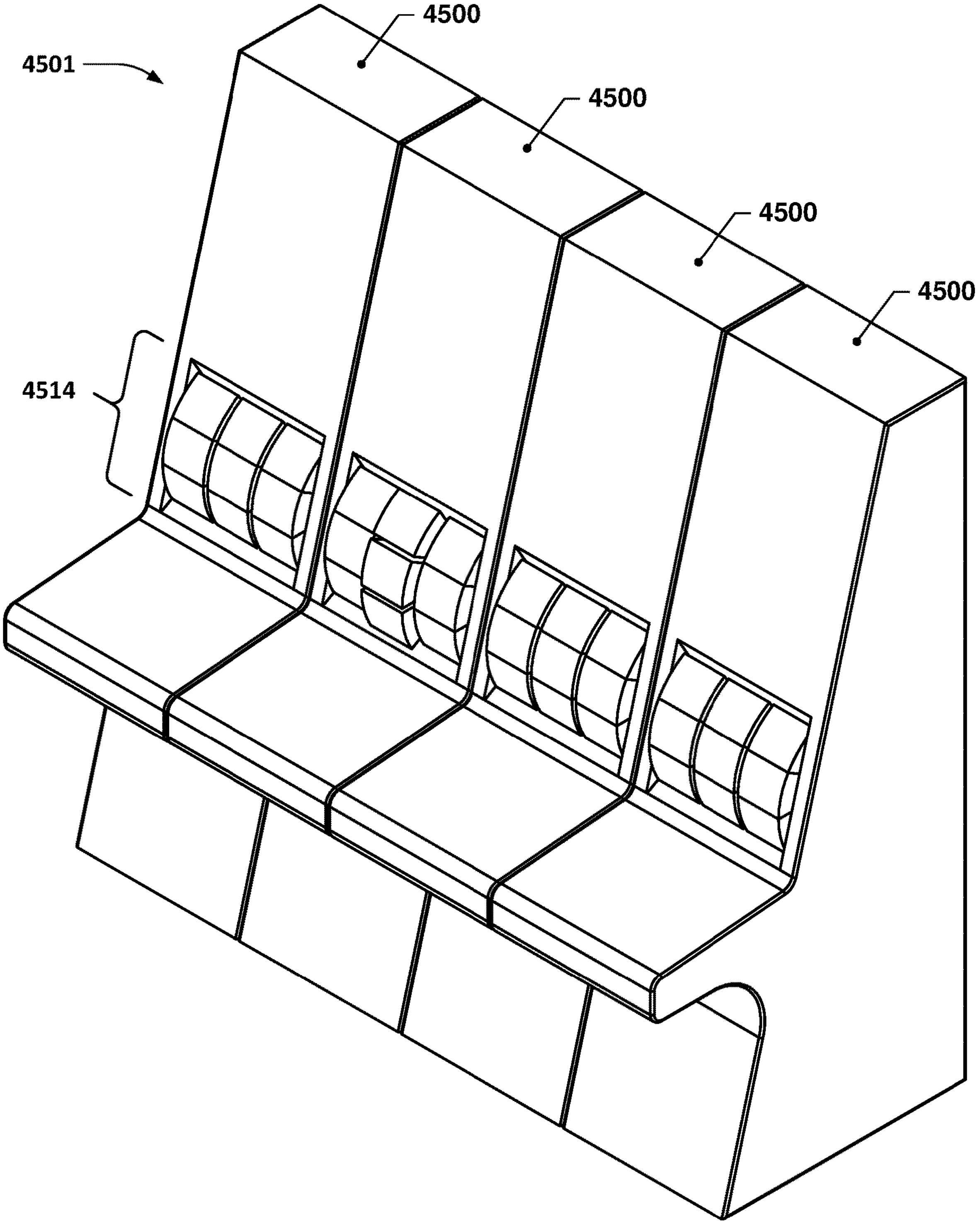
Figure 50:
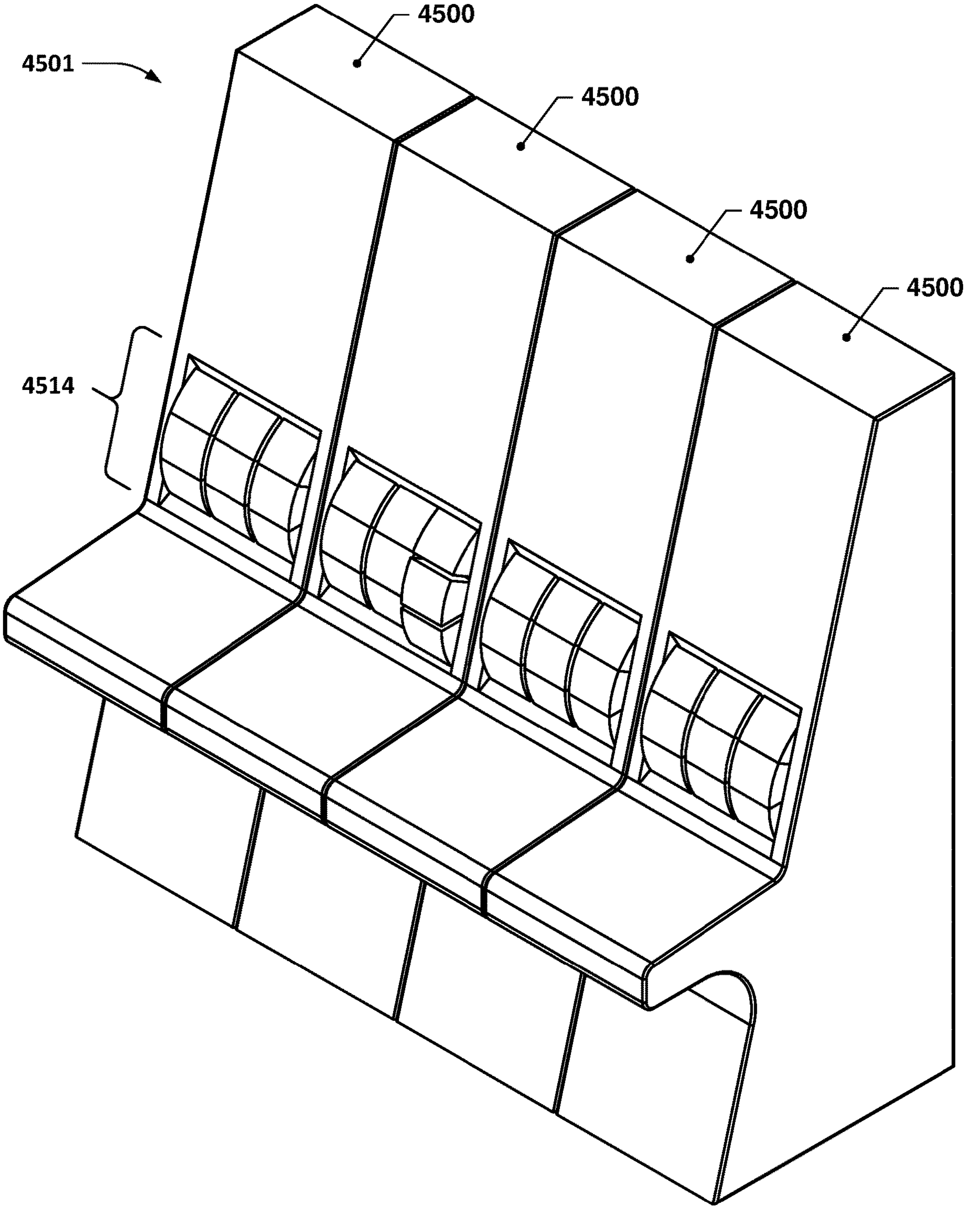
Figure 51:
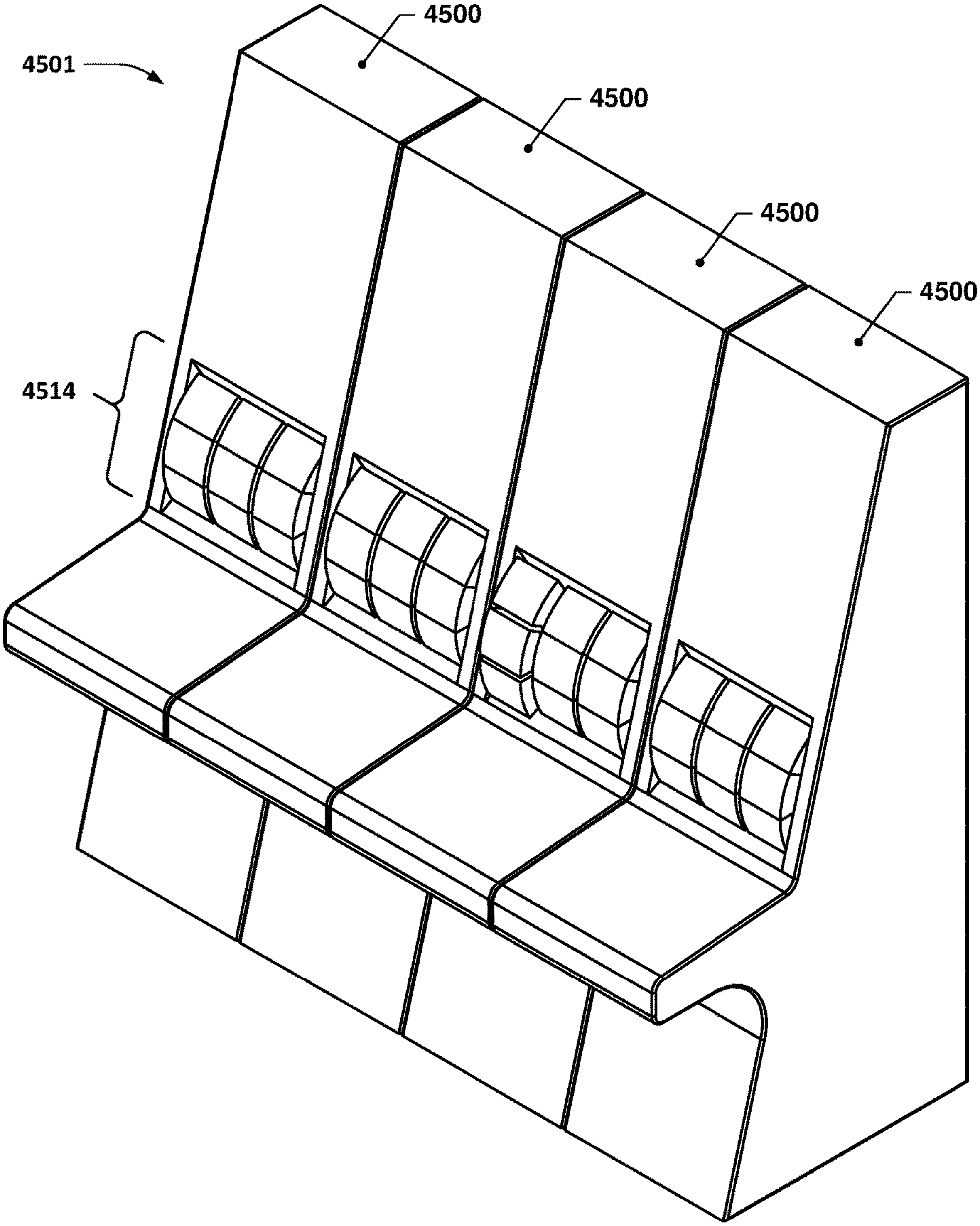
Figure 52:
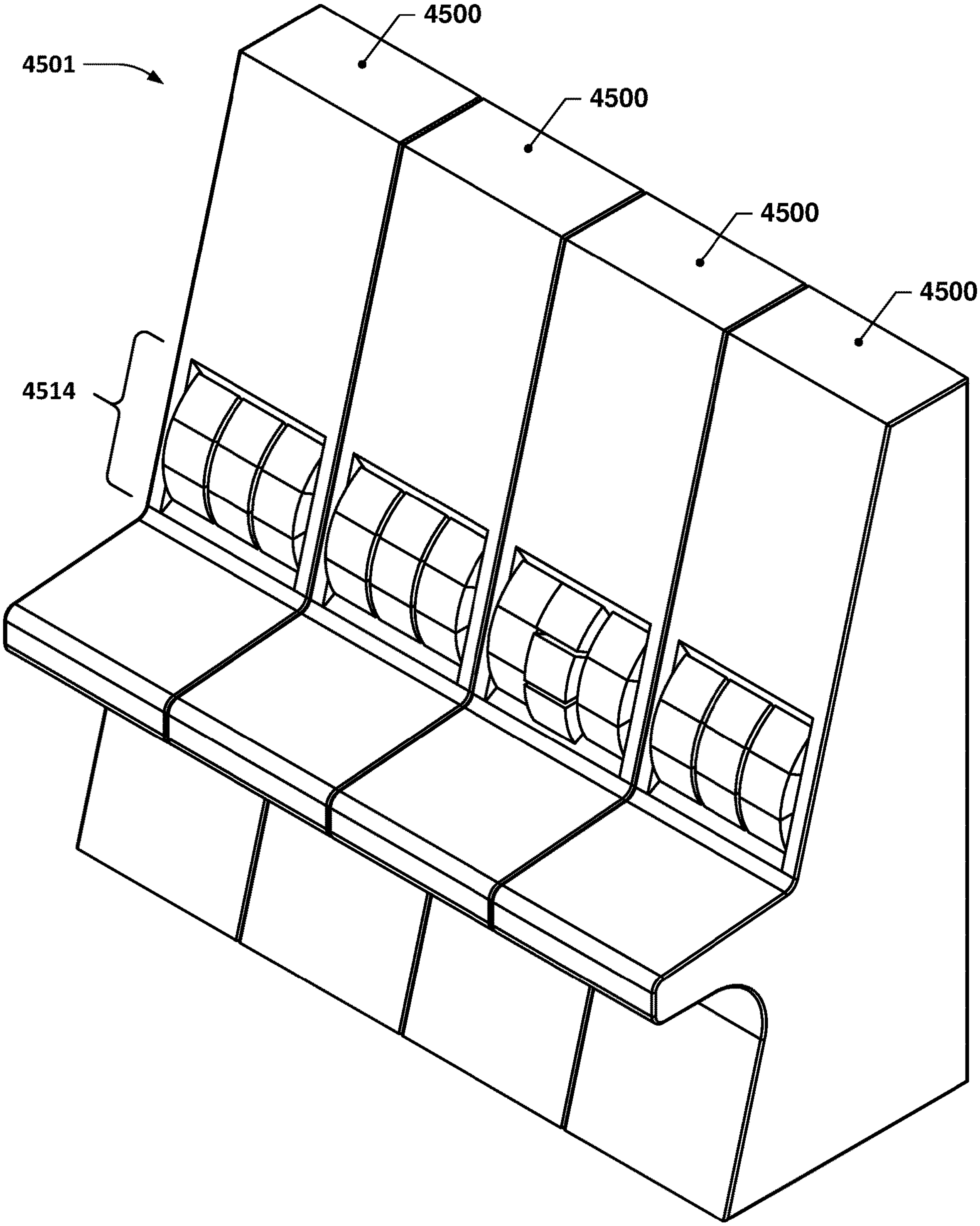
Figure 53:
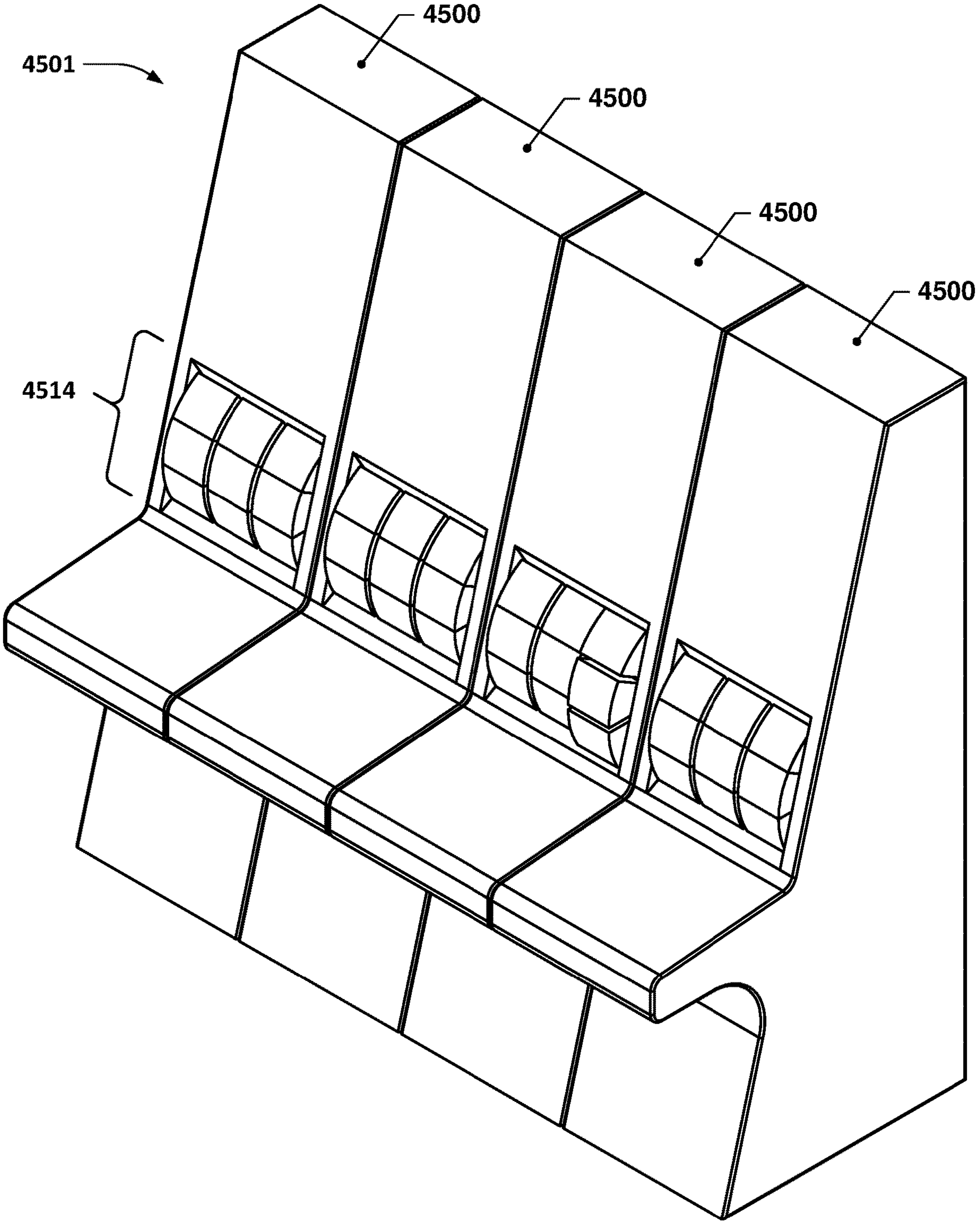
Figure 54:
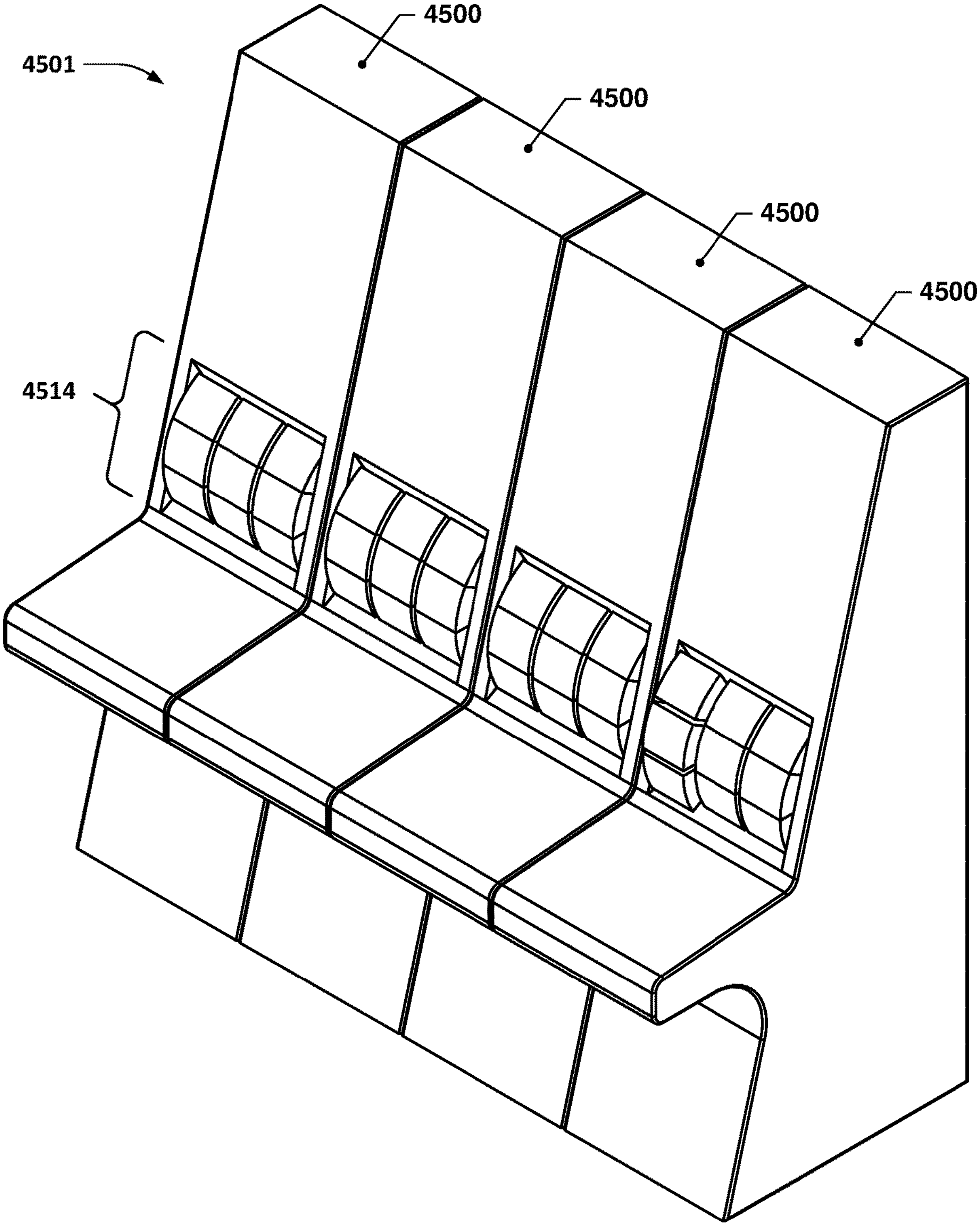
Figure 55:
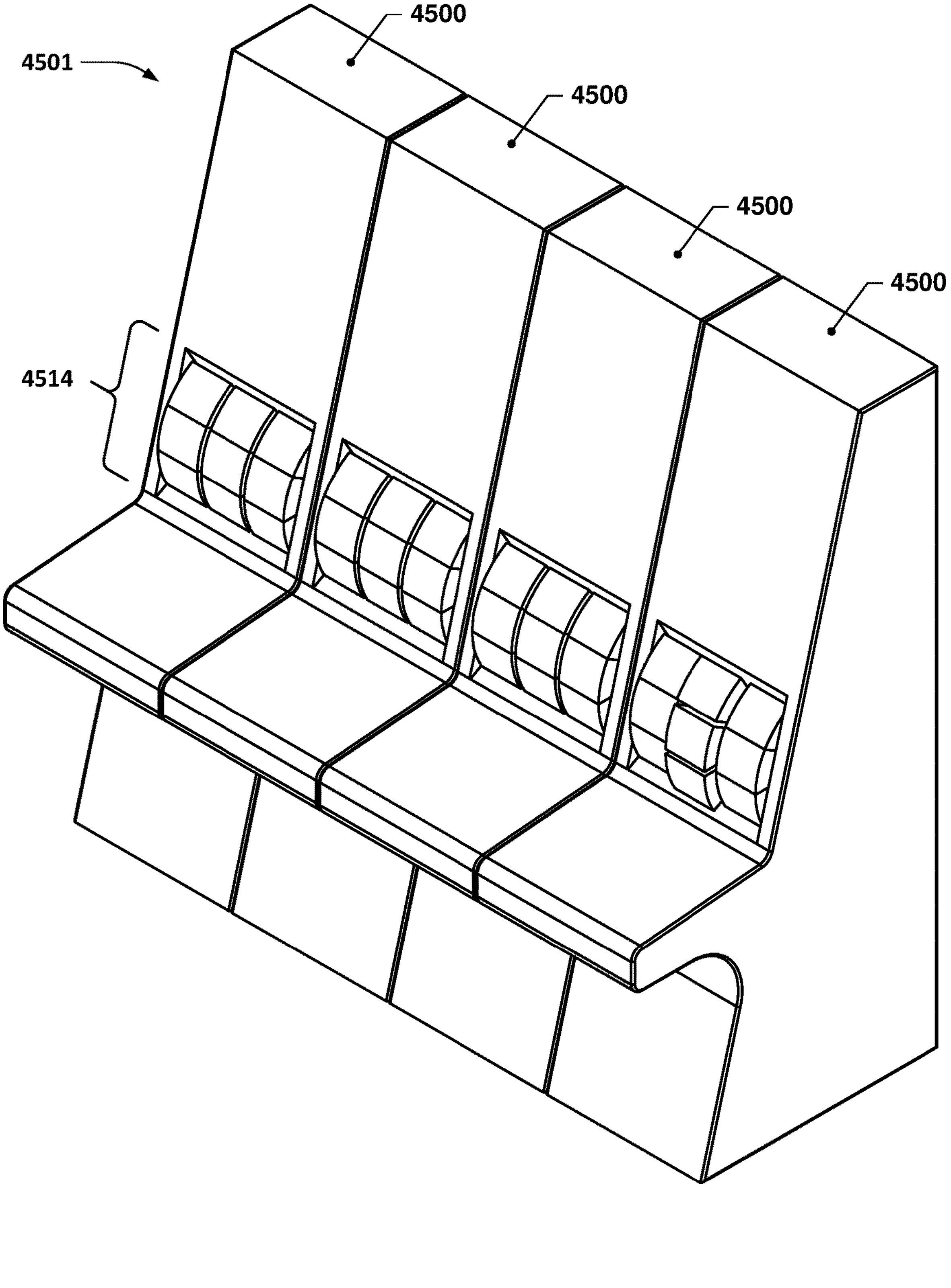
Figure 56:
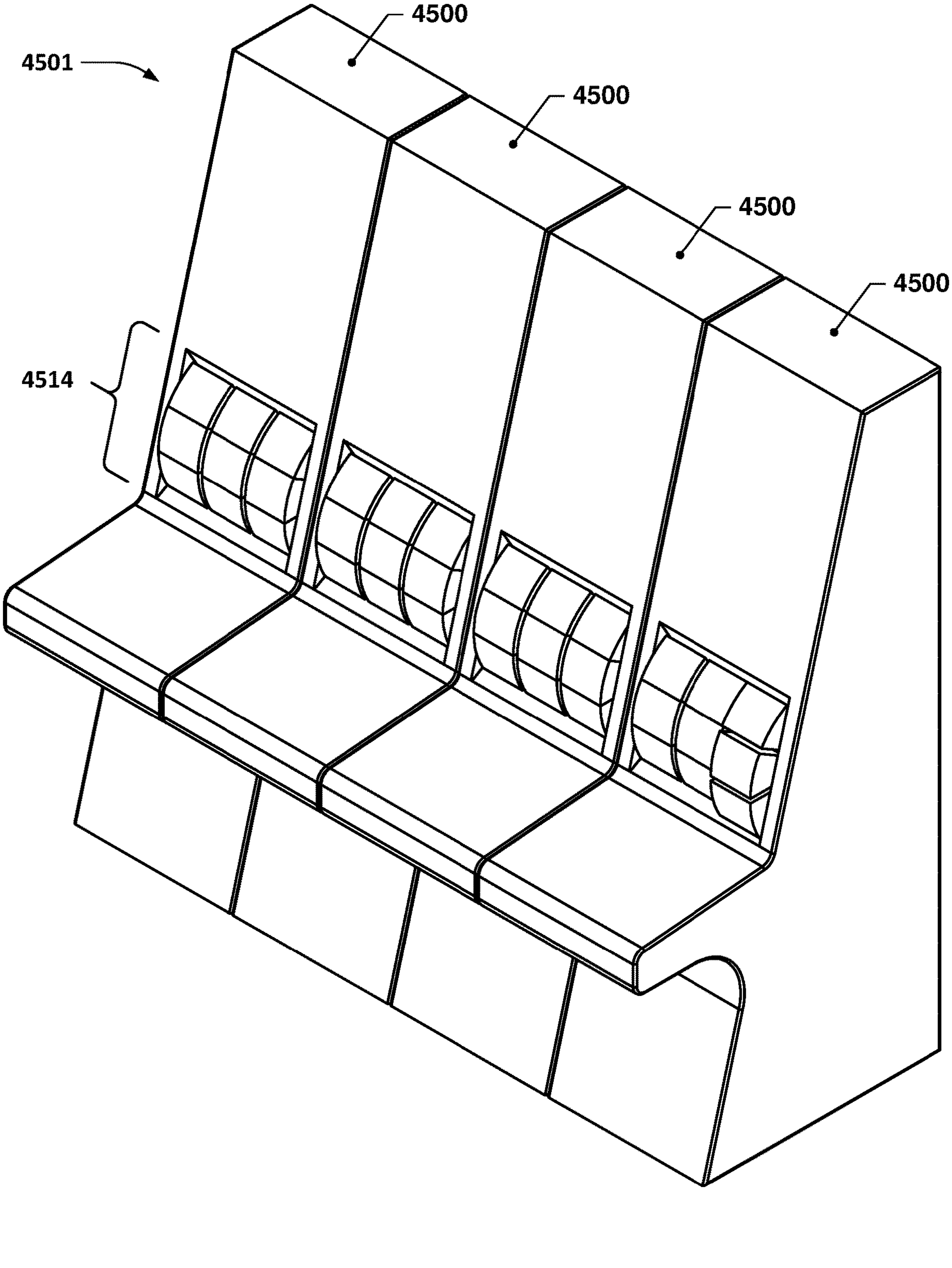

The apparatus 4200 may also be caused to actuate one or more of the movable display units 4214, as shown in FIG. 44 in which three movable display units 4214 have been actuated, so as to move the display panels 4216 thereof along their respective first axes 4220 in order to emphasize them or draw the player's attention to them. In some implementations, such actuation may, for example, be controlled so as to occur when the symbol(s) shown on the to-be-actuated display panel(s) 4216 are a particular type of symbol, e.g., a wild symbol, a free game symbol, a feature game trigger symbol, a scatter symbol, a multiplier symbol, etc. In other alternative or additional such implementations, such actuation may, for example, be controlled so as to occur when the symbol(s) shown on the to-be-actuated display panel(s) 4216 are part of a winning symbol pattern spanning across multiple reel units.

While not shown in FIGS. 42 through 44, electrical connections to the movable display units may be provided via, for example, one or more slip rings that may be used to provide electrical signals between the stationary components, e.g., those that are fixed with respect to the apparatus 4200 overall, and the rotating components, e.g., the rotatable support structure 4292.

It will be understood that electronic gaming machines with movable display units may feature any number of such movable display units. For example, while examples discussed herein have included reel displays that are shown with "reels" that include 3 movable display units, other implementations may feature reels with 2, 4, 5, 6, or more movable display units. In some implementations, a "reel" may be provided that features only a single movable display unit (these may be referred to in the art as "unisymbol" reels—although they are reels that have a plurality of symbols but only actually show one symbol at a time); in such implementations, there will typically be multiple such reels in an array giving, for example, a symbol display that appears to be similar to that provided by multiple side-by-side reels each providing multiple symbols for display, but the symbols that are shown in each symbol position may be independently selected from a different, independent reel (as compared with, for example, symbols for a column of symbol positions being selected from a single, common reel).

It is also to be understood that the movable display units discussed herein may be arranged in a manner other than the traditional X by Y rectangular array associated with a horizontal array of side-by-side reels discussed above—other implementations may include similar arrangements but arranged to simulate a vertical array of side-by-side reels, radial arrangements of reels, etc.

It will also be recognized that the movable display units discussed herein may also be used in implementations that lack a display frame, e.g., where there are no "fixed" display portions surrounding the movable display units. In such instances, there may effectively be no "first display panels." In view of this, the claims may utilize a different convention as to the ordinal numbers assigned to recited display panels; it is to be understood that this may result in the "first display panel" recited in a claim actually referring to what is described in the specification as a "second display panel."

It will also be recognized that usage of displays having movable display units as discussed herein may not be limited to just the main/primary game display of an electronic gaming machine. Such displays with movable display units (both with and without a fixed display frame) may be used in displays used to depict a secondary or bonus game, as well as in a topper display or other signage relating to the electronic gaming machine, such as a bank display typically positioned above and displaying video content common to a bank of two or more gaming machines. In some implementations, such movable display units may be included in an electronic gaming machine carousel display. In some implementations, some or all main, secondary, topper, and bank dynamic displays common to a bank of gaming machines may operate in a coordinated manner, e.g. presenting a coordinated wave type movement across the gaming machine and bank displays. FIGS. 45 through 56 depict an example electronic gaming system that includes a bank of four electronic gaming machines. The electronic gaming machines 4500 that form the bank 4501 are each equipped with a set of nine movable display units 4514 (not shown is a cover glass that covers the movable display units on each electronic gaming machine 4500).

Each of FIGS. 45 through 56 depicts the bank 4501 of four electronic gaming machines 4500 with the movable display units 4514 in various states of actuation. As can be seen, in FIG. 45, the left-most set of movable display units 4514 of the left-most electronic gaming machine 4500 have been caused to actuate so as to translate to a first extended position. In each of FIGS. 46 through 56, the set of movable display units 4514 that were extended in the previous Figure have been caused to be actuated to a retracted position and the set of movable display units 4514 immediately to the right of the newly retracted movable display units have been caused to actuate to the first extended position. This gives the appearance of a line of movable display units that moves across the bank 4501 from left to right like a wave in a coordinated display. Thus, there may be a controller that sends signals to the various electronic gaming machines that, on receipt by those electronic gaming machines, cause the electronic gaming machines to actuate the movable display units 4514 thereof in a coordinated fashion in order to produce such a visual effect. In some implementations, one of such a controller may be provided as part of one of the electronic gaming machines. It will be recognized, of course, that various other visual effects may be produced in a similar fashion, including, for example, simulated movement of a single movable display across a bank of electronic gaming machines, simulated movement of a sloped or slanted line of movable display units across a bank of electronic gaming machines, simulated movement of a horizontal line of movable display units up and down in a bank of electronic gaming machines, simulated movement of a sinusoidal line of movable display units across a bank of electronic gaming machines in a wave pattern, etc. In some instances, such movements may be controlled so as to cause two simulated movements of movable display units towards each other from different sides of the bank of electronic gaming machines. In some such instances, such movable display actuation may be controlled so as to cause the two simulated movements of the movable displays to simultaneously reach a particular set of movable display units or a particular electronic gaming machine 4500 so as to emphasize that particular movable display unit or electronic gaming machine. Such actuations may be caused to occur, for example, when it is desired to draw attention to that particular movable display unit or electronic gaming machine. For example, if a symbol that results in a large-denomination win is shown on a particular electronic gaming machine, a coordinated actuation of movable displays may be initiated on the electronic gaming machines to cause the appearance of two waves of movable displays that converge on that particular movable display unit 4514 from opposite directions. Or, similarly, if a particular electronic gaming machine displays a winning symbol outcome that results in a significant amount being awarded, the electronic gaming machines 4500 may be caused to actuate their movable display units 4514 so as to cause a coordinated display that gives the appearance of two waves of movable displays converging on that electronic gaming machine from opposite directions.

Figure 57:
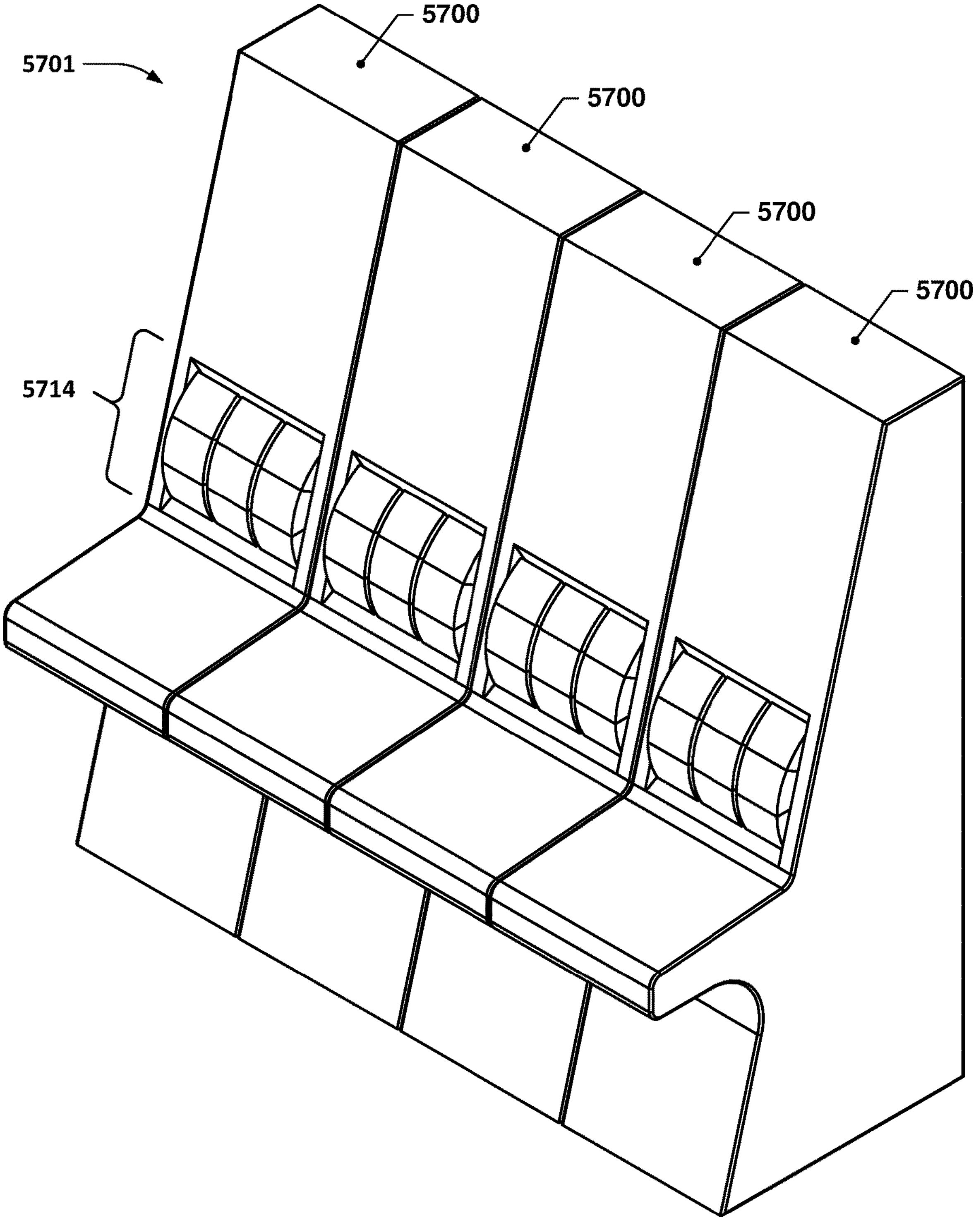
FIGS. 57 and 58 depict another bank of electronic gaming machines with movable display units in various states of actuation.
Figure 58:
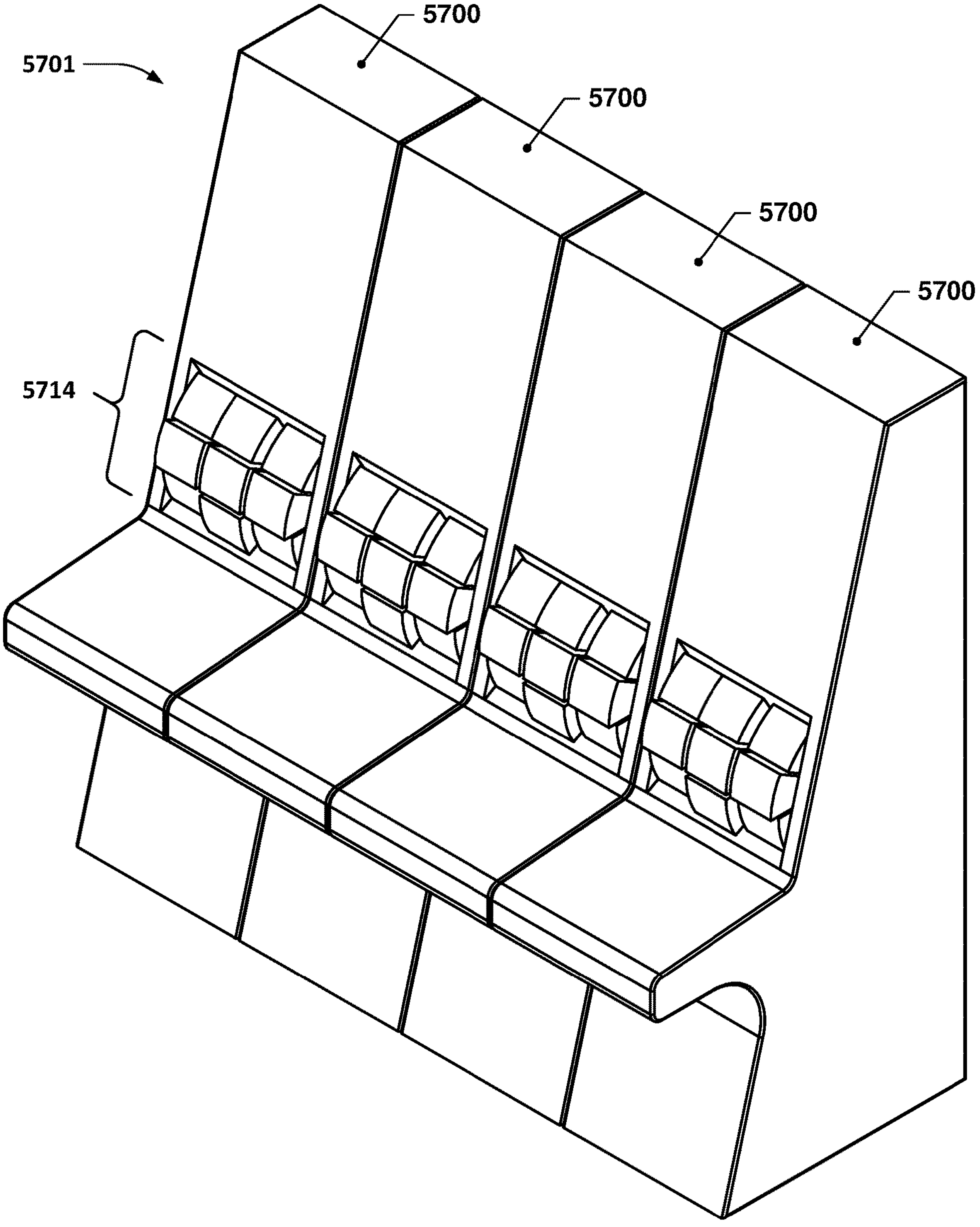

In some implementations, banks of multiple electronic gaming machines may be controlled so as to present a coordinated movement of movable display units, but in a manner that does not necessarily result in the appearance of a graphical effect that moves from one electronic gaming machine to another. For example, FIGS. 57 and 58 depict a similar bank 5701 of four electronic gaming machines 5700 that each include a 3×3 set of movable display units 5714. In this example, each of the electronic gaming machines 5700 is controlled to as to cause a "+" shaped set of movable display units to actuate to the first extended position in unison. Such visual displays may be used to attract players and highlight the fact that the electronic gaming machines have unique hardware that may provide a unique in-game effect.

It will be further appreciated that such banks of electronic gaming machines may include more or less than four electronic gaming machines and/or such electronic gaming machines may feature other quantities of movable display units 4514 or 5714, e.g., 3×5, 4×6, etc. Banks of electronic gaming machines or topper or bank displays with movable display units may, in some implementations, be controlled so as to cause the movable display units thereof to be actuated in a coordinated manner to display, for example, letters or numbers that communicate various pieces of information, e.g., messages, banners, progressive meter amounts, attract mode messages, etc.

It will also be appreciated that while the various examples discussed above have featured movable display units that are rectangular or square in shape (although potentially having an arcuate profile when viewed from the side, in some cases), other implementations may use movable display units with display panels having other shapes, e.g., triangular, circular, pentagonal, hexagonal, or having the shape of any regular polygon. In such implementations, if there are reel strips that are used that have regions of transparency that allow the display panels of the movable display units to be seen therethrough, then such regions of transparency may, in some cases, have shapes that correspond to the display shapes in order to mask off regions of the internal equipment of the electronic gaming machines that may be visible past the display panels. Similarly, if there are reel strips that are used that have regions with openings that allow the display panels of the movable display units to be translated therethrough, such openings may be shaped to match the shape of the display panels (while being sized slightly larger) such that the display panels are able to be translated therethrough without large gaps existing between the edges of the openings and the display panels.

As is evident from the above discussion, control software and/or hardware may be provided to control the display panels and the various actuators. For example, a memory of a gaming controller (or other computing device) may store computer-executable instructions for controlling the various displays and or actuators to display particular content, e.g., game-related content such as reel stops, outcomes, wild indicators, credit information, etc., and to coordinate the movement of the movable display units in a manner that complements the graphical content that is displayed.

For example, a gaming controller or other computing device may be configured to receive data indicative of graphical content that is to be displayed on the display panels of a dynamic display (the display panels of the movable display units and, if present, the display panel(s) of the fixed display frame). The gaming controller or other computing device may also be configured to receive data that is indicative of displacements of the movable display units relative to some reference point. Such data may, for example, be similar to a bump map or other arrayed data that indicates relative intensity values of distinct pixels, except that in this case, the "intensity" value would map to the absolute displacement of the movable display unit from a frame of reference and each pixel would correspond to a single movable display unit (which may have a second display panel with a single pixel but which may, in many implementations, have a second display panel with multiple pixels.

Such computer software may be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the computer software can be executed by different devices, for example in a client server relationship. Persons skilled in the art, will appreciate that computer software provides a series of instructions executable by the processor.

It is to be understood that the phrase "for each <item> of the one or more <items>," if used herein, should be understood to be inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood.

Terms such as "about," "approximately," "substantially," "nominal," or the like, when used in reference to quantities or similar quantifiable properties, are to be understood to be inclusive of values within +10% of the values or relationship specified (as well as inclusive of the actual values or relationship specified), unless otherwise indicated.

The disclosure is not limited to the specific implementations described herein, but rather, components of the systems and/or articles and/or steps of the methods may be utilized independently and separately from other components and/or steps described herein. For example, the configuration of components described herein may also be used in combination with other processes, and is not limited to practice with the systems, articles, and related methods as described herein. Rather, the example implementation can be implemented and utilized in connection with many applications in which a game or bonus game is desired.

Although specific features of various implementations of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the implementations of the present disclosure, including the best mode, and also to enable any person skilled in the art to practice the disclosure, including making and using any devices or systems and performing any incorporated methods. The patentable scope of the implementations described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

a housing;

one or more sets of movable display units, each set of movable display units having a plurality of movable display units, and each movable display unit including a corresponding display panel, wherein each display panel is a multi-pixel display panel;

a plurality of linear drive mechanisms, each linear drive mechanism connected with one of the movable display units and configured to translate the movable display unit connected therewith relative to the housing and along a first axis responsive to receipt of a control signal; and a game controller that includes one or more processors and one or more memory devices, wherein:

the first axes of the movable display units within each set of movable display units are non-parallel to one another, the one or more processors, the one or more memory devices, the one or more display panels, and the linear drive mechanisms are operably connected, and the one or more memory devices store computer-executable instructions for controlling the one or more processors to:

present a game of chance using graphical content displayed on the display panels, and cause the linear drive mechanisms to be selectively actuated so as to cause the movable display units connected with the actuated linear drive mechanisms to translate during presentation of the game of chance in association with an occurrence of one or more events during presentation of the game of chance.

2. The electronic gaming system of claim 1, wherein at least one of the display panels is selected from the group consisting of a light-emitting diode (LED) display panel, a micro-LED display panel, an organic LED (OLED) display panel, a plastic OLED (POLED) display panel, and a liquid-crystal display (LCD) panel.

3. The electronic gaming system of claim 1, wherein there are multiple sets of movable display units with the sets of movable display units being arranged side-by-side along a second axis and rotationally aligned with one another about the second axis, wherein:

the linear drive mechanism of each movable display unit in each set of movable display units includes a stationary portion and a movable portion, the corresponding display panel of each movable display unit in each set of movable display units is connected with the stationary portion of the linear drive mechanism of that movable display unit by the movable portion of the linear drive mechanism of that movable display unit, and the stationary portions of the linear drive mechanisms of the movable display units in the sets of movable display units are fixed in space relative to the housing.

4. The electronic gaming system of claim 1, wherein the first axes for each set of movable display units intersect at a common point.

5. The electronic gaming system of claim 1, wherein the display panels of the movable display units in each set are arcuate and have radii that are selected so as to allow the display panels to all be co-radial when the movable display units of that set are placed into a first position.

6. The electronic gaming system of claim 1, wherein:

the housing is a main cabinet configured to rest on a floor during use, the linear drive mechanism of each movable display unit in each movable display unit includes a stationary portion and a movable portion, the corresponding display panel of each movable display unit is connected with the stationary portion of the linear drive mechanism of that movable display unit by the movable portion of the linear drive mechanism of that movable display unit, and the stationary portions of the linear drive mechanisms of the linear drive mechanisms of the movable display units are fixed in space with respect to the housing.

7. The electronic gaming system of claim 1, further comprising, for each set of movable display units, a corresponding rotatable support structure and a corresponding motor, wherein:

the rotatable support structures are configured to rotate about a common rotational axis, each rotatable support structure is configured to rotate responsive to rotational input received from the corresponding motor, the movable display units in each set of movable display units are mounted to the corresponding rotatable support structure such that the first axes of those movable display units radiate outward from the common rotational axis, and the movable display units in each set of movable display units rotate with the rotatable support structure associated therewith.

8. A method comprising:

presenting a game of chance using graphical content displayed on a plurality of display panels, wherein each display panel is part of a corresponding movable display unit of one or more sets of movable display units, each set of movable display units includes a plurality of movable display units, each display panel is a multi-pixel display panel, each movable display unit is connected with a corresponding linear drive mechanism configured to actuate the movable display unit connected therewith relative to a housing in which the movable display units are disposed and along a first axis responsive to receipt of a control signal, the first axes of the movable display units within each set of movable display units are non-parallel to one another; and causing the linear drive mechanisms to be selectively actuated so as to cause the movable display units connected with the actuated linear drive mechanisms to actuate during presentation of the game of chance in association with an occurrence of one or more events during presentation of the game of chance.

9. The method of claim 8, wherein at least one of the display panels is selected from the group consisting of a light-emitting diode (LED) display panel, a micro-LED display panel, an organic LED (OLED) display panel, a plastic OLED (POLED) display panel, and a liquid-crystal display (LCD) panel.

10. The method of claim 8, wherein there are multiple sets of movable display units with the sets of movable display units being arranged side-by-side along a second axis and rotationally aligned with one another about the second axis, wherein:

the linear drive mechanism of each movable display unit in each set of movable display units includes a stationary portion and a movable portion, the corresponding display panel of each movable display unit in each set of movable display units is connected with the stationary portion of the linear drive mechanism of that movable display unit by the movable portion of the linear drive mechanism of that movable display unit, and the stationary portions of the linear drive mechanisms of the movable display units in the sets of movable display units are fixed in space relative to the housing.

11. The method of claim 8, wherein the first axes for each set of movable display units intersect at a common point.

12. The method of claim 8, wherein the display panels of the movable display units in each set are arcuate and have radii that are selected so as to allow the display panels to all be co-radial when the movable display units of that set are placed into a first position.

13. The method of claim 8, wherein:

the housing is a main cabinet configured to rest on a floor during use, the linear drive mechanism of each movable display unit in each movable display unit includes a stationary portion and a movable portion, the corresponding display panel of each movable display unit is connected with the stationary portion of the linear drive mechanism of that movable display unit by the movable portion of the linear drive mechanism of that movable display unit, and the stationary portions of the linear drive mechanisms of the linear drive mechanisms of the movable display units are fixed in space with respect to the housing.

14. The method of claim 8, further comprising, for each set of movable display units, a corresponding rotatable support structure and a corresponding motor, wherein:

the rotatable support structures are configured to rotate about a common rotational axis, each rotatable support structure is configured to rotate responsive to rotational input received from the corresponding motor, the movable display units in each set of movable display units are mounted to the corresponding rotatable support structure such that the first axes of those movable display units radiate outward from the common rotational axis, and the movable display units in each set of movable display units rotate with the rotatable support structure associated therewith.

15. One or more non-transitory computer-readable media storing computer-executable instructions which, when executed by one or more processors of a gaming machine comprising a housing, one or more sets of movable display units in which each set of movable display units has a plurality of movable display units and each movable display unit includes a corresponding multi-pixel display panel, and a plurality of linear drive mechanisms in which each linear drive mechanism is connected with one of the movable display units and is configured to displace the movable display unit connected therewith relative to the housing and along a first axis responsive to receipt of a control signal, cause the one or more processors to:

cause a game of chance to be presented using graphical content displayed on the plurality of multi-pixel display panels; and cause the linear drive mechanisms to be selectively actuated so as to cause the movable display units connected with the actuated linear drive mechanisms to displace during presentation of the game of chance in association with an occurrence of one or more events during presentation of the game of chance.

16. The one or more non-transitory computer-readable media of claim 15, wherein at least one of the display panels is selected from the group consisting of a light-emitting diode (LED) display panel, a micro-LED display panel, an organic LED (OLED) display panel, a plastic OLED (POLED) display panel, and a liquid-crystal display (LCD) panel.

17. The one or more non-transitory computer-readable media of claim 15, wherein:

there are multiple sets of movable display units with the sets of movable display units being arranged side-by-side along a second axis and rotationally aligned with one another about the second axis, the linear drive mechanism of each movable display unit in each set of movable display units includes a stationary portion and a movable portion, the corresponding display panel of each movable display unit in each set of movable display units is connected with the stationary portion of the linear drive mechanism of that movable display unit by the movable portion of the linear drive mechanism of that movable display unit, and the stationary portions of the linear drive mechanisms of the movable display units in the sets of movable display units are fixed in space relative to the housing.

18. The one or more non-transitory computer-readable media of claim 15, wherein the first axes for each set of movable display units intersect at a common point.

19. The one or more non-transitory computer-readable media of claim 15, wherein the display panels of the movable display units in each set are arcuate and have radii that are selected so as to allow the display panels to all be co-radial when the movable display units of that set are placed into a first position.

20. The one or more non-transitory computer-readable media of claim 15, wherein:

the housing is a main cabinet configured to rest on a floor during use, the linear drive mechanism of each movable display unit in each movable display unit includes a stationary portion and a movable portion, the corresponding display panel of each movable display unit is connected with the stationary portion of the linear drive mechanism of that movable display unit by the movable portion of the linear drive mechanism of that movable display unit, and the stationary portions of the linear drive mechanisms of the linear drive mechanisms of the movable display units are fixed in space with respect to the housing.

* * * * *